(12) United States Patent  
Hariu et al.

(10) Patent No.: US 12,172,520 B2
(45) Date of Patent: Dec. 24, 2024

(54) ACCELERATOR DEVICE

(71) Applicant: DENSO CORPORATION, Kariya (JP)

(72) Inventors: Tetsuo Hariu, Kariya (JP); Kiyoshi Kimura, Kariya (JP); Takehiro Saitoh, Kariya (JP); Takuto Kita, Kariya (JP); Hideyuki Mori, Kariya (JP); Souichi Kinouchi, Kariya (JP); Yuusuke Yoshida, Kariya (JP)

(73) Assignee: DENSO CORPORATION, Kariya (JP)

( * ) Notice: Subject to any disclaimer, the term of this patent is extended or adjusted under 35 U.S.C. 154(b) by 100 days.

(21) Appl. No.: 17/940,108

(22) Filed: Sep. 8, 2022

(65) Prior Publication Data

US 2023/0001787 A1 Jan. 5, 2023

Related U.S. Application Data

(63) Continuation of application No. PCT/JP2021/009736, filed on Mar. 11, 2021.

(30) Foreign Application Priority Data

Mar. 13, 2020 (JP) ................................ 2020-044241
Mar. 13, 2020 (JP) ................................ 2020-044607

(51) Int. Cl.
*B60K 26/02* (2006.01)
*G05G 5/06* (2006.01)

(52) U.S. Cl.
CPC ............ *B60K 26/021* (2013.01); *G05G 5/06* (2013.01)

(58) Field of Classification Search
CPC .. G05G 5/06; G05G 1/30–445; B60K 26/021; B60K 26/02
See application file for complete search history.

(56) References Cited

U.S. PATENT DOCUMENTS

| 1,399,054 | A | * | 12/1921 | Gewalt | ................ | G05G 5/18 |
| | | | | | | 74/513 |
| 7,770,491 | B2 | * | 8/2010 | Ritter | .................. | G05G 1/30 |
| | | | | | | 74/560 |
| 2004/0259687 | A1 | | 12/2004 | Ritter et al. | | |
| 2013/0091977 | A1 | * | 4/2013 | Fukushima | ............ | G05G 5/03 |
| | | | | | | 74/513 |

(Continued)

FOREIGN PATENT DOCUMENTS

| DE | 10-2014-118573 | 6/2016 |
| JP | 2000-158970 | 6/2000 |

(Continued)

OTHER PUBLICATIONS

U.S. Appl. No. 17/941,870, filed Sep. 9, 2022 to Takuto Kita et al. (122 pages).

Primary Examiner — Thomas C Diaz
(74) Attorney, Agent, or Firm — Nixon & Vanderhye P.C.

(57) ABSTRACT

An accelerator device includes a pedal lever, at least one drive source, a power transmission mechanism, and a locking mechanism. The pedal lever operates in response to a depressing operation. The drive source is configured to exert a reaction force as a force in a returning direction to the pedal lever. The power transmission mechanism transmits a drive force from the drive source to the pedal lever. The locking mechanism is capable of regulating the operation of the pedal lever.

17 Claims, 54 Drawing Sheets

(56) References Cited

U.S. PATENT DOCUMENTS

2016/0159216 A1* 6/2016 Konigorski .......... B60K 26/021
                                                         74/513
2016/0251018 A1   9/2016 Schneiders et al.
2018/0001763 A1*  1/2018 Kouzuma ................ G05G 1/44
2020/0039350 A1   2/2020 Tayama

FOREIGN PATENT DOCUMENTS

| JP | 2006-176001   | 7/2006  |
|----|---------------|---------|
| JP | 2007-137152   | 6/2007  |
| JP | 2010059820 A  | 3/2010  |
| JP | 2018-165891   | 10/2018 |

* cited by examiner

ACCELERATOR DEVICE

CROSS REFERENCE TO RELATED APPLICATION

The present application is a continuation application of International Patent Application No. PCT/JP2021/009736 filed on Mar. 11, 2021, which designated the U.S. and claims the benefit of priority from Japanese Patent Applications No. 2020-044241 and No. 2020-044607 filed on Mar. 13, 2020. The entire disclosures of all of the above applications are incorporated herein by reference.

TECHNICAL FIELD

The present disclosure relates to an accelerator device.

BACKGROUND

There has conventionally been known an accelerator pedal module including an actuator.

SUMMARY

According an aspect of the present disclosure, an accelerator device comprises a pedal lever configured to operate in response to a depressing operation and at least one drive source configured to exert a reaction force to the pedal lever.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Figure 1:
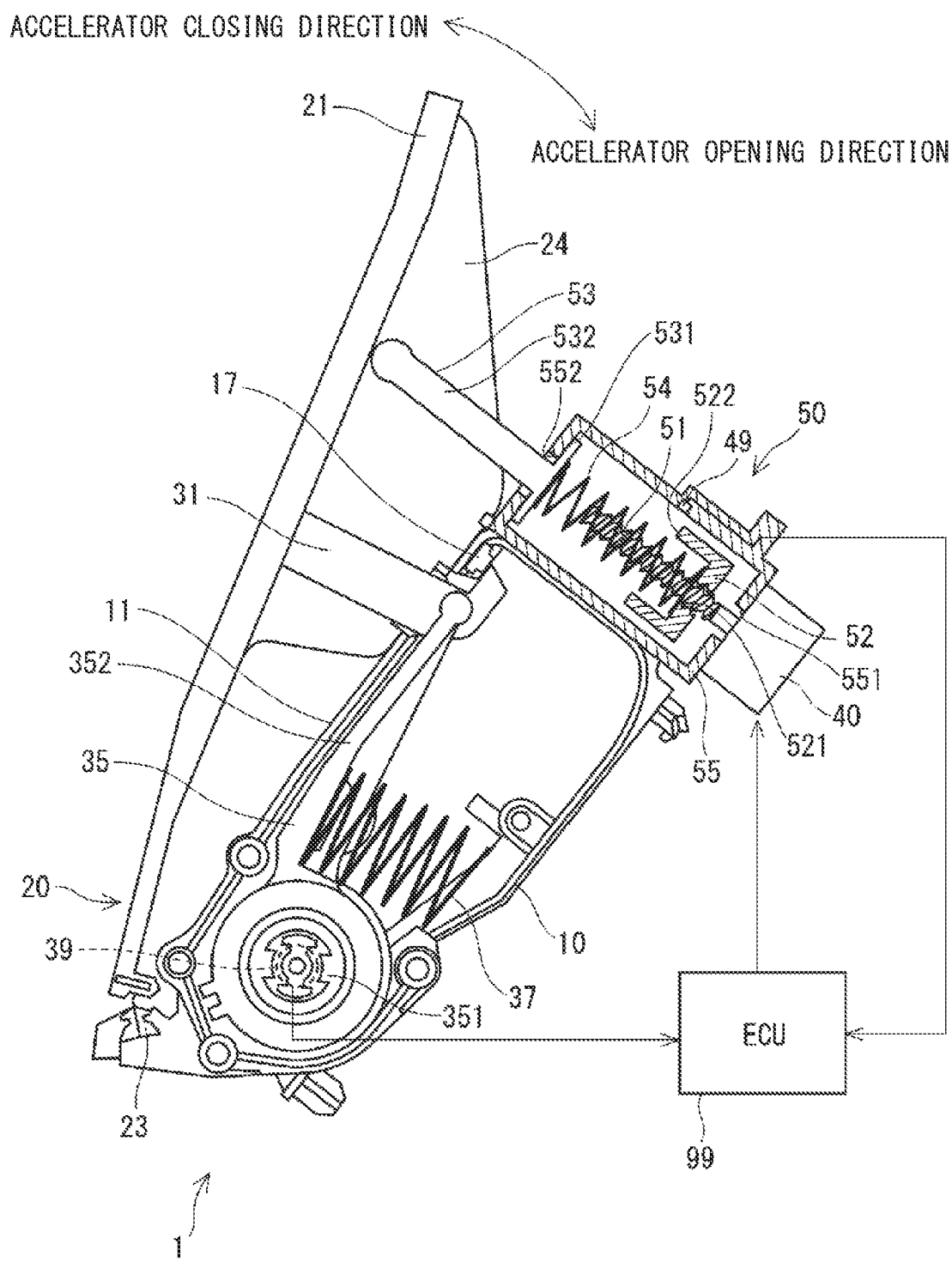
FIG. 1 is a side view of an accelerator device according to a first embodiment.

Hereinafter, examples of the present disclosure will be described.

According to an example of the present disclosure, an accelerator pedal module includes an actuator. Specifically, an actuator is driven by a solenoid and is engaged with a rotational member to exert a force in a returning direction.

In this example, the accelerator pedal module has the rotational member driven by the actuator, and has a relatively large physical size. In addition, when a mechanism to fix the accelerator pedal when it is unnecessary to operate the accelerator pedal, such as during, e.g., automated driving, is provided, the physical size may be further increased to result in a complicated structure.

According to an example, an accelerator device comprises a pedal lever configured to operate in response to a depressing operation. The accelerator device further comprises at least one drive source configured to exert a reaction force to the pedal lever in a returning direction. The accelerator device further comprises a power transmission mechanism configured to transmit a drive force from the drive source to the pedal lever. The accelerator device further comprises a locking mechanism configured to regulate an operation of the pedal lever. The accelerator device is thus configured to exert a reaction force to a pedal lever and also capable of appropriately regulating an operation of the pedal lever as required.

Hereinbelow, an accelerator device according to the present disclosure will be described with reference to the drawings. In the following plurality of embodiments, substantially the same components are denoted by the same reference numerals, and a description thereof is omitted.

First Embodiment

Figure 2:
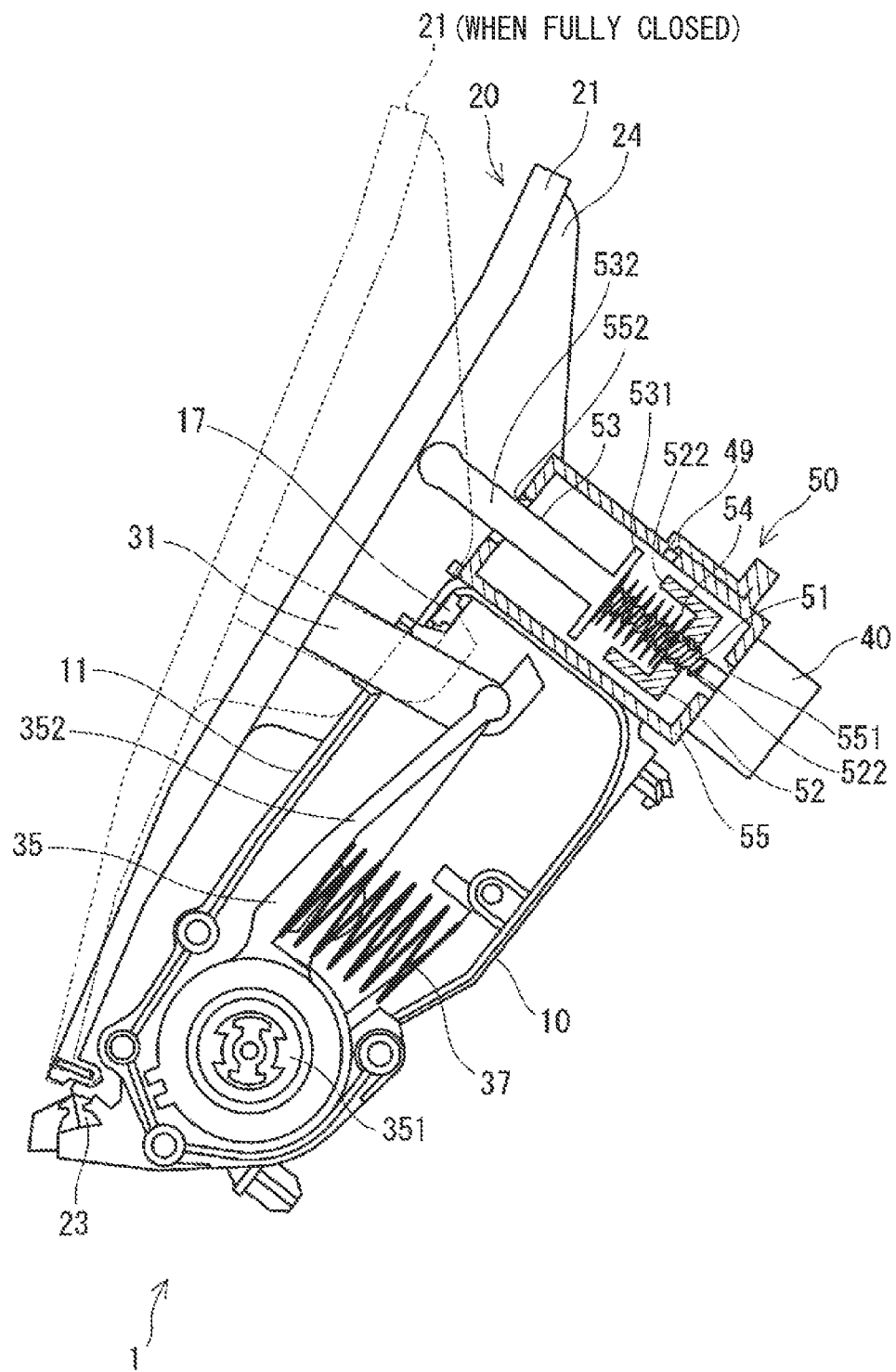
FIG. 2 is a side view illustrating a state in which, in the accelerator device according to the first embodiment, a pedal lever is depressed, and a reaction force is exerted thereto.
Figure 3:
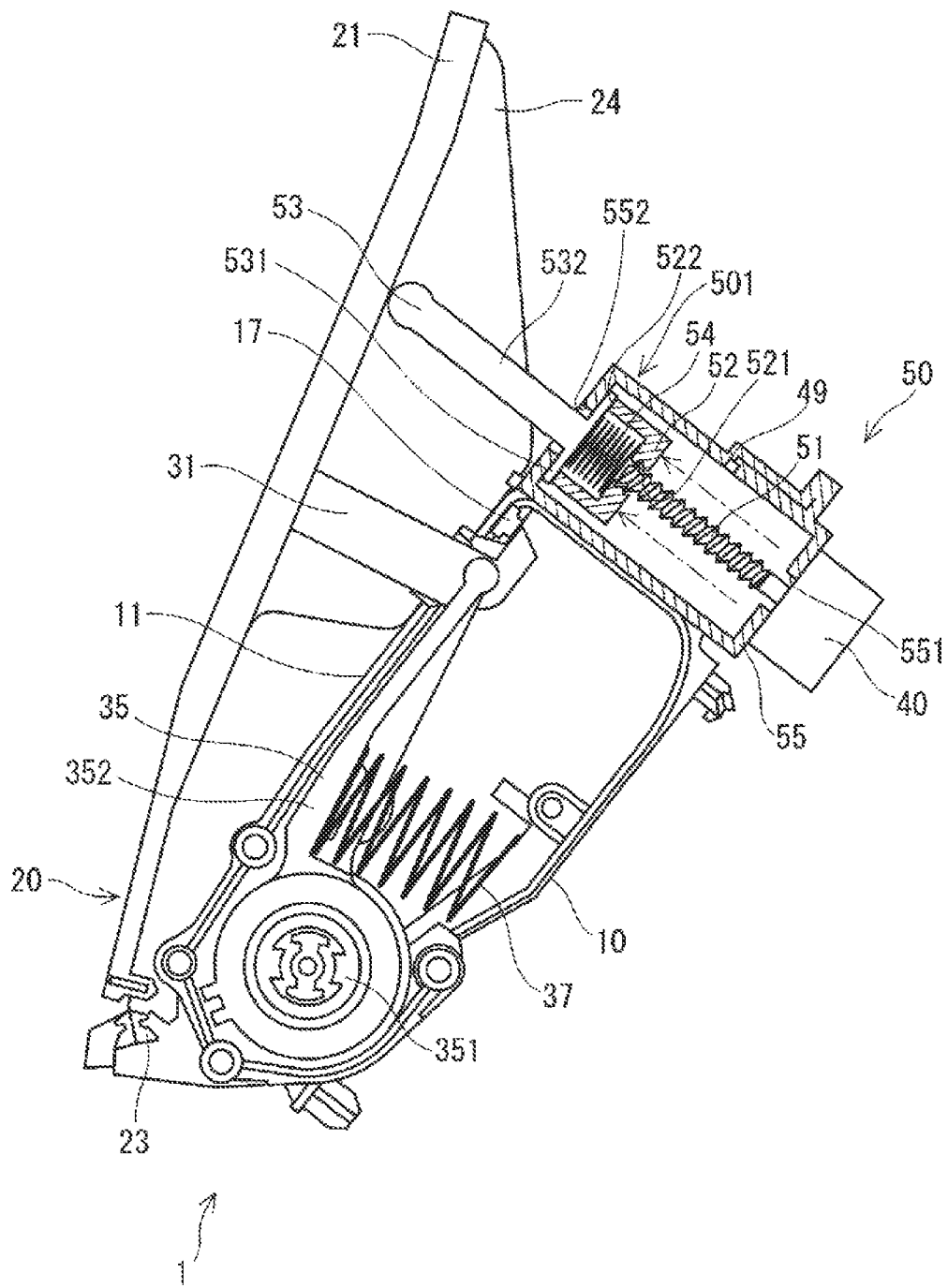
FIG. 3 is a side view illustrating a pedal-locked state in the accelerator device according to the first embodiment.

The first embodiment is illustrated in FIGS. 1 to 3. An accelerator device 1 is configured to be attachable to a floor panel forming a part of a vehicle body of a vehicle and not shown. As illustrated in FIGS. 1 to 3, the accelerator device 1 includes a case 10, a pedal lever 20, a motor 40 serving as a drive source, a power transmission mechanism 50, and the like. The case 10 is attachable to the vehicle body, and contains therein an internal movable mechanism such as a pedal 35. FIG. 1 or the like illustrates a state in which a cover provided on a front side of the case 10 over a surface of a paper sheet and not shown is detached, and shows a portion of a cover surface serving as a cross section is shown with hatching.

The pedal lever 20 includes a pad 21, an arm 31, and the pedal 35, and is integrally driven by a depressing operation by a driver or the like. The pad 21 is provided to allow the driver to perform the depressing operation thereon. The pad 21 is supported by a supporting point member 23 provided in the case 10 to be rotatable with respect to the case 10. The pedal lever 20 in the present embodiment is a so-called "floor-standing type" in which the pad 21 is provided to extend in a direction along one surface of the case 10. It is assumed that a wall portion of the case 10 facing the pad 21 is a top wall portion 11. A side surface guard 24 is a member that guards a gap between the pad 21 and the case 10 so as to prevent a foot of the driver from being caught between the pad 21 and the case 10.

The arm 31 connects the pad 21 and the pedal 35 to each other. In the top wall portion 11 of the case 10, an opening through which the arm 31 is to be inserted is formed. The opening through which the arm 31 is to be inserted is formed so as not to interfere with the arm 31 in an entire range of a pedal operation.

The pedal 35 is contained in an inner space of the case 10, and includes a shaft portion 351 and a connecting portion 352. The shaft portion 351 is supported to be rotatable with respect to the case 10. The connecting portion 352 is formed so as to extend from the shaft portion 351 substantially along the top wall portion 11. An end portion of the connecting portion 352 opposite to the shaft portion 351 is engaged with the arm 31. Accordingly, by an operation performed by the driver on the pad 21, the pad 21, the arm 31, and the pedal 35 are integrally driven.

A pedal biasing member 37 is a compression coil spring having one end fixed to the pedal 35 and another end fixed to the case 10 to bias the pedal 35 toward the top wall portion 11. When the pad 21 is not depressed by the driver, the arm 31 comes into contact with a fully closed stopper 17 formed inside the top wall portion 11. Meanwhile, when the pad 21 is depressed, the pad 21 comes into contact with a fully open stopper formed outside the top wall portion 11 and not shown. It is assumed hereinbelow that a state in which the arm 31 is in contact with the fully closed stopper 17 is an "accelerator fully closed state", and a state in which the pad 21 is in contact with the fully open stopper is an "accelerator fully open state".

An accelerator position sensor 39 generates an accelerator position signal according to a rotation angle of the shaft portion 351. The accelerator position sensor 39 has a detection circuit including a Hall element that detects, e.g., an orientation of a permanent magnet embedded in the shaft portion 351. It is sufficient for the accelerator position sensor 39 to be able to detect an acceleration position, and an element other than the Hall element may also be used instead.

The accelerator position signal is output to an ECU 99 serving as a control unit via a connector not shown.

The motor 40 is, e.g., a DC motor and is provided on a side of the arm 31 with a leading end of the pad 21. The ECU 99 controls driving by the motor 40 on the basis of detection values from the accelerator position sensor 39 and a position sensor 49 and the like. A drive force of the motor 40 is transmitted to the pedal lever 20 via the power transmission mechanism 50. Thus, the pedal lever 20 is driven by the drive force of the motor 40. The accelerator device 1 in the present embodiment is configured such that, by providing the power transmission mechanism 50, the drive force of the motor 40 is allowed to actively drive the pedal lever 20 in an accelerator closing direction (hereinafter referred to appropriately as a "returning direction"). Meanwhile, a direction in which the accelerator pedal is opened is referred to appropriately as a "depressing direction". Illustration of the accelerator position sensor 39, the ECU 99, and the accelerator opening/closing directions is omitted in the drawings other than FIG. 1.

Figure 54:
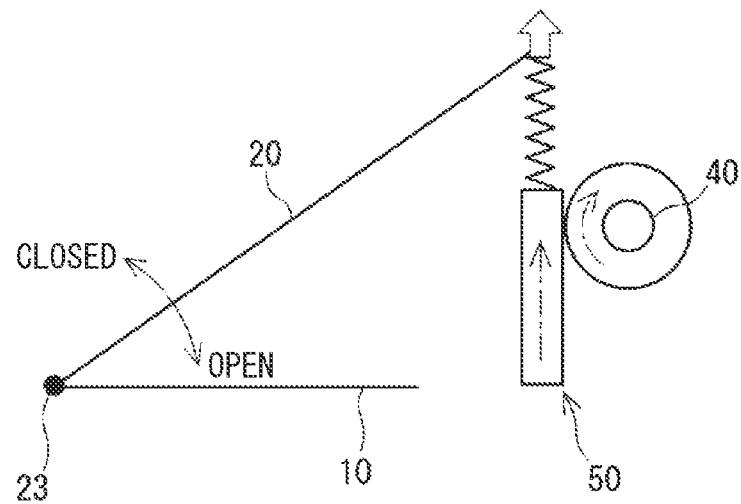
FIG. 54 is a schematic diagram illustrating driving of the pedal lever in a returning direction.

Prior to a detailed description of the power transmission mechanism 50, exerting of a reaction force by an actuator to the pedal lever 20 and a locking mechanism will conceptually be described. It is assumed herein that a sequence of configurations that transmit power from the drive source to the pedal lever 20 via the power transmission mechanism is the "actuator". As illustrated in FIG. 54, when the power transmission mechanism 50 is configured to include a linear motion member such as a rack gear and a compression spring, the linear motion member is driven by the motor 40 to move to be able to drive the pedal lever 20 in the accelerator closing direction.

Figure 55:
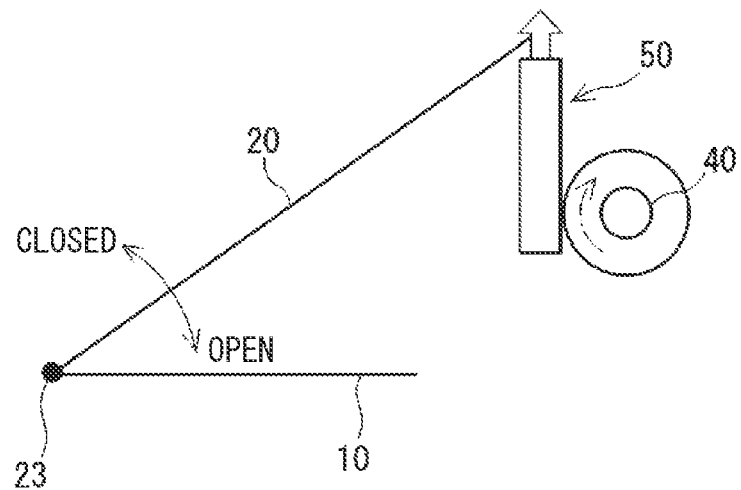
FIG. 55 is a schematic diagram illustrating the driving of the pedal lever in the returning direction.

As illustrated in FIG. 55, the linear motion member may also directly drive the pedal lever 20 without using a spring. This enables the reaction force to be adjusted. Note that the description has been given herein by using the mechanism in which the power transmission mechanism 50 is linearly moved by the motor 40 as an example, but a mechanism in which the power transmission mechanism rotates may also be included.

Figure 56A:
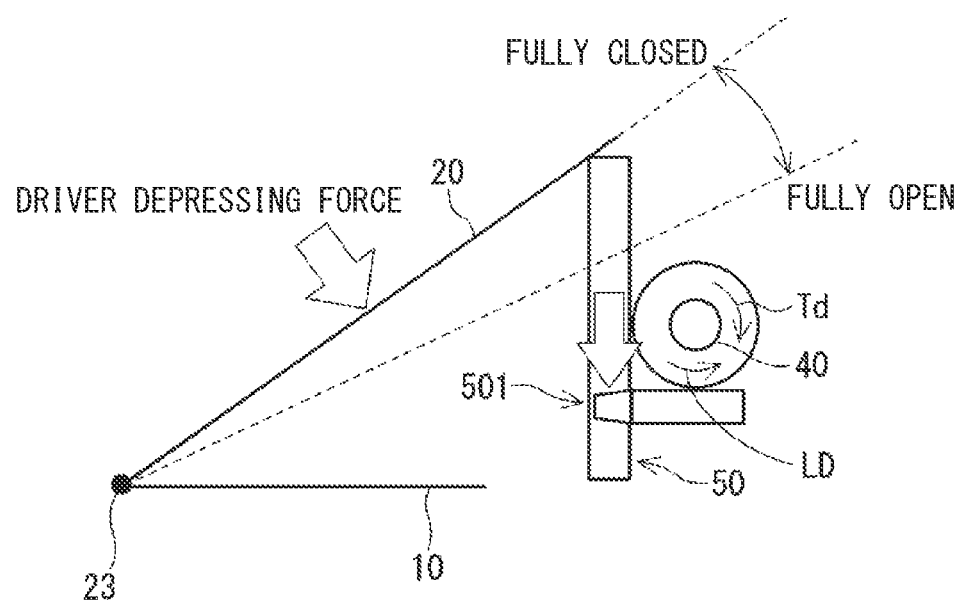
FIG. 56A is a schematic diagram illustrating a pedal lever locking mechanism.
Figure 56B:
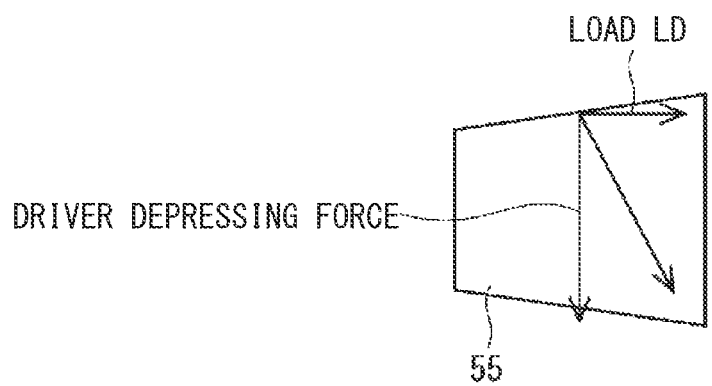
FIG. 56B is an illustrative view illustrating a force exerted during pedal locking.
Figure 57:
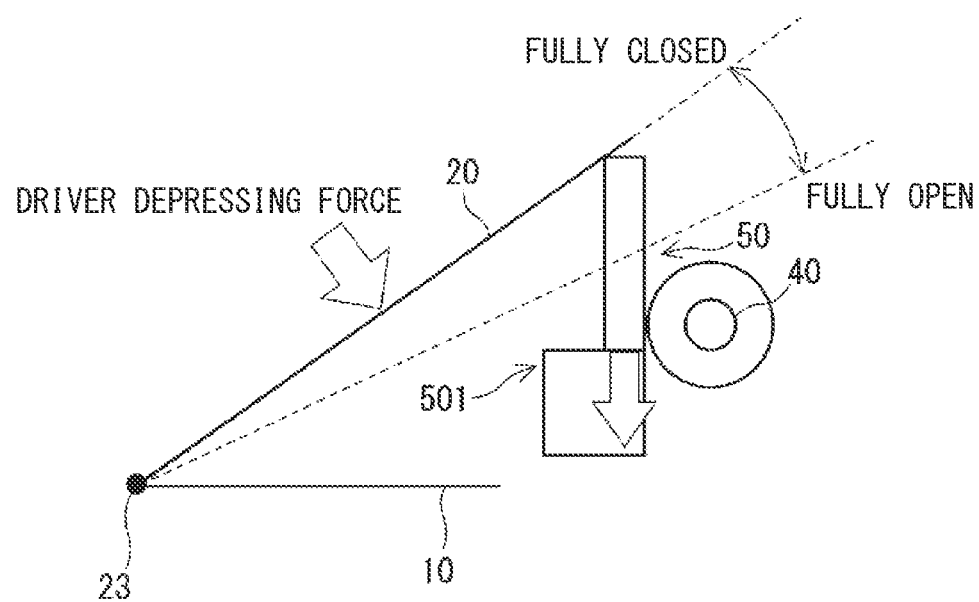
FIG. 57 is a schematic diagram illustrating the pedal lever locking mechanism.

As illustrated in FIGS. 56A, 56B, and 57, a locking mechanism 501 that locks the pedal lever 20 in a fully closed state is provided and, by fixing the pad 21 during, e.g., automated driving, the pad 21 can also be used as a footrest. At this time, as illustrated in FIGS. 55A and 55B, the accelerator device is preferably configured to divide a driver depressing force by using an inclined surface when the pedal is locked and thereby reduce a load placed on a motor 40 side. As long as a state in which a load LD placed on the motor 40 side is smaller than a detent torque Td while power distribution to the motor is cut off can be maintained, it is possible to maintain a locked state even when the power distribution to the motor 40 is turned off. The same applies also to locking in the fully open state or at an intermediate position. In addition, as illustrated in FIG. 57, the accelerator device may also be configured such that, when the pedal is locked, the driver depressing force is kept from being placed on the motor 40 side.

Figure 58A:
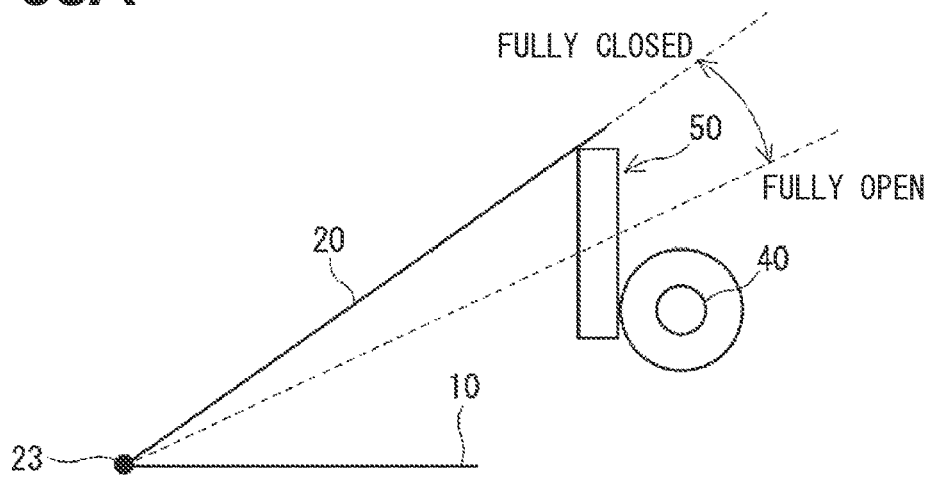
FIG. 58A is a diagram illustrating a pedal lever locking position, which is a schematic diagram illustrating the locked state at a fully closed position.
Figure 58B:
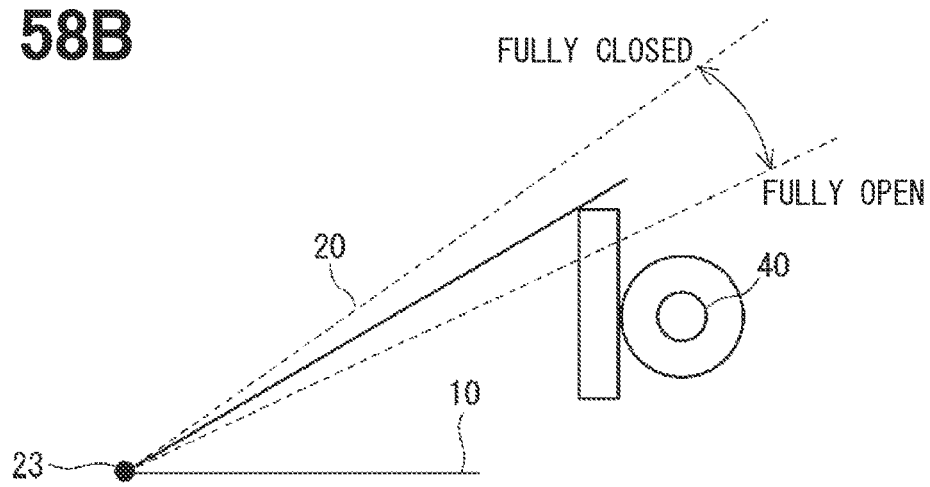
FIG. 58B is a diagram illustrating the pedal lever locking position, which is a schematic diagram illustrating the locked state at an intermediate position.
Figure 58C:
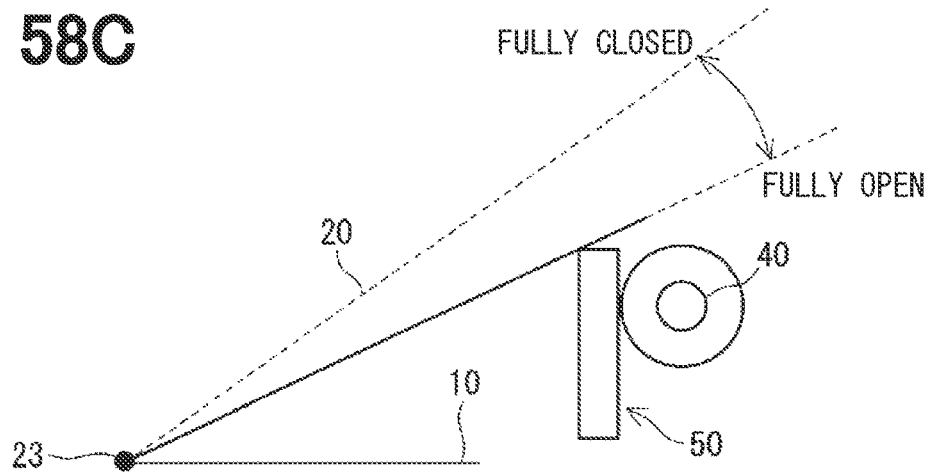
FIG. 58C is a diagram illustrating the pedal lever locking position, which is a schematic diagram illustrating the locked state at a fully open position.

A position at which the pedal lever 20 is locked may be a fully closed position as illustrated in FIG. 58A, may be any position between the fully closed position and a fully open position as illustrated in FIG. 58B, or may be the fully open position as illustrated in FIG. 58C. Note that, in FIGS. 58A to 58C, illustration of the locking mechanism is omitted.

Figure 59A:
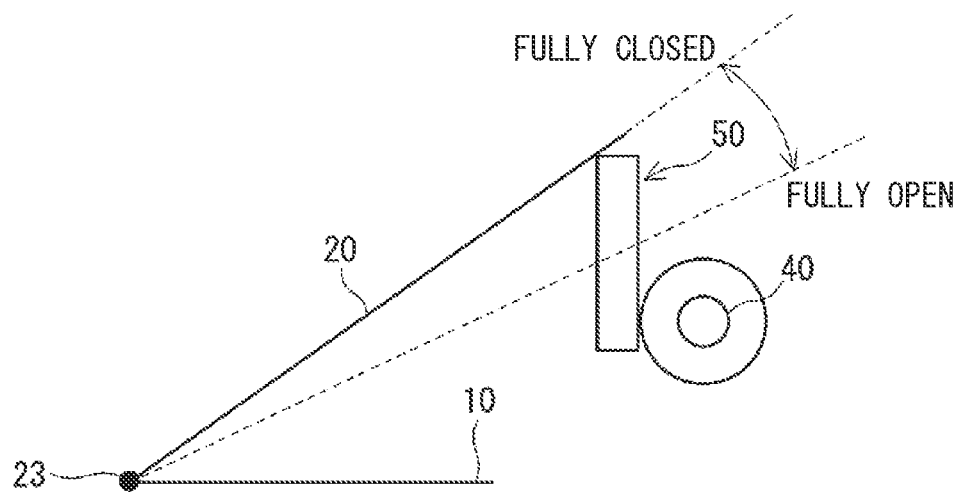
FIG. 59A is a schematic diagram illustrating a state in which the pedal lever and the power transmission mechanism are connected in a fully closed state.
Figure 59B:
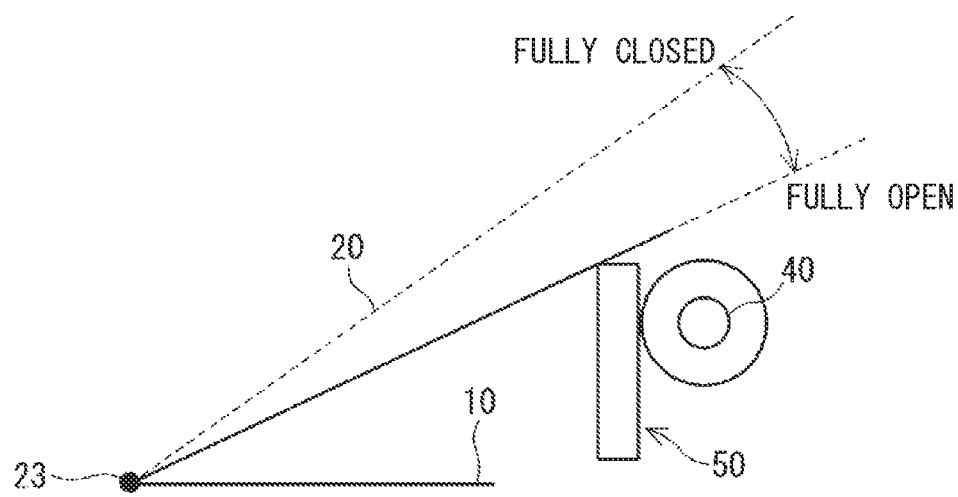
FIG. 59B is a schematic diagram illustrating a state in which the pedal lever and the power transmission mechanism are connected in a fully open state.

A connection/relationship between the pedal lever 20 and the power transmission mechanism 50 will be described. In FIGS. 59A and 59B, the power transmission mechanism 50 and the pedal lever 20 are connected and, in an entire region from the fully closed position to the fully open position, the pedal lever 20 and the power transmission mechanism 50 integrally move. In a case of such a configuration, as a result of an operation on the pedal lever 20, the motor 40 co-rotates, and consequently a cogging torque is generated to affect the depressing force.

Figure 60A:
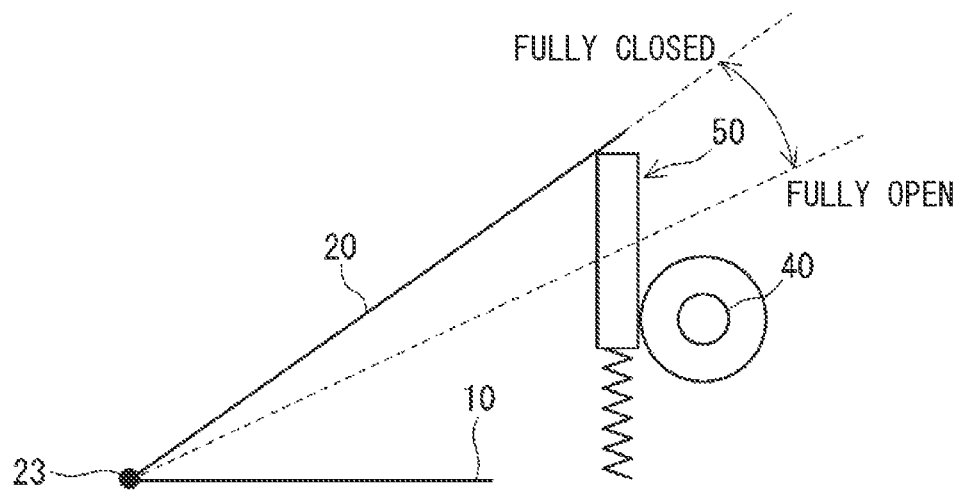
FIG. 60A is a schematic diagram illustrating a state in which the pedal lever and the power transmission mechanism are in contact with each other in the fully closed state.
Figure 60B:
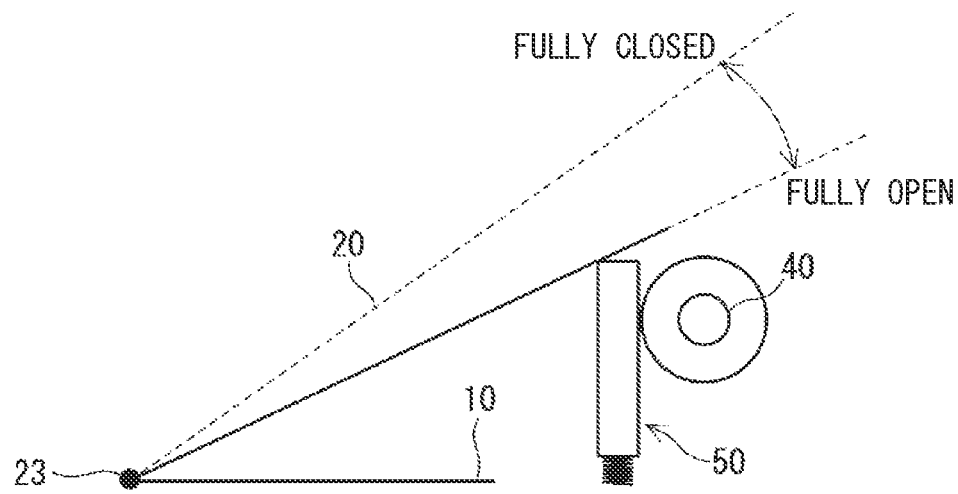
FIG. 60B is a schematic diagram illustrating a state in which the pedal lever and the power transmission mechanism are in contact with each other in the fully open state.

In FIGS. 60A and 60B, the power transmission mechanism 50 is brought into contact with the pedal lever 20 under a biasing force of a biasing member such as a spring and, in the entire region from the fully closed position to the fully open position, the pedal lever 20 and the power transmission mechanism 50 integrally move. In a case of such a configuration, the biasing force of the biasing member affects the depressing force. As illustrated in FIGS. 58A, 58B, 59A, and 59B, when the pedal lever 20 and the power transmission mechanism 50 integrally move, it is possible to exert the reaction force with high responsiveness.

Figure 61A:
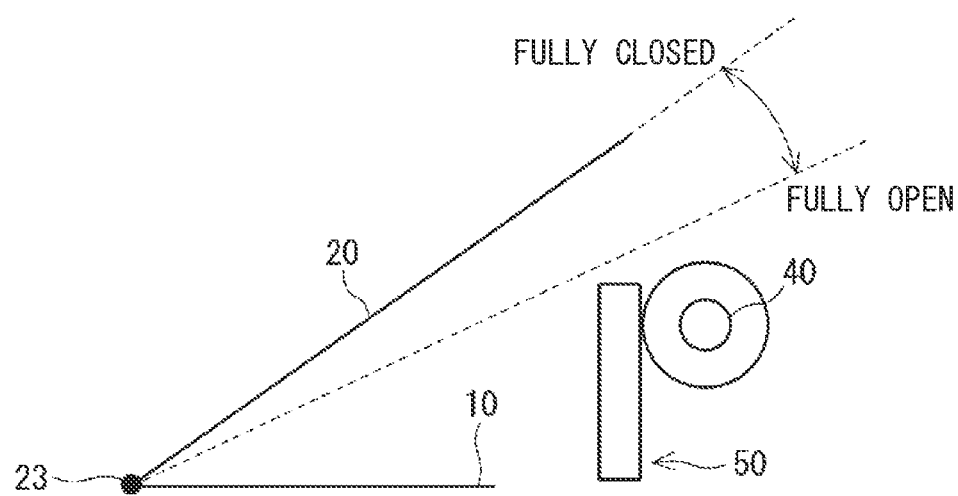
FIG. 61A is a schematic diagram illustrating that the pedal lever and the power transmission mechanism are separable from each other in the fully closed state.
Figure 61B:
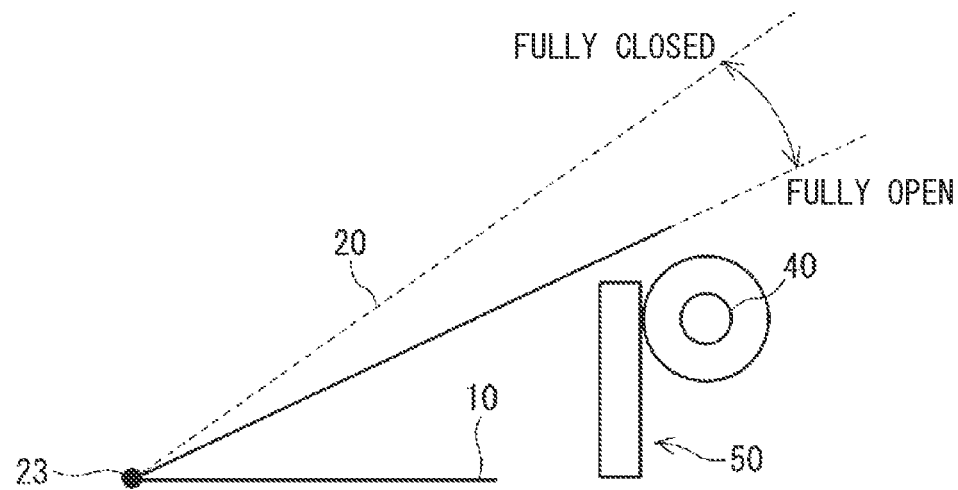
FIG. 61B is a schematic diagram illustrating that the pedal lever and the power transmission mechanism are separable from each other in the fully open state.

In FIGS. 61A and 61B, the power transmission mechanism 50 is provided to be separable from the pedal lever 20 in the entire region from the fully closed position to the fully open position. As a result, it is possible to avoid effects of the power transmission mechanism 50 on the depressing force when no reaction force is exerted, and exert the reaction force to the pedal lever 20 only when the reaction force is required. According to a need such as whether emphasis is to be placed on the responsiveness or whether emphasis is to be placed on the effects on the reaction force, it is possible to appropriately choose a connection/relationship between the pedal lever 20 and the power transmission mechanism 50.

Note that FIGS. 54 to 61B illustrate an outline of the power transmission mechanism, the locking mechanism, and the like in the present description, and also include description of a concept of embodiments described later. In FIGS. 54 to 61B, numbers corresponding to the present embodiments are assigned for the sake of convenience, though not all the assigned numbers correspond to the present embodiments.

The motor 40 serving as a reaction-force-exerting drive source actively drives the pedal lever 20 in the returning direction to exert the reaction force at a point at which, when the pad 21 is depressed, fuel cost deterioration is determined on the basis of, e.g., a driving situation and thereby produce a feeling of a wall and inhibit the driver from depressing on the pad 21. Thus, the fuel cost can be improved. Meanwhile, pulse-driving of the pedal lever 20 in the returning direction can be used as transmission of information such as a notification of switching from automated driving to manual driving. Moreover, during automated driving or the like, by locking the pedal lever 20 and allowing the pad 21 to be used also as the footrest, it is possible to ensure comfort.

Returning back to FIG. 1, the power transmission mechanism 50 includes a feed screw 51, a holder 52, a rod 53, a reaction-force-adjustment biasing member 54, and the like. The feed screw 51, the holder 52, and the reaction-force-adjustment biasing member 54 are contained in a housing 55. The housing 55 is formed in a substantially cylindrical shape, and provided adjacent to or integrally with the case 10 on a side opposite to a side provided with the supporting point member 23. On a side of the housing 55 opposite to the pad 21, the motor 40 is provided.

In a motor-side surface of the housing 55, a motor shaft insertion hole 551 through which a motor shaft is to be inserted is formed. In a pad-side surface of the housing 55, a rod insertion hole 552 through which a shaft portion 532 of the rod 53 is to be inserted is formed. In the housing 52, a position sensor 49 that detects a position of the holder 52 is provided. The position sensor 49 can be placed at any position at which a position of a member which varies when the reaction force is exerted can be detected. In some of the embodiments described later, illustration of the position sensor is omitted.

The feed screw 51 is a male thread, and is rotatably driven by the motor 40. The holder 52 is formed in a substantially bottomed cylindrical shape opening on a rod 53 side. In a bottom portion of the holder 52, a female thread portion 521 that meshes with the feed screw 51 is formed. Rotation of the feed screw 51 by the motor 40 allows the holder 52 to move in an axial direction of the feed screw 51. On the rod 53 side of the holder 52, a stopper portion 522 capable of coming into contact with the rod 53 is formed. It may also be possible to provide a female thread on a feed screw 51 side and provide the male thread on a holder 52 side. Male threads and female threads according to the embodiments described later may also be interchanged with each other.

The rod 53 has a top portion 531 and the shaft portion 532, and is formed in a substantially letter-T shape when viewed in side view. The top portion 531 is contained in the housing 55, while the shaft portion 532 projects from the rod insertion hole 552 toward the pad 21. A leading end of the shaft portion 532 is formed in an arc shape when viewed in side view, and comes into contact with the pad 21. The reaction-force-adjustment biasing member 54 is a compression coil spring having one end contained in the holder 52 and another end in contact with the top portion 531 of the rod 53.

As illustrated in FIG. 1, in an initial state corresponding to the accelerator fully closed state, the top portion 531 of the rod 53 is pressed against the pad-side end surface of the housing 55 by the reaction-force-adjustment biasing member 54. In addition, in the initial state, the holder 52 is relatively located on the motor 40 side.

As illustrated in FIG. 2, when the pad 21 is depressed, the depressing force causes the rod 53 to move toward the holder 52. When the motor 40 is driven to drive the holder 52 toward the rod 53, the biasing force of the reaction-force-adjustment biasing member 54 allows the reaction force to be exerted in the returning direction for the pedal lever 20. The ECU 99 controls the driving of the motor 40 on the basis of the detection value from the position sensor 49 to control a holder position, and can thus adjust the reaction force to be exerted to the pedal lever 20.

As illustrated in FIG. 3, when the motor 40 is driven in the accelerator fully closed state to drive the holder 52 to a position at which the stopper portion 522 and the top portion 531 of the rod 53 come into contact with each other, the pedal lever 20 is locked. In the drawing, movement of the holder 52 or the like is indicated by the dot-dash-line arrow. The same applies also to the embodiments described later.

In the present embodiment, the feed screw 51 and the holder 52 have a bolt-nut relationship therebetween, and accordingly the holder 52 is held at a position at which the power distribution to the motor 40 is turned OFF. In other words, even when the power distribution to the motor 40 is turned OFF in a state in which the holder 52 and the rod 53 are in contact and the pad 21 is depressed by the driver in this state, the holder 52 is not pushed back, and the locked state is held. Meanwhile, by driving the motor 40 in a reverse direction and separating the holder 52 and the rod 53 from each other, the locked state is removed.

As described above, the accelerator device 1 includes the pedal lever 20, the motor 40 serving as at least one drive source, the power transmission mechanism 50, and the locking mechanism 501. The pedal lever 20 operates in response to the depressing operation. Specifically, the pedal lever 20 includes the pad 21 on which the depressing operation can be performed, the pedal supported to be rotatable with respect to the case 10, and the arm 31 connecting the pad 21 and the pedal 35. The motor 40 can exert the reaction force as a force in the returning direction to the pedal lever 20.

The locking mechanism 501 is capable of regulating the operation of the pedal lever 20. In the present embodiment, the feed screw 51, the holder 52, and the rod 53 are included in the locking mechanism 501. The "being capable of regulating the operation of the pedal lever" mentioned herein is a concept including setting an amount of movement of the pedal lever 20 to zero or setting the amount of movement smaller than that during unlocking in the pedal lever 20 or in the power transmission mechanism 50.

In the accelerator device 1, the accelerator device 1 including both of a depressing force adjustment function using the motor 40 serving as the one drive force and a locking function is implemented in a relatively simple and small-size configuration. For example, when it is intended not to depress the pedal lever 20 for danger warning, improved fuel efficiency, or the like, by increasing the reaction force, it is possible to inhibit the depressing. In addition, the reaction force can be adjusted in response to a request from the driver or according to a vehicle type. Furthermore, by fixing the pedal lever 20 when an accelerator operation is unneeded such as during automated driving, it is possible to allow the pedal lever 20 to be used also as the footrest serving as a rest for a foot or keep the pedal lever 20 from being depressed to prevent a misstep.

The power transmission mechanism 50 includes the reaction-force-adjustment biasing member 54, and transmits the drive force from the motor 40 to the pedal lever 20 via the reaction-force-adjustment biasing member. By thus adjusting an amount of reduction of the reaction-force-adjustment biasing member 54, it is possible to adjust a magnitude of the reaction force.

The motor 40 generates a rotational force. The power transmission mechanism 50 includes a linear motion conversion mechanism that converts the rotational force of the motor 40 into a force in a linear motion direction and the reaction-force-adjustment biasing member 54 provided between the pedal lever 20 and the linear motion conversion mechanism. In the present embodiment, the feed screw 51 and the holder 52 are included in the linear motion conversion mechanism, and the reaction-force-adjustment biasing member 54 is provided between the pedal lever 20 and the holder 52. By converting the rotational force of the motor 40 to the force in the linear motion direction and changing a position of the holder 52, it is possible to extend/contract the reaction-force-adjustment biasing member 54 and increase/reduce the reaction force to be exerted to the pedal lever 20.

The accelerator device 1 includes the position sensor 49 that detects the position of the holder 52 and the ECU 99 that controls the motor 40 on the basis of the detection value from the position sensor 49. The motor 40 is controlled on the basis of the detection value from the position sensor 49. Thus, it is possible to appropriately control the reaction force to be exerted to the pedal lever 20 and the locked state.

The locking mechanism 501 includes the holder 52 and the rod 53. The holder 52 moves in an axial direction of the reaction-force-adjustment biasing member 54 to thereby move to a locking position, and comes into indirect contact with the pedal lever 20 via the rod 53 to thereby regulate the operation of the pedal lever 20. In other words, the locking mechanism in the present embodiment is a press-locking mechanism. In the present embodiment, a position at which the holder 52 and the rod 53 comes into contact with each other corresponds to the "locking position". The axial line" mentioned herein is not strictly limited herein to the axial direction of the reaction-force-adjustment biasing member 54. It is assumed that, in a state in which the reaction-force-adjustment biasing member 54 is compressed, a misalignment which allows the stopper portion 522 to lock the pedal lever 20 is tolerated. The same applies also to the "axial direction", a "perpendicular direction", and the like in the embodiments described later, and a misalignment which allows a function to be implemented is tolerated. In the accelerator fully closed state, by causing the holder 52 to press the pedal lever 20 in the direction of the movement of the pedal lever 20, it is possible to appropriately lock the pedal lever 20. In the second embodiment, the third embodiment, and the fifth embodiment also, the press-locking mechanism is similarly used.

A moving member in the present embodiment is the holder 52, and the power transmission mechanism 50 includes the feed screw 51 and the holder 52. The feed screw 51 is driven by the motor 40, and is having the male thread. The holder 52 is having the female spring that meshes with the feed screw 51. The reaction-force-adjustment biasing member 54 has one end in contact with the rod 53 having one end in contact with the holder 52 and another end in contact with the rod 53 in contact with the pedal lever 20. The holder 52 is having the stopper portion 522 capable of coming into contact with the rod 53, and the rod 53 and the stopper portion 522 come into contact with each other to lock the pedal lever 20.

Since the holder 52 is moved by meshing between the male thread and the female thread, the holder 52 can be positioned without being pushed back by the biasing force of the reaction-force-adjustment biasing member 54. In addition, since the holder 52 is positioned by the meshing between the male thread and the female thread, it is possible to reduce a load on the motor 40. Moreover, since the holder 52 has both of a function of the linear motion conversion mechanism and a function of the locking mechanism, it is possible to simplify the configuration.

The power transmission mechanism 50 includes the linear motion conversion mechanism that converts the rotational force of the motor 40 to the force in the linear motion direction. The rod 53 in the power transmission mechanism 50 is regularly in constant contact with the pedal lever 20. This allows the reaction force to be generated with high responsiveness.

The locking mechanism 501 regulates the operation of the pedal lever 20 at the fully closed position of the pedal lever 20. The locking mechanism 501 is driven by the motor 40 used to exert the reaction force to the pedal lever 20. The locking mechanism 501 is capable of holding a state in which the operation of the pedal lever 20 is regulated in a state in which the power distribution to the motor 40 serving as the drive source of the locking mechanism 501 is OFF. This can appropriately regulate the operation of the pedal lever 20.

Second Embodiment

Figure 4:
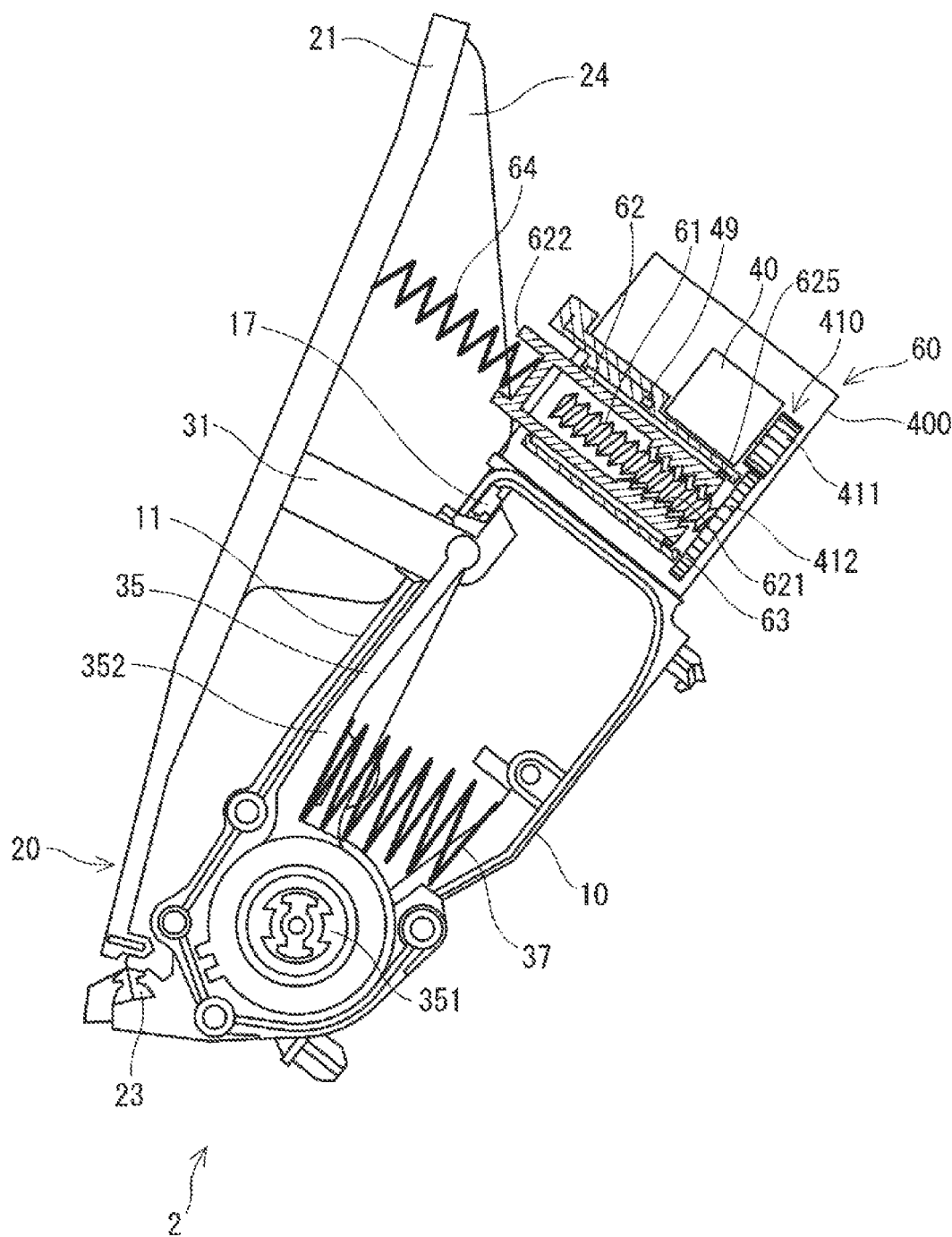
FIG. 4 is a side view of an accelerator device according to a second embodiment.
Figure 5:
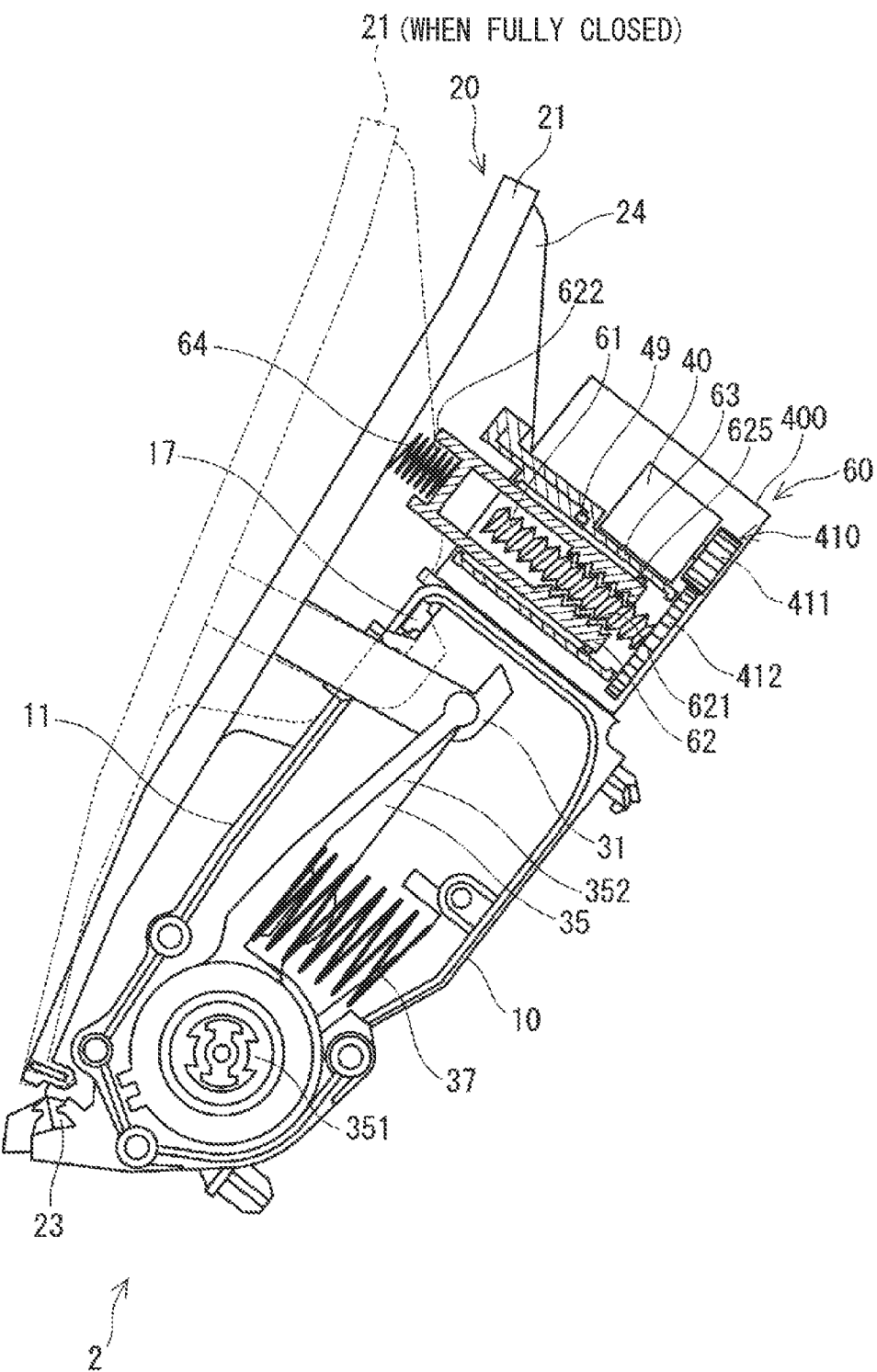
FIG. 5 is a side view illustrating a state in which, in the accelerator device according to the second embodiment, the pedal lever is depressed, and the reaction force is exerted thereto.
Figure 6:
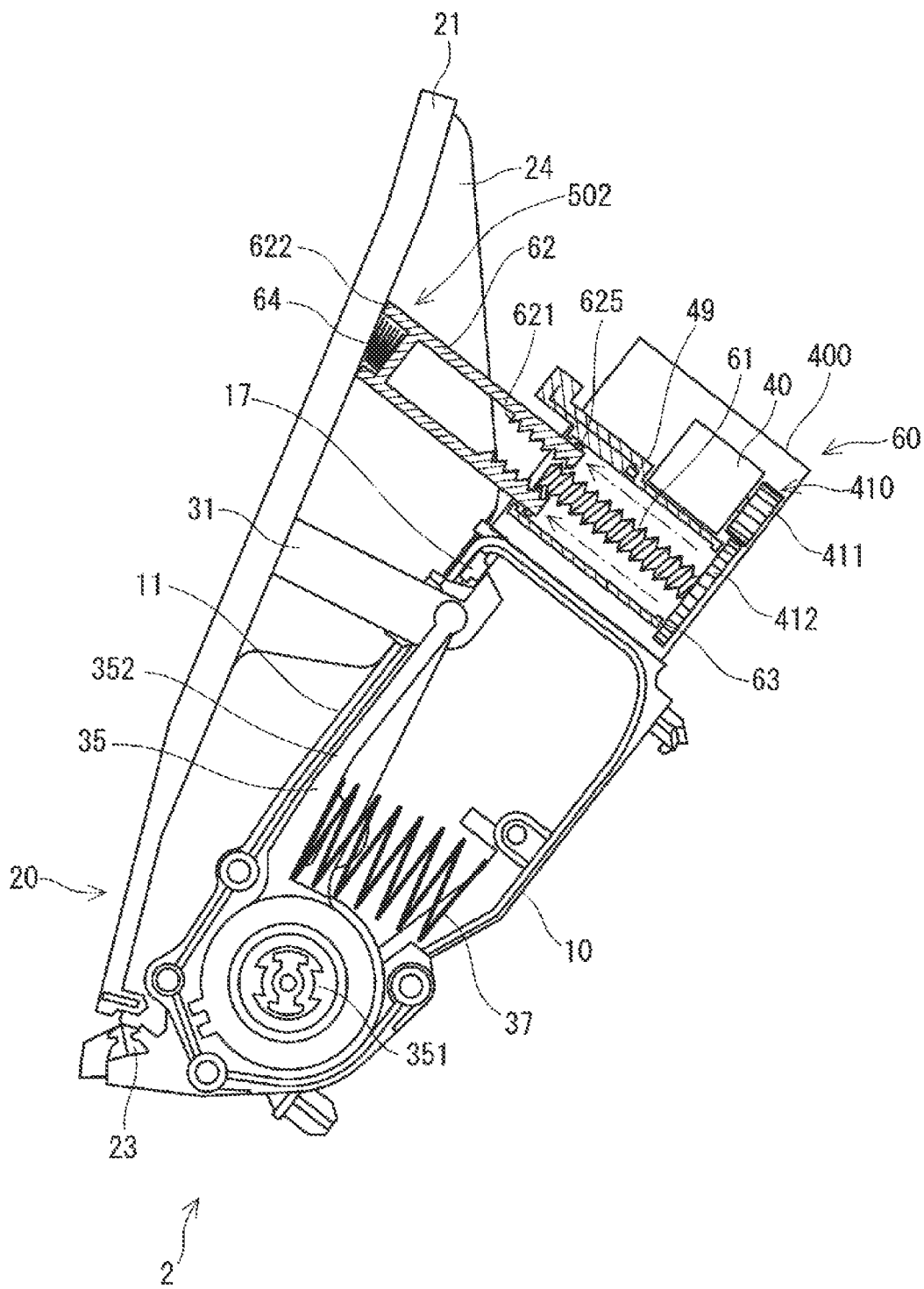
FIG. 6 is a side view illustrating the pedal-locked state in the accelerator device according to the second embodiment.

In each of the second to fifth embodiments, a power transmission mechanism is different from that in the embodiment described above, and accordingly a description will be given with emphasis on this point. The second embodiment is illustrated in FIGS. 4 to 6. A power transmission mechanism 60 of an accelerator device 2 includes a feed screw 61, a holder 62, a cylinder 63, a reaction-force-adjustment biasing member 64, and the like.

The feed screw 61 is a male thread, and is rotatably driven by the motor 40 via a gear mechanism 410. The gear mechanism 410 includes a first gear 411 and a second gear 412. The first gear 411 integrally rotates with the motor 40, and the second gear 412 meshing with the first gear 411 integrally rotates with the feed screw 61. Thus, the feed screw 61 is driven by the motor 40.

The holder 62 is formed in a substantially cylindrical shape, and is provided on a radially inner side of the cylinder 63. A peripheral wall of the holder 62 is formed with guide projections 625 that guide movement of the cylinder 63 in an axial direction. On a radially inner side of the holder 62 and on a gear mechanism 410 side, a female thread portion 621 that meshes with the feed screw 61 is formed. The feed screw 61 is rotated by the motor 40 to allow the holder 62 to move in the axial direction. At an end portion of the holder 62 on a pad 21 side, a stopper portion 622 capable of coming into contact with the pad 21 is formed. The stopper portion 622 is provided on the end surface of the holder 62 on the pad 21 side to erect along an outer diameter. The holder 62 on the pad 21 side is exposed from the cylinder 63 to the pad 21 side.

The feed screw 61 and the holder 62 are contained in the cylinder 63. The cylinder 63 is formed in a substantially cylindrical shape and placed in a motor housing 400 to be parallel to the motor shaft. It is assumed herein that being "parallel" in the present description is not limited to being exactly parallel, and a misalignment equivalent to an assembly error is tolerated. An end surface of the cylinder 63 on the gear mechanism 410 side is formed with a hole portion through which the feed screw 61 can be inserted, while an end surface of the cylinder 63 on the pad 21 side is formed to allow the holder 62 to be inserted therethrough. In the cylinder 63, the position sensor 49 that detects a position of the holder 62 is provided.

The reaction-force-adjustment biasing member 64 is a compression coil spring having one end placed on a radially inner side of the stopper portion 622 of the holder 62 and another end in contact with and fixed to the pad 21. In other words, in the present embodiment, the rod in the embodiment described above is omitted, and the reaction-force-adjustment biasing member 64 directly pushes the pad 21.

FIG. 4 illustrates an initial state when the accelerator is fully closed. In the initial state, the female thread portion 621 of the holder 62 is meshing with the feed screw 61 at a position as close as possible to the gear mechanism 410. As illustrated in FIG. 5, when the pad 21 is depressed, the depressing force compresses the reaction-force-adjustment biasing member 64. In addition, when the motor 40 is driven to drive the holder 62 toward the pad 21, the reaction-force-adjustment biasing member 64 is further compressed, which allows a biasing force of the reaction-force-adjustment biasing member 64 to exert the reaction force in the returning direction for the pedal lever 20.

As illustrated in FIG. 6, when the motor 40 is driven in the accelerator fully closed state to drive the holder 62 to a position at which the holder 62 and the pad 21 come into contact with each other, the pedal lever 20 is locked. In the present embodiment, in the same manner as in the embodiment described above, the feed screw 61 and the holder 62 have a bolt-nut relationship therebetween and therefore, by turning OFF the power distribution to the motor 40 in a state in which the pad 21 and the holder 62 are in contact with each other, it is possible to hold the locked state with no power distribution. Meanwhile, by driving the motor 40 in the reverse direction and separating the holder 62 from the pad 21, the locked state is removed.

In the present embodiment, the moving member is the holder 62, and the linear motion conversion mechanism includes the feed screw 61 and the holder 62. The feed screw 61 is driven by the motor 40, and is formed with the male thread. The feed screw 61 is driven by the motor 40 via the gear mechanism 410. The holder 62 is formed with a female thread that meshes with the feed screw 61.

The reaction-force-adjustment biasing member 64 has one end in contact with the holder 62 and another end in contact with the pedal lever 20. In the holder 62, the stopper portion 622 is formed, and the pedal lever 20 and the stopper portion 622 come into contact with each other to lock the pedal lever 20. In the present embodiment, a position at which the pad 21 and the stopper portion 622 come into contact with each other corresponds to the "locking position", and the feed screw 61 and the holder 62 are included in a locking mechanism 502.

In the present embodiment, the locking mechanism 502 includes the holder 62, and the holder 62 comes into direct contact with the pedal lever 20 to regulate the operation of the pedal lever 20. Such a configuration also achieves the same effects as achieved in the embodiment described above.

Third Embodiment

Figure 7:
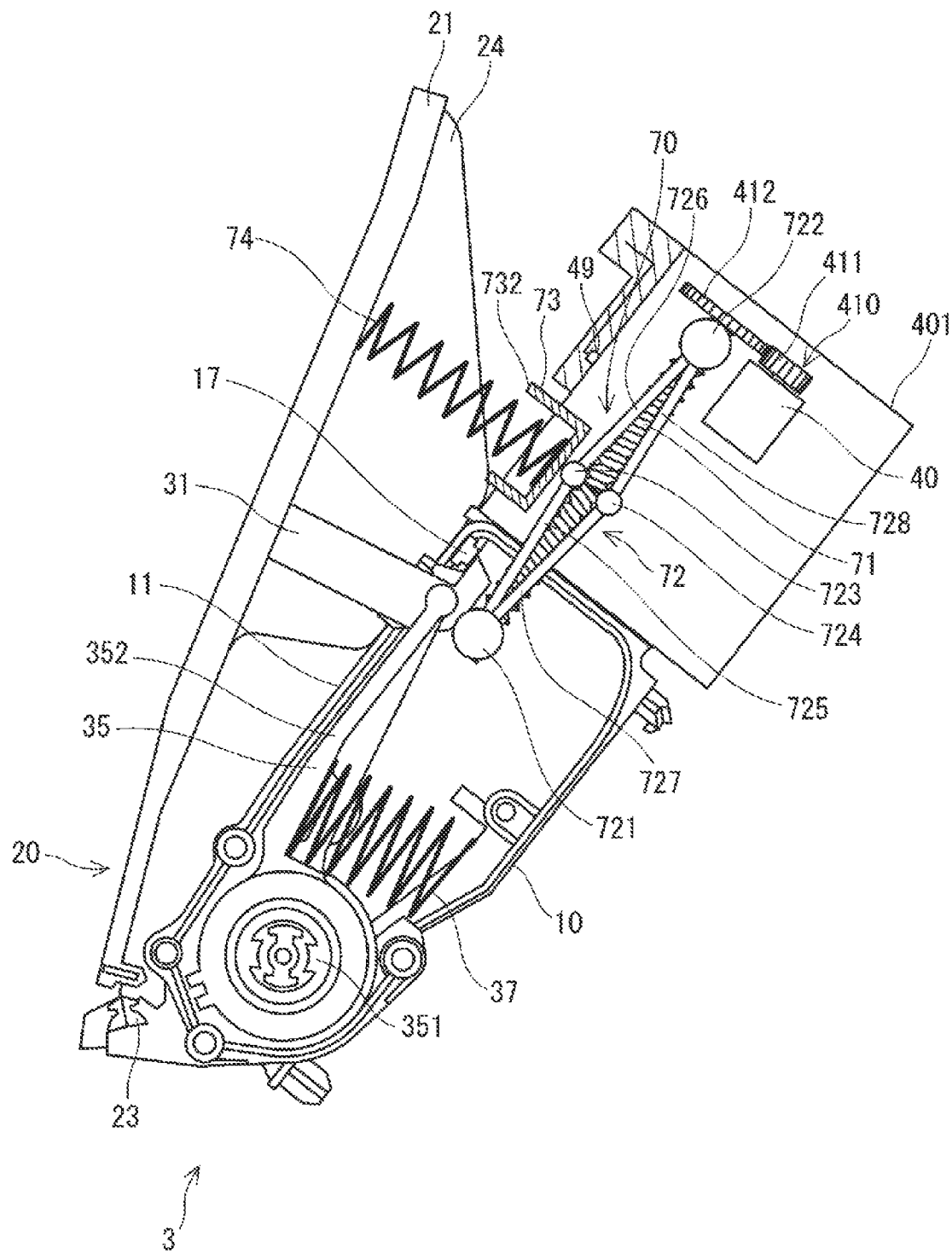
FIG. 7 is a side view of an accelerator device according to a third embodiment.
Figure 8:
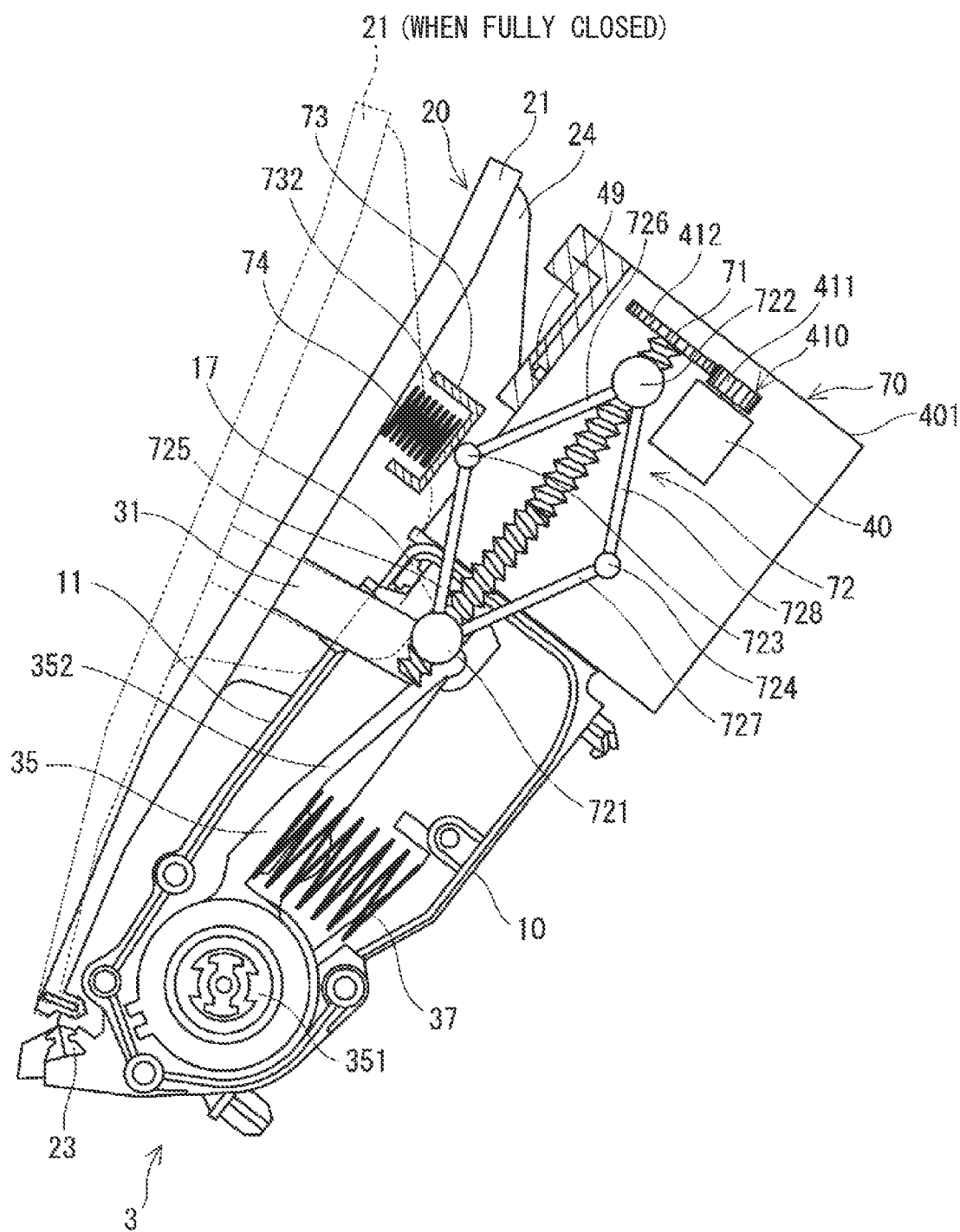
FIG. 8 is a side view illustrating a state in which, in the accelerator device according to the third embodiment, the pedal lever is depressed, and the reaction force is exerted thereto.
Figure 9:
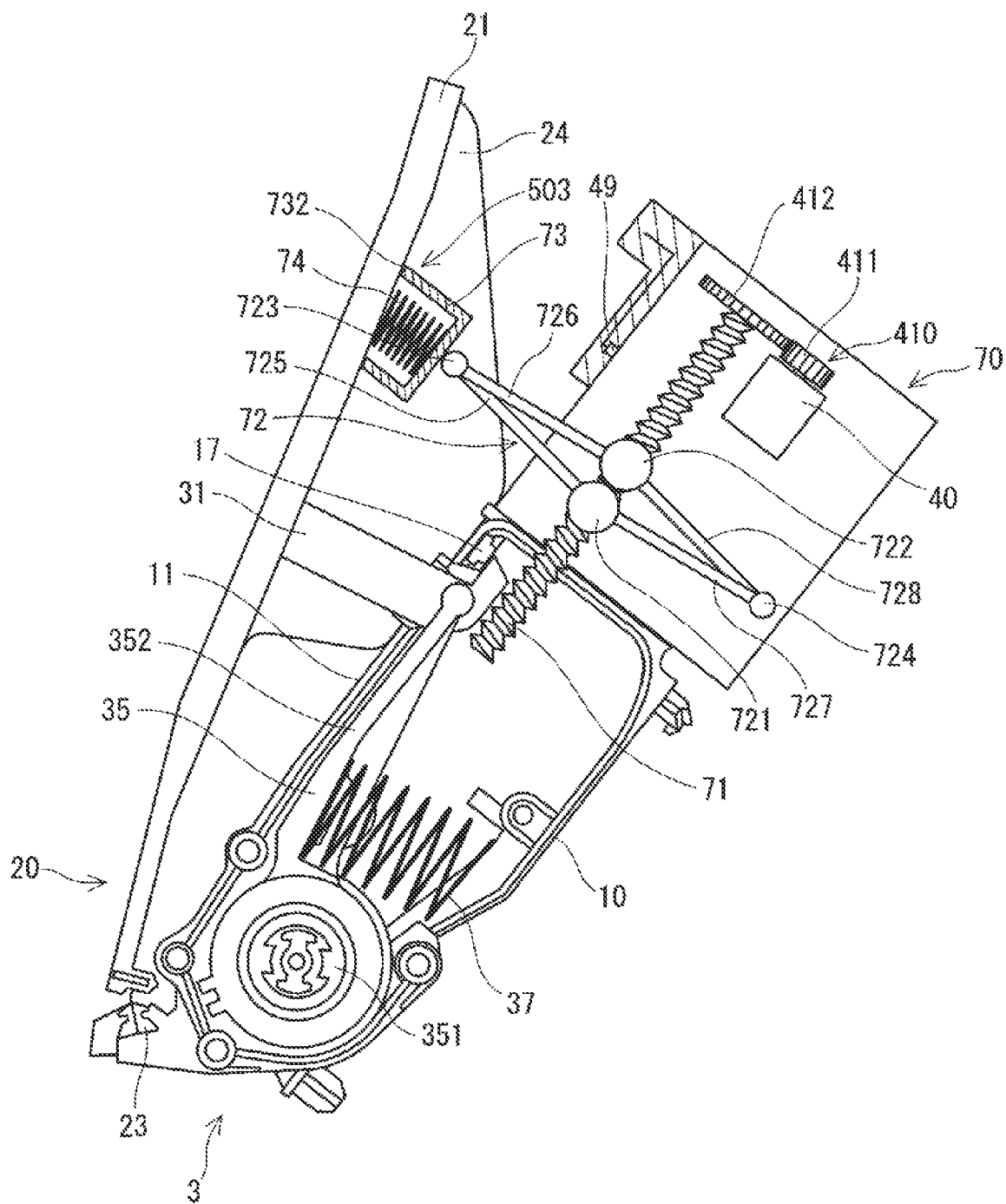
FIG. 9 is a side view illustrating a pedal-locked state in the accelerator device according to the third embodiment.

The third embodiment is illustrated in FIGS. 7 to 9. A power transmission mechanism 70 of an accelerator device 3 includes a feed screw 71, a jack portion 72, a holder 73, a reaction-force-adjustment biasing member 74, and the like. In the present embodiment, the motor shaft and the feed screw 71 are arranged to be substantially parallel to the top wall portion 11 of the case 10. The feed screw 71 and the jack portion 72 are contained in a motor housing 401. In a wall portion of the motor housing 401 on the pad 21 side, an opening which allows the jack portion 72 to be driven is formed.

The feed screw 71 is a male thread, and is rotatably driven by the motor 40 via the gear mechanism 410. The feed screw 71 has threads cut in opposite directions with respect to a middle in an axial direction. The jack portion 72 includes female thread blocks 721 and 722, an upper connecting portion 723, a lower connecting portion 724, and links 725 to 728. The female thread blocks 721 and 722 have female threads formed in inner sides thereof to mesh with the feed screw 71. In the present embodiment, the female thread block 721 is located on a side more distant from the gear mechanism 410 than a center of the feed screw 71, while the female thread block 722 is located on a side closer to the gear mechanism 410 than the center of the feed screw 71.

The female thread blocks 721 and 722 are connected by the link 725, the upper connecting portion 723, and the link 726 on the pad 21 side of the feed screw 71. Meanwhile, the female blocks 721 and 722 are connected by the link 727, the lower connecting portion 724, and the link 728 on a side of the feed screw 71 opposite to the pad 21.

When the feed screw 71 is rotated to one side by the motor 40 to move each of the female thread blocks 721 and 722 to a side closer to a middle of the feed screw 71, each of the connecting portions 723 and 724 moves to a side away from the feed screw 71. Meanwhile, when the feed screw 71 is rotated to another side by the motor 40 to move each of the female thread blocks 721 and 722 to a side away from the middle of the feed screw 71, each of the connecting portions 723 and 724 moves to a side closer to the feed screw 71.

The holder 73 is formed in a substantially cylindrical shape open to the pad 21 side, and is fixed to the upper connecting portion 723. On the pad 21 side of the holder 73, a stopper portion 732 capable of coming into contact with the pad 21 is formed. The reaction-force-adjustment biasing member 74 has one end placed on a radially inner side of the stopper portion 732 of the holder 73 and another end in contact with and fixed to the pad 21. In other words, in the present embodiment, in the same manner as in the second embodiment, the reaction-force-adjustment biasing member 74 directly pushes the pad 21.

FIG. 7 illustrates an initial state when the accelerator is fully closed. In the initial state, the female thread blocks 721 and 722 are located at positions as far as possible. As illustrated in FIG. 8, when the pad 21 is depressed, the depressing force compresses the reaction-force-adjustment biasing member 74. In addition, when the motor 40 is driven to drive the female thread blocks 721 and 722 in a direction of bringing the female thread blocks 721 and 722 closer to each other, the upper connecting portion 723 moves to the pad 21 side to further compress the reaction-force-adjustment biasing member 74. This allows a biasing force of the reaction-force-adjustment biasing member 74 to exert the reaction force in the returning direction for the pedal lever 20.

As illustrated in FIG. 9, when the motor 40 is driven in the accelerator fully closed state to move the female thread blocks 721 and 722 so as to lift the upper connecting portion 723 to a point at which the holder 73 comes into contact with the pad 21, the pedal lever 20 is locked. In the same manner as in the embodiments described above, the feed-screw 71 and the female thread blocks 721 and 722 have a bolt-nut relationship therebetween. Therefore, by turning OFF the power distribution to the motor 40 in a state in which the pad 21 and the holder 73 are in contact, it is possible to hold the locked state with no power distribution. Meanwhile, by driving the motor 40 in the reverse direction and bringing the holder 73 away from the pad 21, the locked state is removed.

In the present embodiment, the moving member is the holder 73. The linear motion conversion mechanism includes the feed screw 71, the jack portion 72, and the holder 73. The feed screw 71 is driven by the motor 40 and formed with one of a male thread and a female thread having a screw direction reversed in a middle portion. The feed screw 71 is driven by the motor 40 via the gear mechanism 410.

The jack portion 72 incudes the female thread blocks 721 and 722 serving as screw blocks and the connecting portions 723 and 724. The female thread blocks 721 and 722 are provided on both sides of the feed screw 71 with the middle portion thereof being interposed therebetween, and are formed with female threads meshing with the feed screw 71. The connecting portions 723 and 724 connect the links 725 to 728 to be connected to the female thread blocks 721 and 722 to each other. The holder 73 is fixed to the connecting portion 723 provided on the pedal lever 20 side of the feed screw 71.

The reaction-force-adjustment biasing member 74 has one end in contact with the holder 73 and another end in contact with the pedal lever 20. In the holder 73, the stopper portion 732 capable of coming into contact with the pedal lever 20 is formed, and the pedal lever 20 and the stopper portion 732 come into contact with each other to lock the pedal lever 20. In the present embodiment, a position at which the stopper portion 732 and the pad 21 come into contact with each other corresponds to the "locking position". In the present embodiment, the feed screw 71, the jack portion 72, and the holder 73 are included in the locking mechanism 503. Such a configuration also achieves the same effects as achieved in the embodiments described above.

Fourth Embodiment

Figure 10:
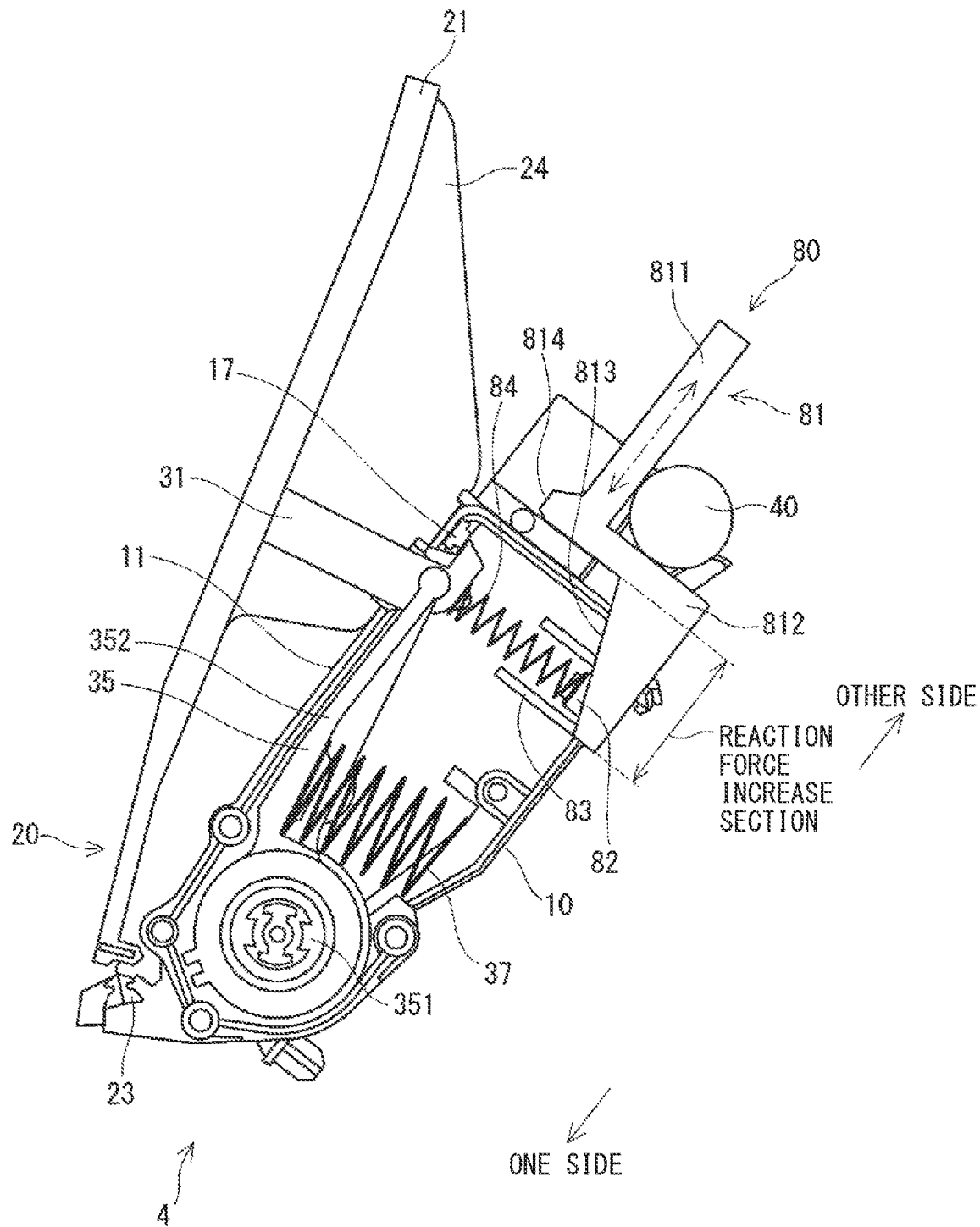
FIG. 10 is a side view of an accelerator device according to a fourth embodiment.
Figure 11:
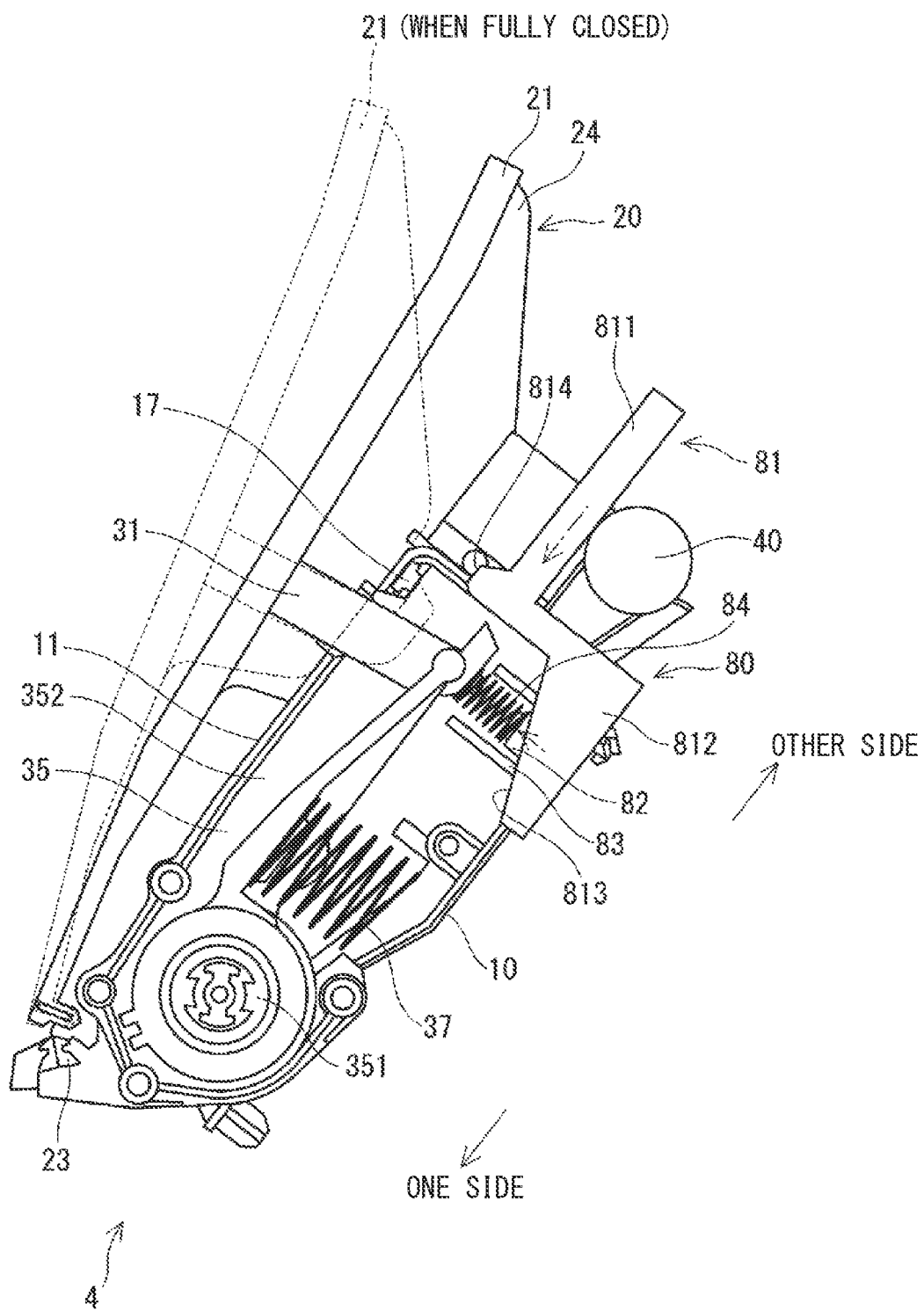
FIG. 11 is a side view illustrating a state in which, in the accelerator device according to the fourth embodiment, the pedal lever is depressed, and the reaction force is exerted thereto.
Figure 12:
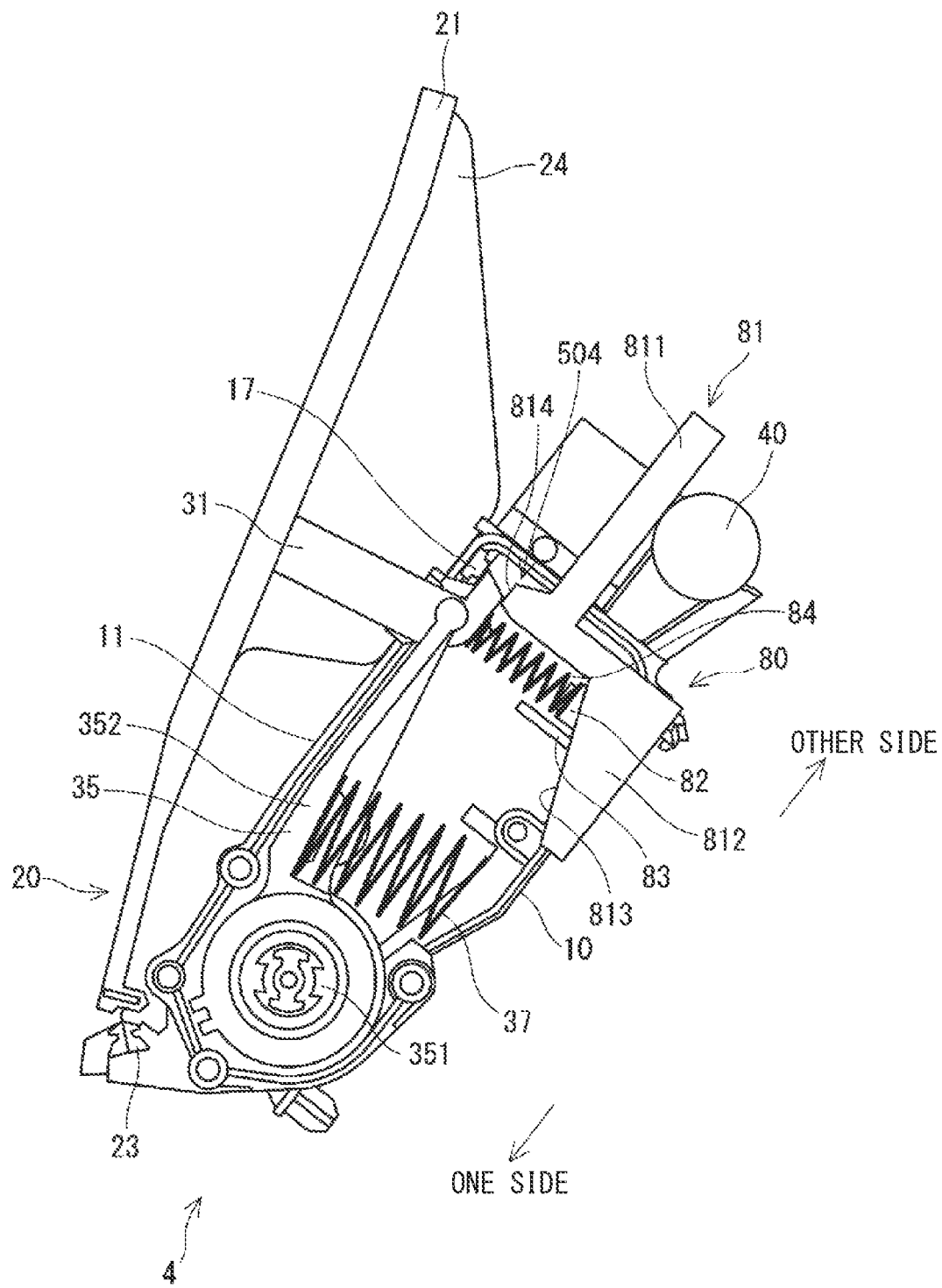
FIG. 12 is a side view illustrating the pedal-locked state in the accelerator device according to the fourth embodiment.

The fourth embodiment is illustrated in FIGS. 10 to 12. A power transmission unit 80 of an accelerator device 4 includes a slider member 81, a holder 82, a holder guide member 83, a reaction-force-adjustment biasing member 84, and the like. The slider member 81 includes a rack gear portion 811, a slider portion 812, and a stopper portion 814. The rack gear portion 811 is provided to be able to move the slider member 81 in a lateral direction crossing a rotating direction of the pedal lever 20 with rotation of the motor 40. In the present embodiment, it is assumed that a supporting member 23 side is one side, while a leading end side of the pad 21 is another side The slider portion 812 is formed in a substantially letter-L shape from a one-side end portion of the rack gear portion 811. On the pad 21 side of the slider portion 812, an inclined surface 813 is formed at a distance to the pad 21 which increases as the inclined surface 813 goes further to the one side. The stopper portion 814 is provided to project toward the pad 21 on the one side of the rack gear portion 811 and be able to come into contact with the arm 31.

The holder 82 is provided to be slidable along the inclined surface 813 and movable in an axial direction of the reaction-force-adjustment biasing member 84 with movement of the slider member 81. The holder guide member 83 guides the movement of the holder 82. The reaction-force-adjustment biasing member 84 has one end fixed to the holder 82 and another end in contact with and fixed to the arm 31.

FIG. 10 illustrates an initial state when the accelerator is fully closed. In the initial state, the holder 82 is located on the one side of the slider portion 812. As illustrated in FIG. 11, when the pad 21 is depressed, the depressing force compresses the reaction-force-adjustment biasing member 84. In addition, when the motor 40 is driven to move the slider member 81 to the one side, the holder 82 is lifted toward the arm 31 to further compress the reaction-force-adjustment biasing member 84. This allows a biasing force of the reaction-force-adjustment biasing member 84 to exert the reaction force in the returning direction for the pedal lever 20. In other words, the inclined surface 813 corresponding to a range in which the holder 82 is movable serves as a reaction force increase section.

As illustrated in FIG. 12, when the motor 40 is driven in the accelerator fully closed state to move the slider member 81 to a position in which the arm 31 and the stopper portion 814 come into contact with each other, the pedal lever 20 is locked. Since the arm 31 is brought into contact with and fixed to the slider member 81, even when the motor 40 is turned OFF, the locked state can be held with no power distribution. Meanwhile, when the motor 40 is driven in the reverse direction to move the slider member 81 to the other side, the arm 31 and the stopper 814 are separated from each other to remove the locked state.

In the present embodiment, the slider member 81 as the moving member is included in the linear motion conversion mechanism, and moves in the direction perpendicular to the axial direction of the reaction-force-adjustment biasing member 84 to move to the locking position. By using the slider member 81 as the moving member and pressing the pedal lever 20 in the direction perpendicular to a moving direction of the pedal lever 20, it is possible to lock the pedal lever 20 without placing a load on the motor 40 side. In other words, the locking mechanism in the present embodiment is a slide-lock mechanism.

The moving member is the slider member 81, and the linear motion conversion mechanism includes the slider member 81 and the holder 82. The slider member 81 includes the rack gear portion 811, the slider portion 812, and the stopper portion 814. The rack gear portion 811 is included in a rack and pinion mechanism to be driven by the motor 40. The slider portion 812 is formed with the inclined surface 813. The stopper portion 814 is provided to be able to come into contact with the pedal lever 20.

The holder 82 is provided to be slidable along the inclined surface 813 and movable in the axial direction of the reaction-force-adjustment biasing member 84 with the movement of the slider member 81. The reaction-force-adjustment biasing member 84 has the one end in contact with the holder 82 and the other end in contact with the pedal lever 20. The pedal lever 20 and the stopper portion 814 come into contact with each other to lock the pedal lever 20. A position at which the stopper portion 814 and the arm 31 come into contact with each other corresponds to the "locking" position. In the present embodiment, the slider member 81 is included in a locking mechanism 504. Such a configuration also achieves the same effects as achieved in the embodiments described above.

Fifth Embodiment

Figure 13:
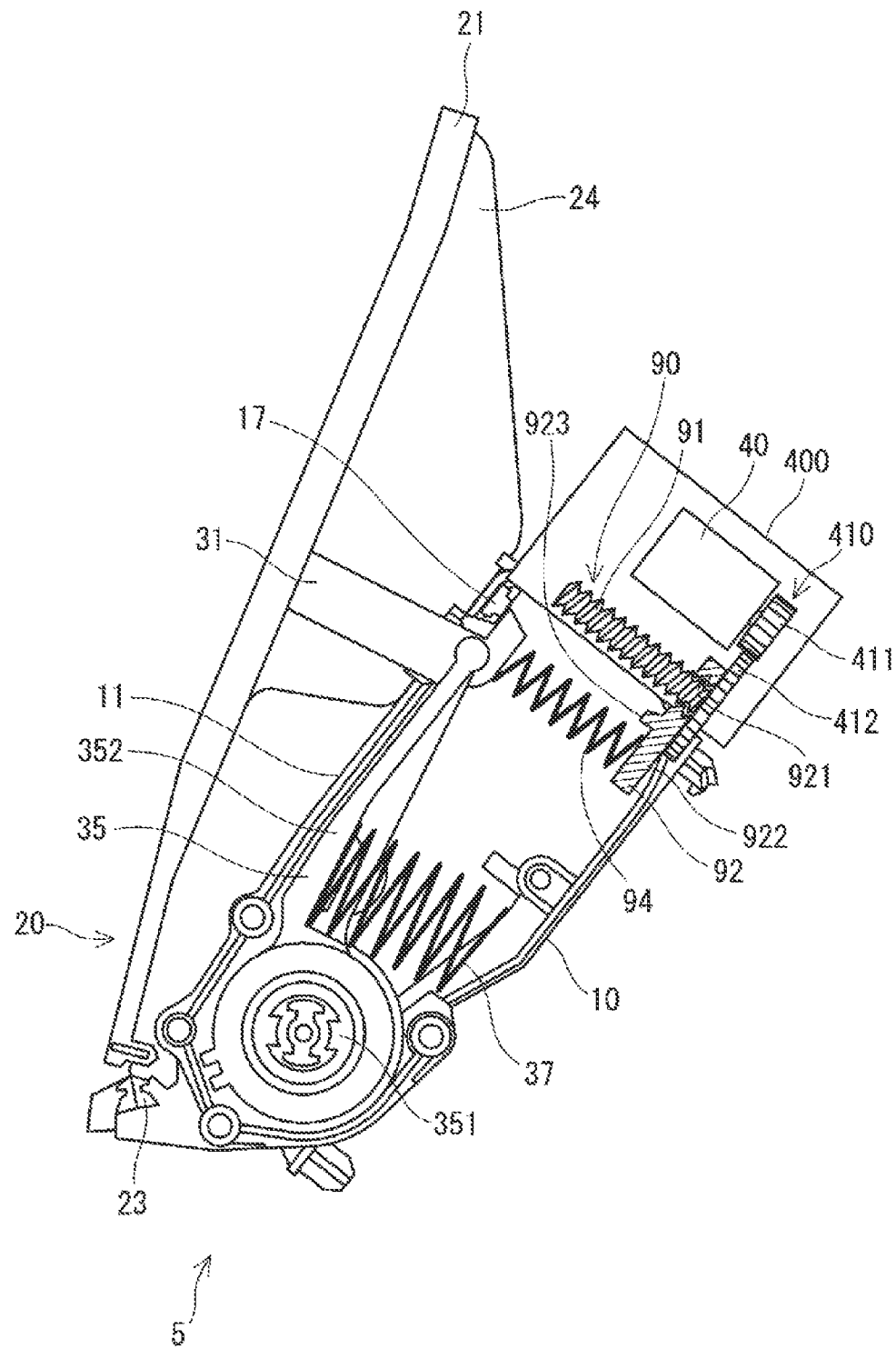
FIG. 13 is a side view of an accelerator device according to a fifth embodiment.
Figure 14:
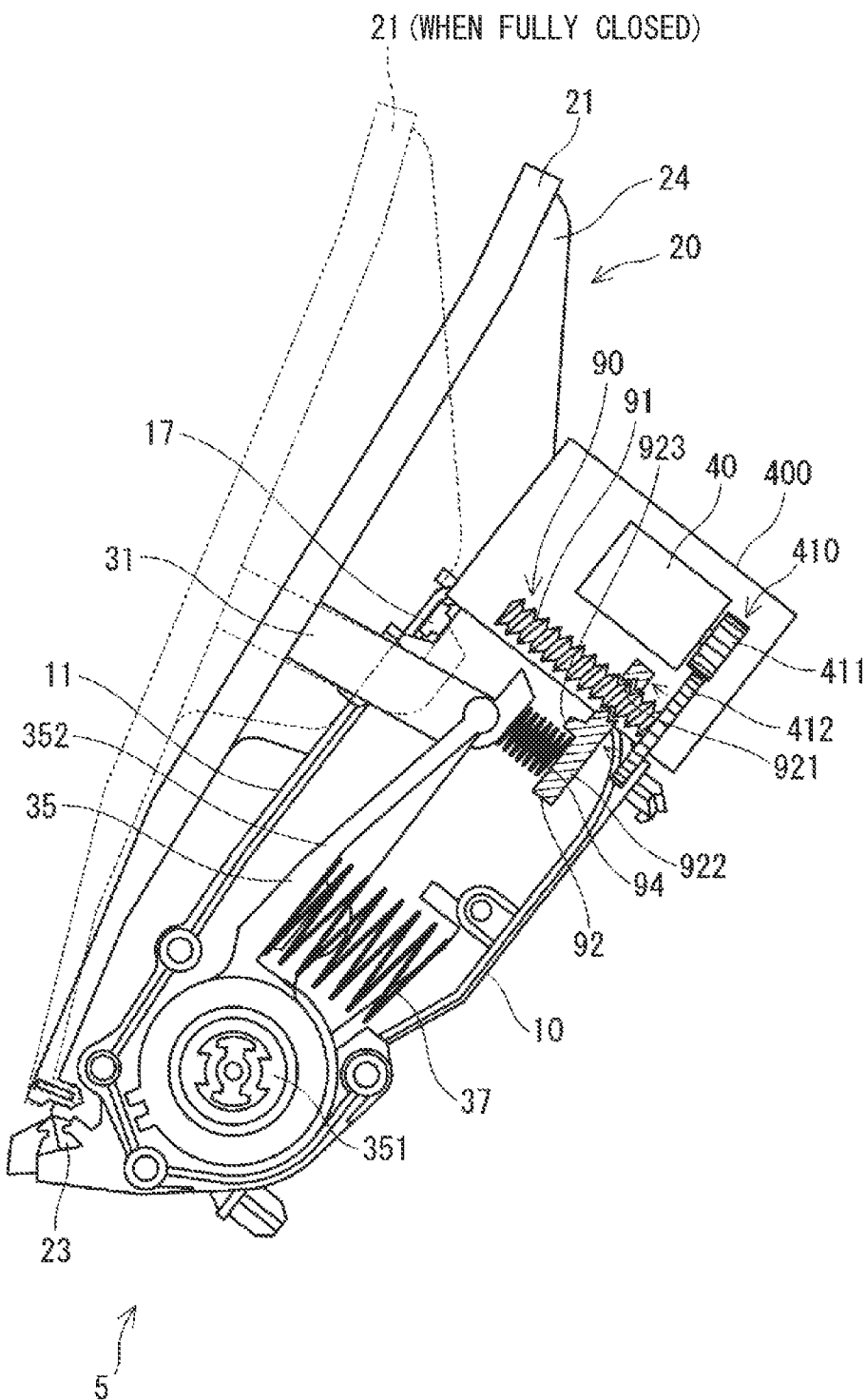
FIG. 14 is a side view illustrating a state in which, in the accelerator device according to the fifth embodiment, the pedal lever is depressed, and the reaction force is exerted thereto.
Figure 15:
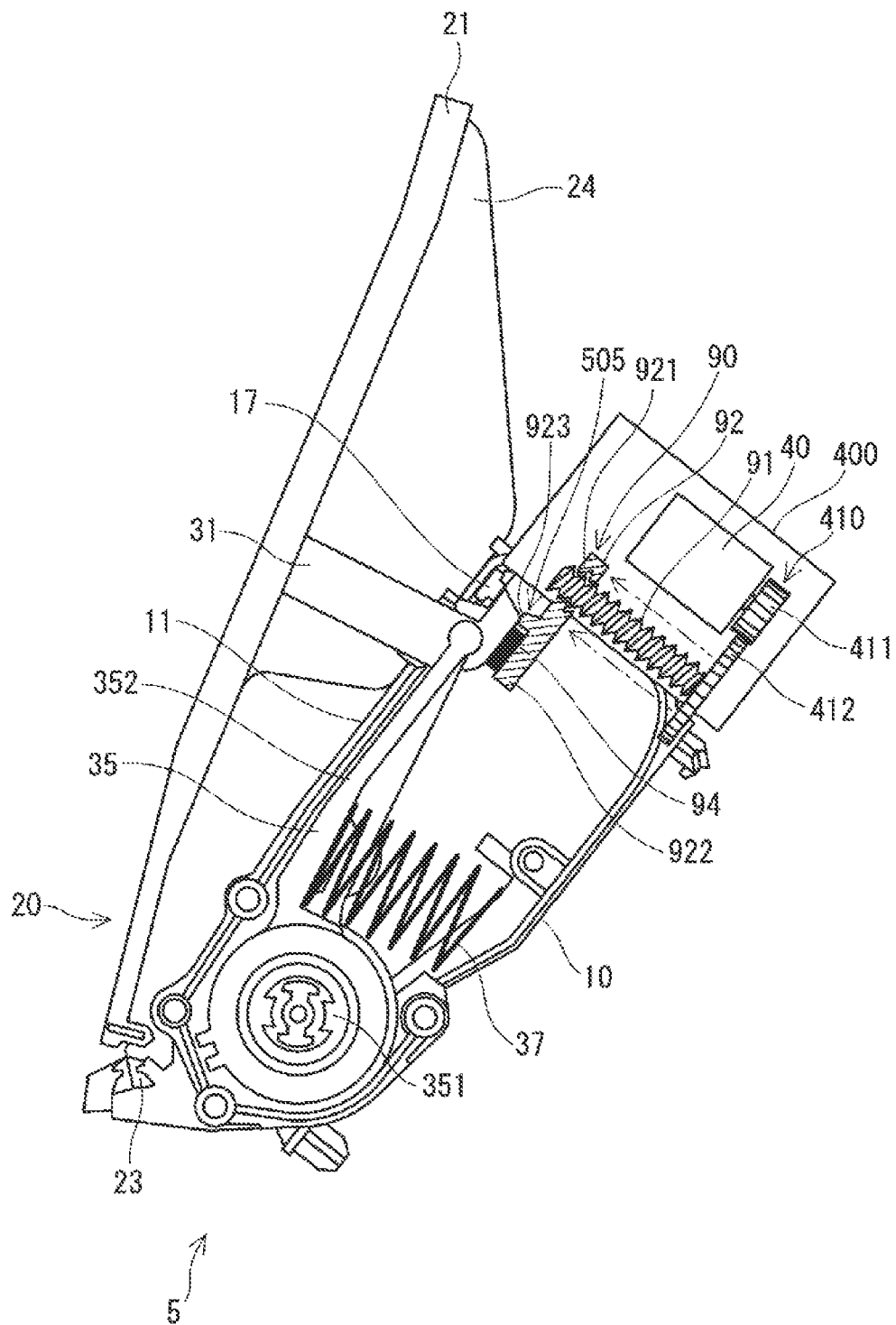
FIG. 15 is a side view illustrating the pedal-locked state in the accelerator device according to the fifth embodiment.

The fifth embodiment is illustrated in FIGS. 13 to 15. A power transmission mechanism 90 of the accelerator device 5 includes a feed screw 91, a holder 92, a reaction-force-adjustment biasing member 94, and the like. The feed screw 91 is placed in the motor housing 400 to be parallel to the motor shaft. The feed screw 91 is a male thread, and is rotatably driven by the motor 40 via the gear mechanism 410. The holder 92 includes a female thread portion 921, an engagement portion 922, and a stopper portion 923. The female thread portion 921 meshes with the feed screw 91, and the feed screw 91 is rotated by the motor 40 to allow the holder 92 to move in an axial direction. The engagement portion 922 is formed to extend to a side of the female thread portion 921 opposite to the motor 40. The stopper portion 923 is provided between the female thread portion 921 and the engagement portion 922 to project toward the pad 21. The stopper portion 923 is formed to be able to come into contact with the arm 31 in the accelerator fully closed state. The reaction-force-adjustment biasing member 94 is a compression coil spring having one end fixed to the engagement portion 922 of the holder 92 and another end in contact with and fixed to the arm 31.

FIG. 13 illustrates an initial state when the accelerator is fully closed. In the initial state, the holder 92 is located at a position as close as possible to the gear mechanism 410. As illustrated in FIG. 14, when the pad 21 is depressed, the depressing force compresses the reaction-force-adjustment biasing member 94. In addition, when the motor 40 is driven to drive the holder 92 toward the pad 21, the reaction-force-adjustment biasing member 94 is further compressed, and consequently a biasing force of the reaction-force-adjustment biasing member 94 allows the reaction force in the returning direction to be exerted to the pedal lever 20.

As illustrated in FIG. 15, when the motor 40 is driven in the accelerator fully closed state to drive the holder 92 to a position at which the stopper portion 923 and the arm 31 come into contact with each other, the arm 31 and the holder 92 are brought into contact with and fixed to each other to lock the pedal lever 20. In the same manner as in the first embodiment and the like, the feed screw 91 and the female thread portion 921 of the holder 92 have a bolt-nut relationship therebetween, and therefore it is possible to hold the locked state in a state in which no power is distributed. Meanwhile, by driving the motor 40 in the reverse direction to separate the holder 92 from the arm 31, the locked state is removed. In the present embodiment, the feed screw 91 and the holder 92 are included in a locking mechanism 505. Such a configuration also achieves the same effects as achieved in the embodiments described above.

Sixth Embodiment

Figure 16:
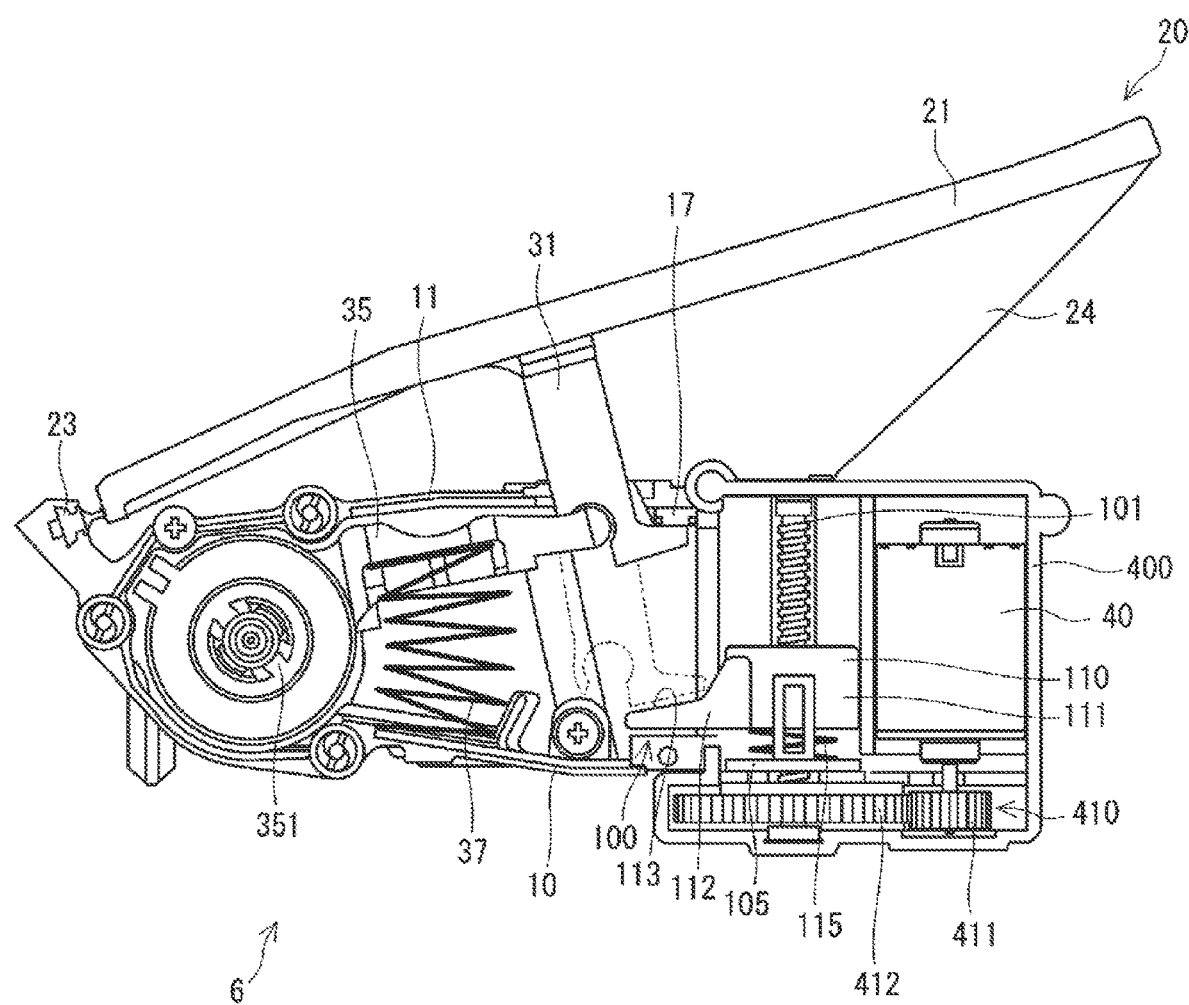
FIG. 16 is a side view of an accelerator device according to a sixth embodiment.
Figure 17:
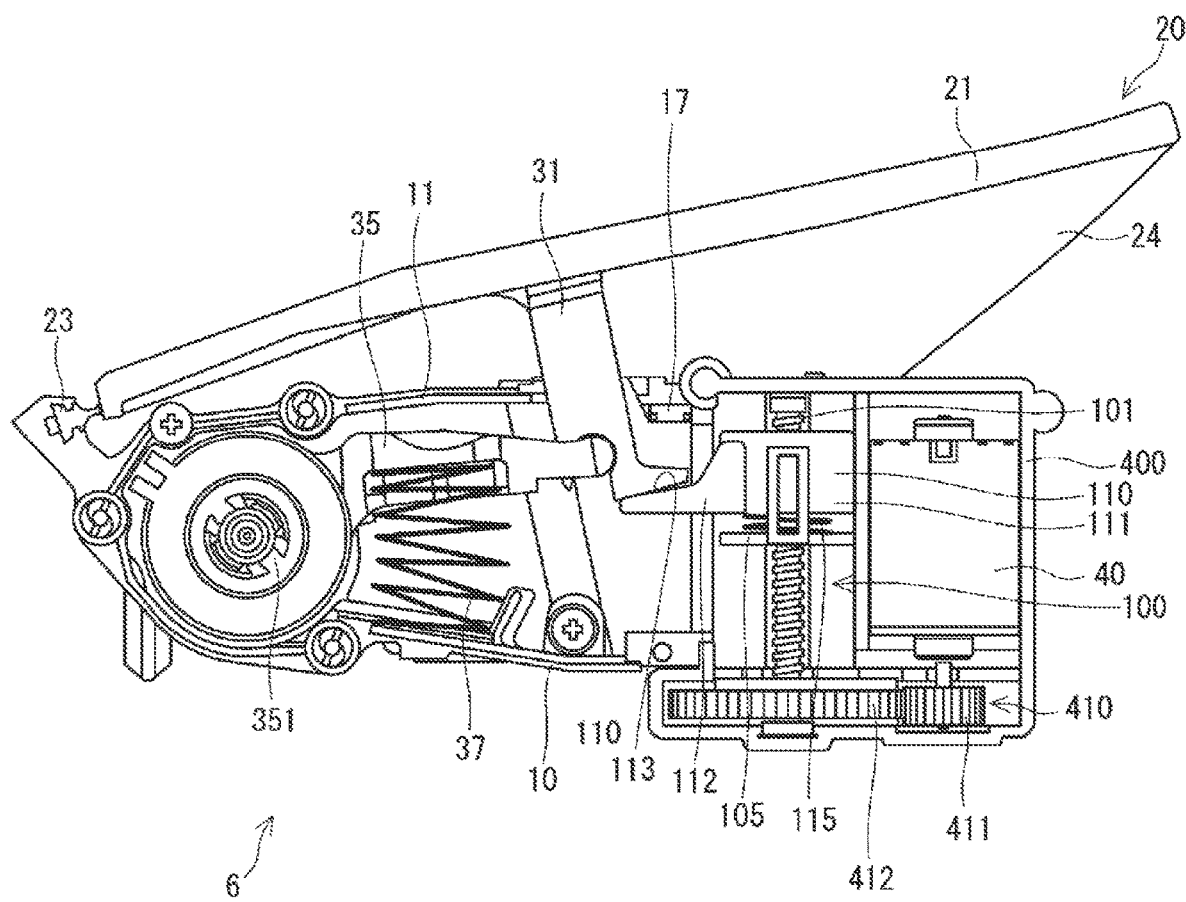
FIG. 17 is a side view illustrating a state in which, in the sixth embodiment, the pedal lever is depressed, and the reaction force is exerted thereto.
Figure 18:
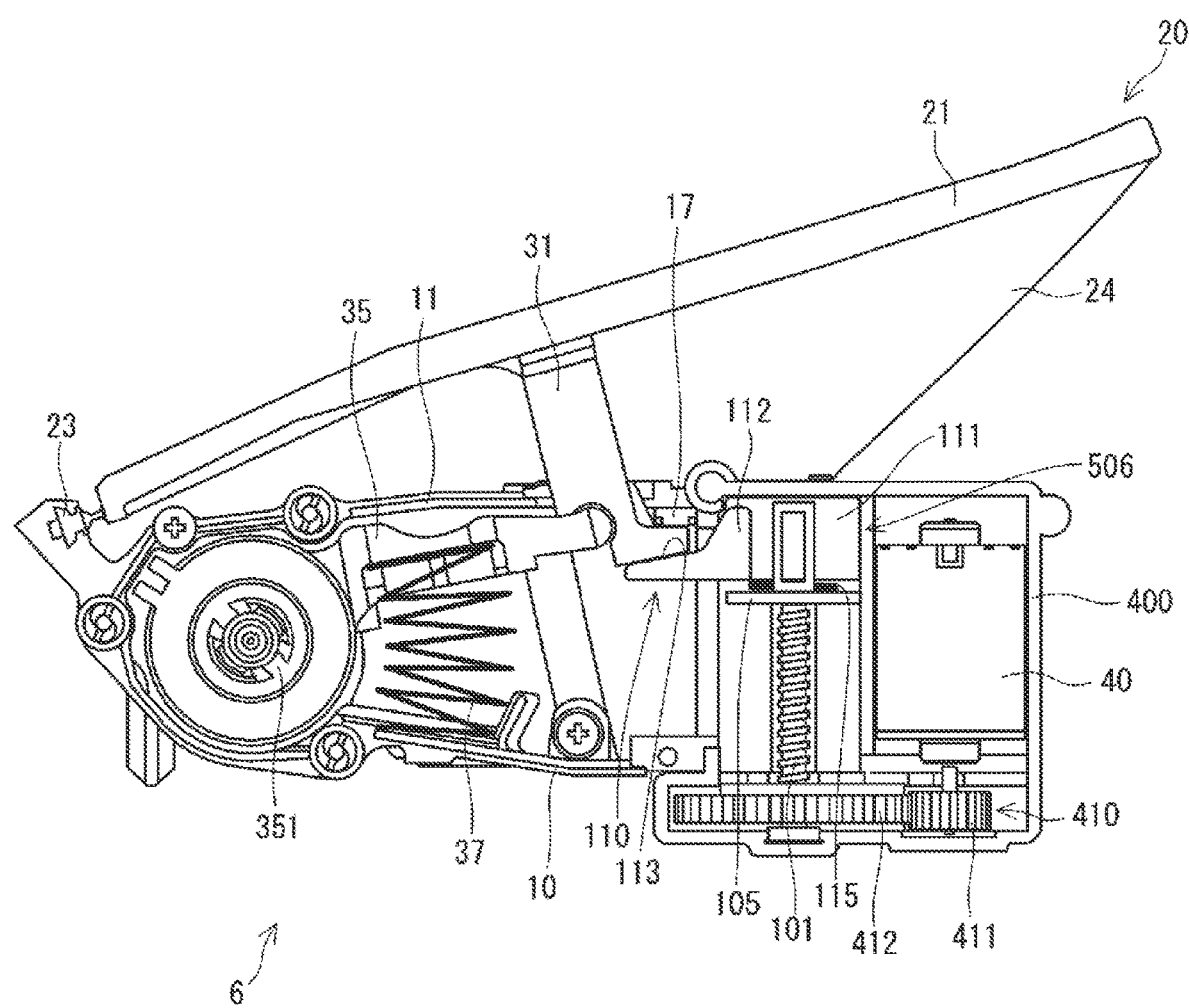
FIG. 18 is a side view illustrating the pedal-locked state in the sixth embodiment.
Figure 19:
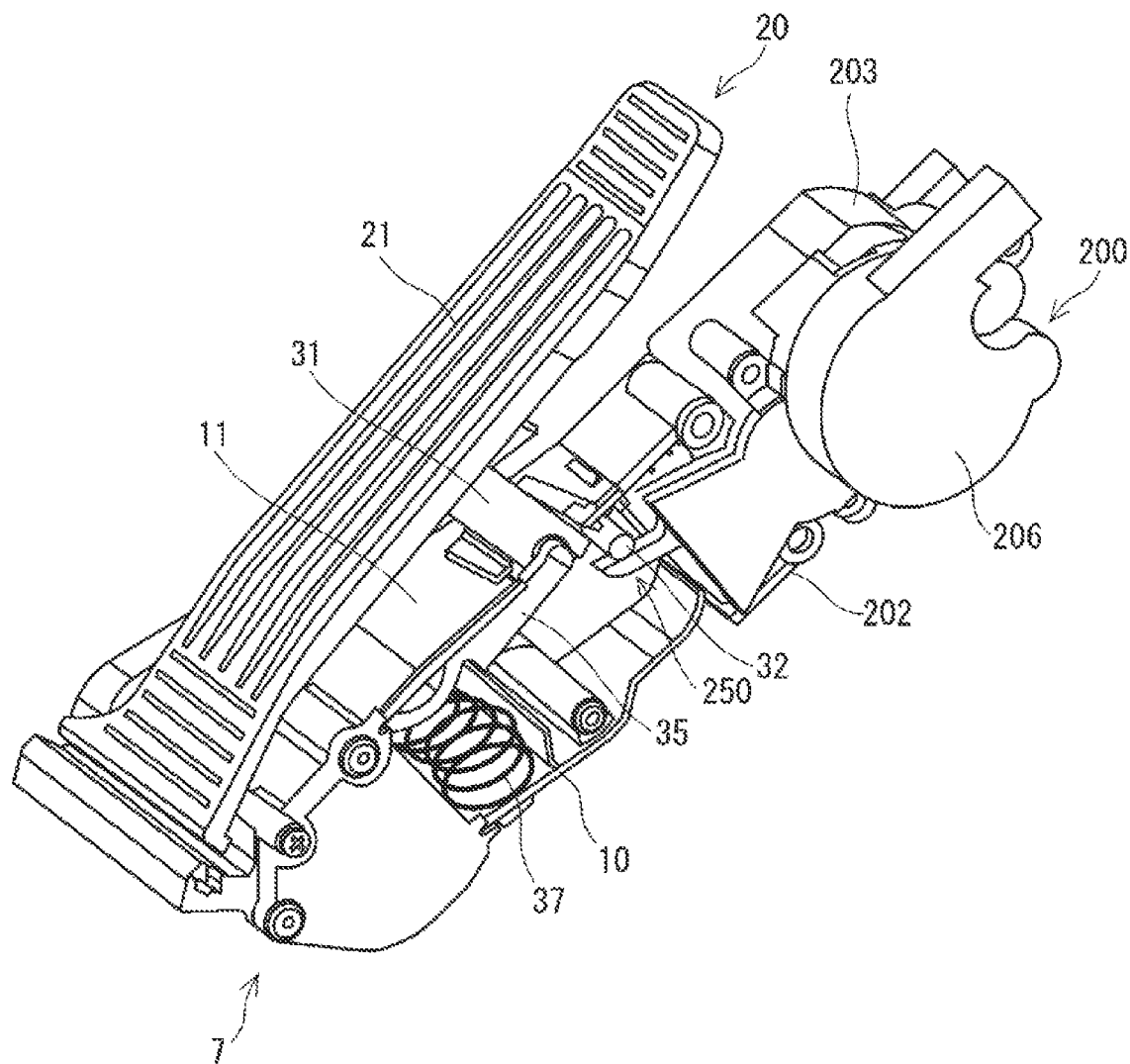
FIG. 19 is a perspective view of an accelerator device according to a seventh embodiment.
Figure 20:
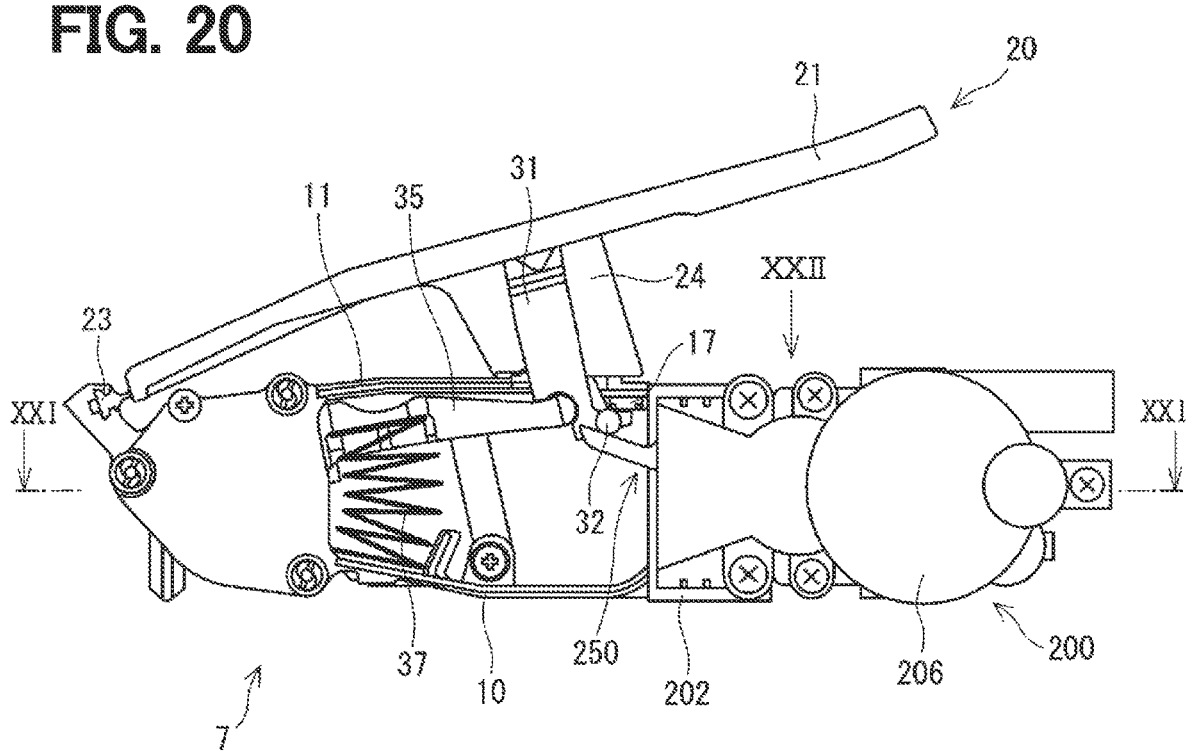
FIG. 20 is a side view of the accelerator device according to the seventh embodiment.

The sixth embodiment is illustrated in FIGS. 16 to 18. A power transmission mechanism 100 of an accelerator device 6 includes a feed screw 101, a holder 105, a slider member 110, a reaction-force-adjustment biasing member 115, and the like. The feed screw 101 is the same as the feed screw 91 in the fifth embodiment, and is placed inside the motor housing 400 to be parallel with the motor shaft and rotatably driven by the motor 40 via the gear mechanism 410.

The holder 105 is formed with a female thread that meshes with the feed screw 101 as a male thread, and holds the reaction-force-adjustment biasing member 115. The slider member 110 includes a spring containing portion 111 and an arm contact portion 112. The holder 105 and the slider member 110 are movable in an axial direction with rotation of the feed screw 101. On a radially inner side of the spring containing portion 111, the reaction-force-adjustment biasing member 115 is contained. The arm contact portion 112 is formed to radially outwardly project from the spring containing portion 111, and is formed with an inclined surface 113 capable of coming into contact with the arm 31. The reaction-force-adjustment biasing member 115 is a compression coil spring having one end fixed to the holder 105 and another end fixed to the slider member 110.

FIG. 16 illustrates a state in which the holder 105 and the slider member 110 are at retracted positions. As indicated by the broken lines, when the holder 105 and the slider member 110 are at the retracted positions, even when the pedal lever 20 is depressed to the fully open position, the arm 31 and the slider member 110 are separate from each other. Accordingly, when no reaction force is exerted, by placing the holder 105 and the slider member 110 at the retracted positions and thereby separating the arm 31 and the slider member 110 from each other, it is possible to avoid a situation in which, in the entire region from the accelerator fully closed position to the accelerator fully open position, a cogging torque of a power transmission mechanism 100 side or the like affects the depressing force.

As illustrated in FIG. 17, when the reaction force is exerted, by driving the motor 40 and rotating the feed screw 101, the holder 105 and the slider member 110 are lifted to bring the inclined surface 113 of the slider member 110 into contact with the arm 31. When the holder 105 is further lifted in a state in which the inclined surface 113 and the arm 31 are in contact, the reaction-force-adjustment biasing member 115 is contracted to allow the reaction force in the returning direction to be exerted to the pedal lever 20.

As illustrated in FIG. 18, when the power transmission mechanism 100 is locked, the holder 105 is lifted to an upper end to cause the slider member 110 to be held between the holder 105 and the motor housing 400. As a result, by a static friction force of the feed screw 101, the power transmission mechanism 100 is locked. Meanwhile, by driving the motor 40 and lowering the holder 105, the locked state is removed.

In the present embodiment, the feed screw 101, the holder 105, the slider member 110, and the motor housing 400 are included in a locking mechanism 506.

The power transmission mechanism 100 in the present embodiment includes the feed screw 101, the holder 105, and the slider member 110. The feed screw 101 is driven by the motor 40, and is formed with one of the male thread and the female thread. The holder 105 is formed with another of the male thread and the female thread that meshes with the feed screw 101. The slider member 110 has the inclined surface 113 that comes into contact with the pedal lever 20. The reaction-force-adjustment biasing member 115 has the one end in contact with the holder 105 and the other end in contact with the slider member 110.

The slider member 110 of the power transmission mechanism 100 comes into contact with the pedal lever 20 when the reaction force is exerted to the pedal lever 20, and is separated from the pedal lever 20 when no reaction force is exerted to the pedal lever 20. Thus, it is possible to prevent a force such as, e.g., the cogging torque of the motor 40 from affecting the pedal lever 20 from a power transmission mechanism 100 side when no reaction force is exerted to the pedal lever 20. In addition, the same effects as achieved in the embodiments described above are achieved.

Seventh Embodiment

The seventh embodiment is illustrated in FIGS. 19 to 33. A power transmission mechanism 200 of an accelerator device 7 includes a motor gear 204, a bevel gear 205, a first spur gear 210, a second spur gear 220, a third spur gear 230, a torsion spring 245, a cam 250, a locking portion 260, and the like, and is driven by a motor 201.

Figure 21:
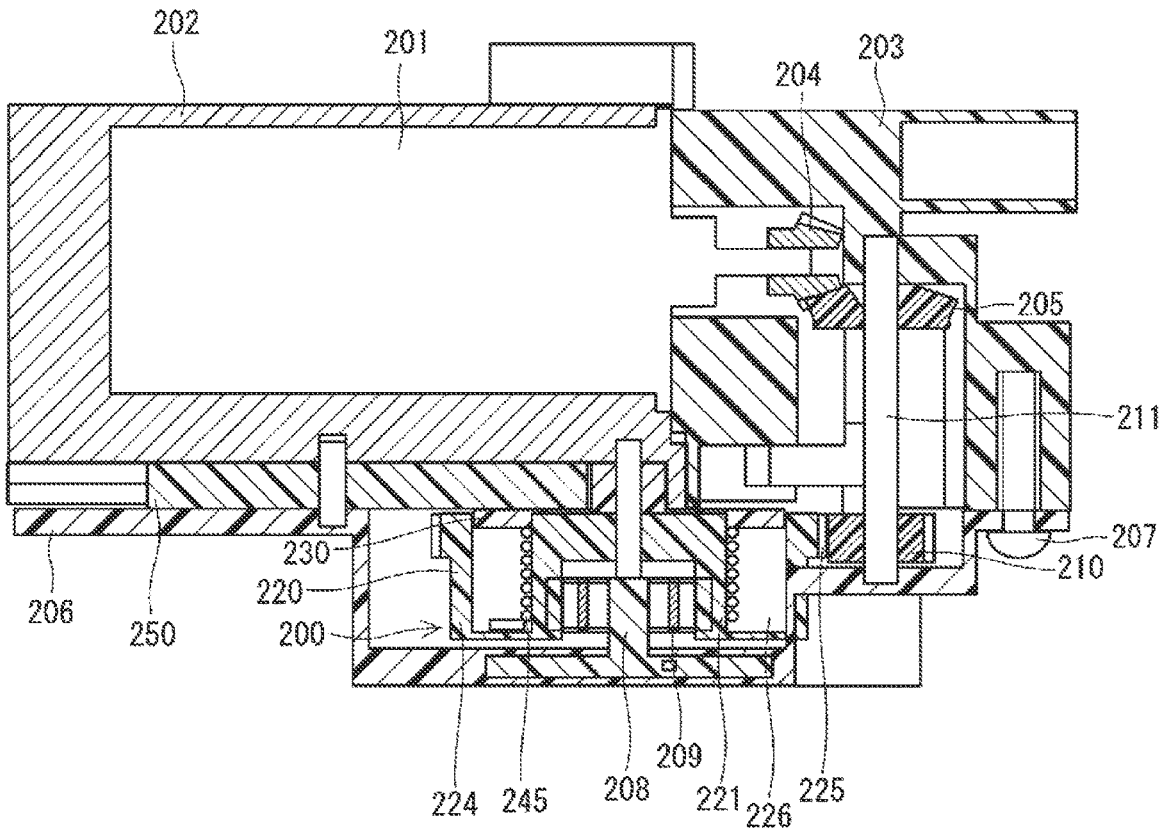
FIG. 21 is a cross-sectional view along a line XXI-XXI in FIG. 20.
Figure 22:
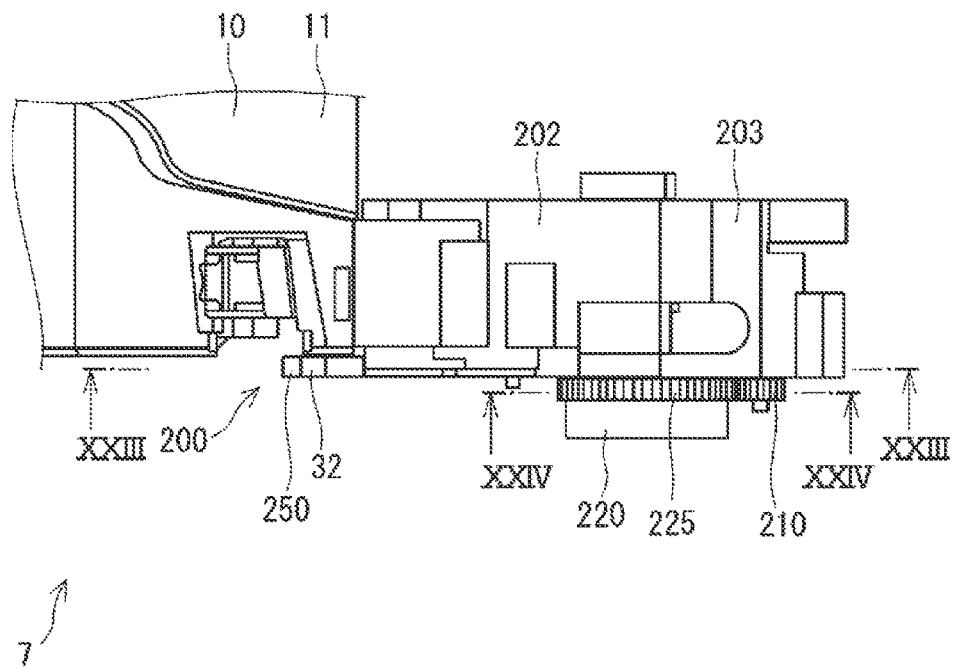
FIG. 22 is a diagram as seen from an arrow XXII direction in FIG. 20.

As illustrated in FIG. 21, the motor 201 is, e.g., a DC motor which generates a rotational force, and is contained in a motor case 202. The motor 201 is provided such that a rotation shaft not shown is substantially parallel with the top wall portion 11 of the case 10.

The bevel gear 205 meshes with the motor gear 204 that rotates integrally with the shaft of the motor 201, and is connected to the first spur gear 210 by a shaft 211. The shaft 211 is rotatably supported by each of a connector case 203 and a gear cover 206.

The gear cover 206 is provided on side surfaces of the motor 201 and the connector case 203 to contain the spur gears 210, 220, and 230, the cam 250, and the like. The gear cover 206 is fixed by a fixing member 207 such as a tapping to each of the connector case 203 and the motor case 202. The gear cover 206 is provided with a rotation angle sensor that detects rotation of the second spur gear 220 and is not shown.

Figure 25:
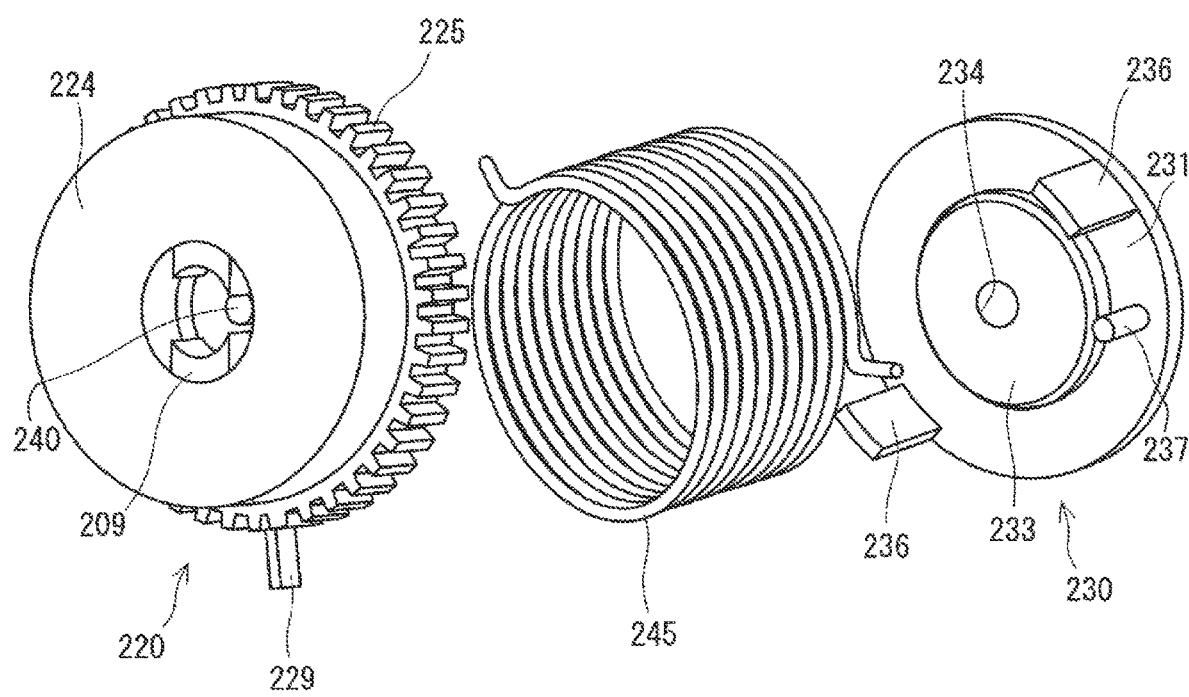
FIG. 25 is a perspective view illustrating a second spur gear, a third spur gear, and a torsion spring according to the seventh embodiment.
Figure 26:
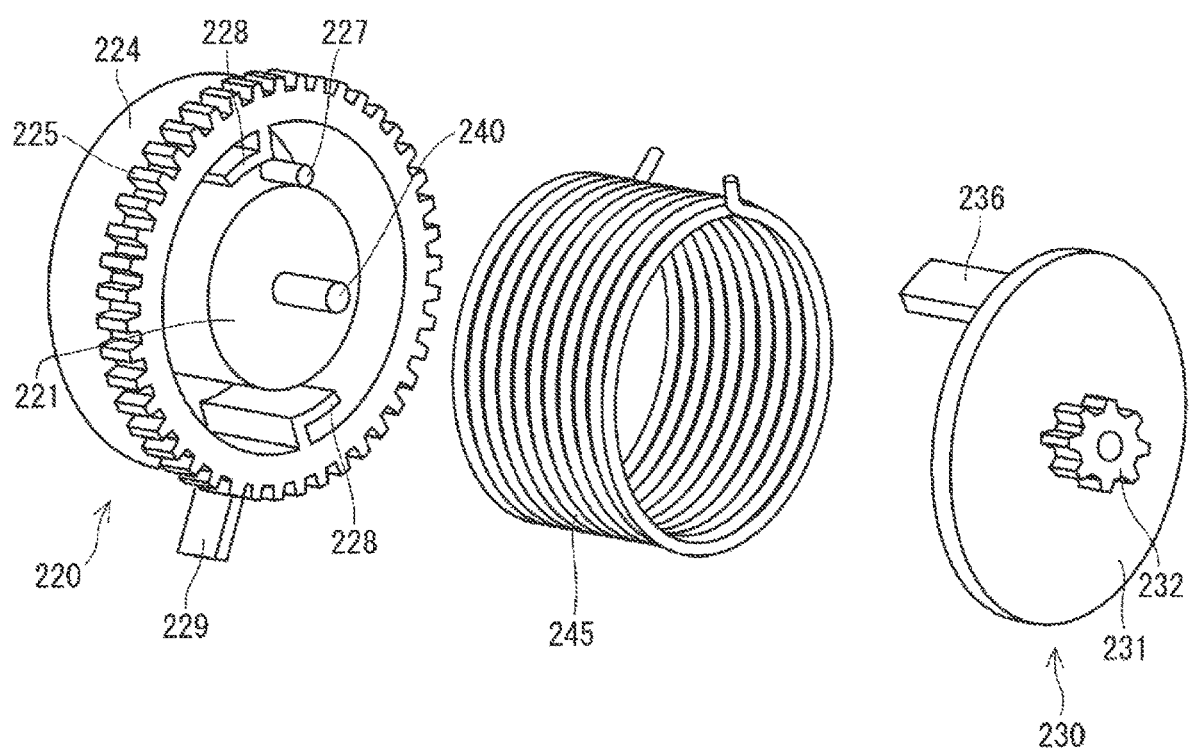
FIG. 26 is a perspective view illustrating the second spur gear, the third spur gear, and the torsion spring according to the seventh embodiment.

As illustrated in FIG. 21, FIG. 25, FIG. 26, and the like, the second spur gear 220 includes an inner cylindrical portion 221 that is open to a side opposite to the motor case 202, an outer cylindrical portion 224 that is open to a motor case 202 side, and the like, and is integrally formed of a resin or the like. In the case illustrated herein, the second spur gear 220 or the like is formed of a resin, but the second spur gear 220 or the like may also be formed of a metal. The same applies also to various members including the other gears, and a material can freely be chosen depending on a required weight, strength, or the like. In a bottom portion 222 of the inner cylindrical portion 221, a shaft 240 is press-fitted. On an inner peripheral side of the inner cylindrical portion 221, a sensor holding portion 208 that holds the rotation angle sensor is inserted. In a portion of the inner cylindrical portion 221 detectable by the rotation angle sensor, a magnet 209 is provided.

On an open side of the outer cylindrical portion 224, a gear portion 225 that meshes with the first spur gear 210 is formed. Between the inner cylindrical portion 221 and the outer cylindrical portion 224, a containing chamber 226 is formed to contain the torsion spring 245. In the containing chamber 226, a pin 227 to be engaged with one end of the torsion spring 245 is formed to project.

In an inner wall of the outer cylindrical portion 224, engagement walls 228 are formed in substantially letter-L shapes when viewed in plan view. In the present embodiment, the engagement walls 228 are formed at two positions with an axial line being interposed therebetween. In addition, radially outside the outer cylindrical portion 224, a locking engagement portion 229 is formed to project.

The third spur gear 230 includes a base portion 231, a gear portion 232, an insertion portion 233, engagement protruding portions 236, a pin 237, and the like, and is integrally formed of a resin or the like. The gear portion 232 is formed to project to a side of the base portion 231 opposite to the second spur gear 220. The insertion portion 233 is formed to project to a second spur gear 220 side of the base portion 231 to be inserted radially inside the outer cylindrical portion 224. The gear portion 232 and the insertion portion 233 are formed with an insertion hole 234 into which the shaft 240 is to be inserted.

The engagement protruding portions 236 are formed at two positions on an outer peripheral side of the base portion 231 to protrude to the second spur gear 220 side and be inserted into a space between the engagement walls 228 and the outer cylindrical portion 224, while the pin 237 is formed to project to the second spur gear 220 side of the base portion 231.

The torsion spring 245 is contained in the containing chamber 226 of the second spur gear 220 to have one end engaged with the pin 227 of the second spur gear 220 and another end engaged with the pin 237 of the third spur gear 230. When the second spur gear 220 is rotated by being driven by the motor 201, the second spur gear 220 and the third spur gear 230 integrally rotate until a set load for the torsion spring 245 is reached. When the set load is exceeded, the second spur gear 220 and the third spur gear 230 are separated from each other and, even when the second spur gear 220 rotates, the third spur gear 230 does not rotate.

Figure 23:
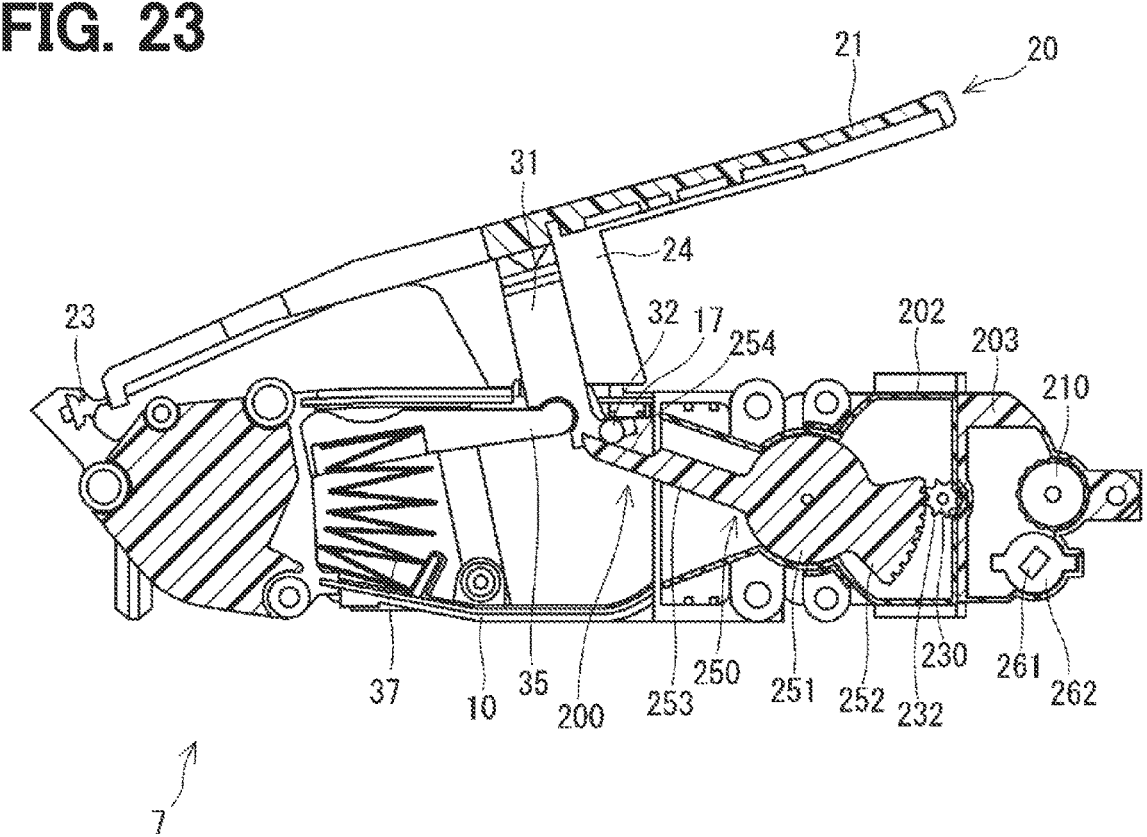
FIG. 23 is a cross-sectional view along a line XXIII-XXIII in FIG. 22.
Figure 24:
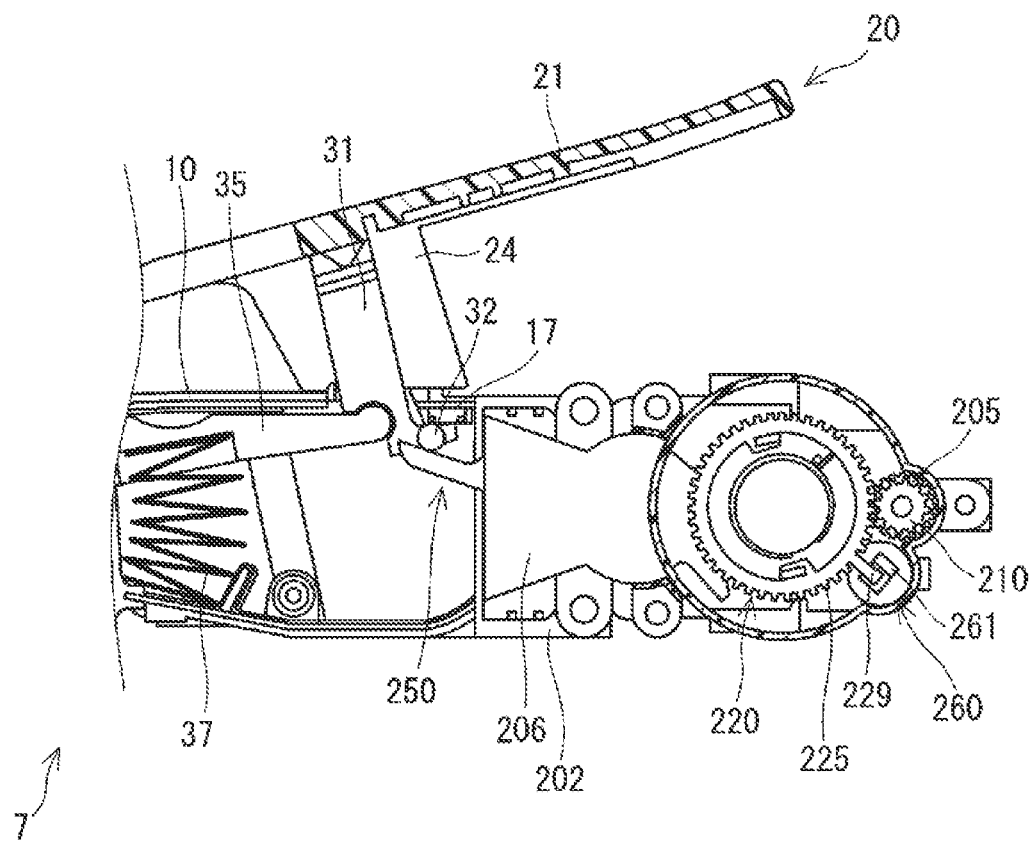
FIG. 24 is a cross-sectional view along a line XXIV-XXIV in FIG. 22.

As illustrated in FIG. 23 and the like, the cam 250 includes a main body portion 251, a gear portion 252, and a cam lever 253. The main body portion 251 is formed in a substantially circular shape when viewed in plan view and rotatably supported by the motor case 202 and the gear cover 206. The gear portion 252 is formed to radially outwardly project from the main body portion 251 and mesh with the gear portion 232 of the third spur gear 230.

The cam lever 253 is formed to extend radially outside the main body portion 251 and to a side substantially opposite to the gear portion 232 with respect to a rotation axis of the main body portion 251. On a leading end side of the cam lever 253, a recessed portion 254 is formed to come into contact with a connection pin 32 provided on the arm 31.

Figure 27:
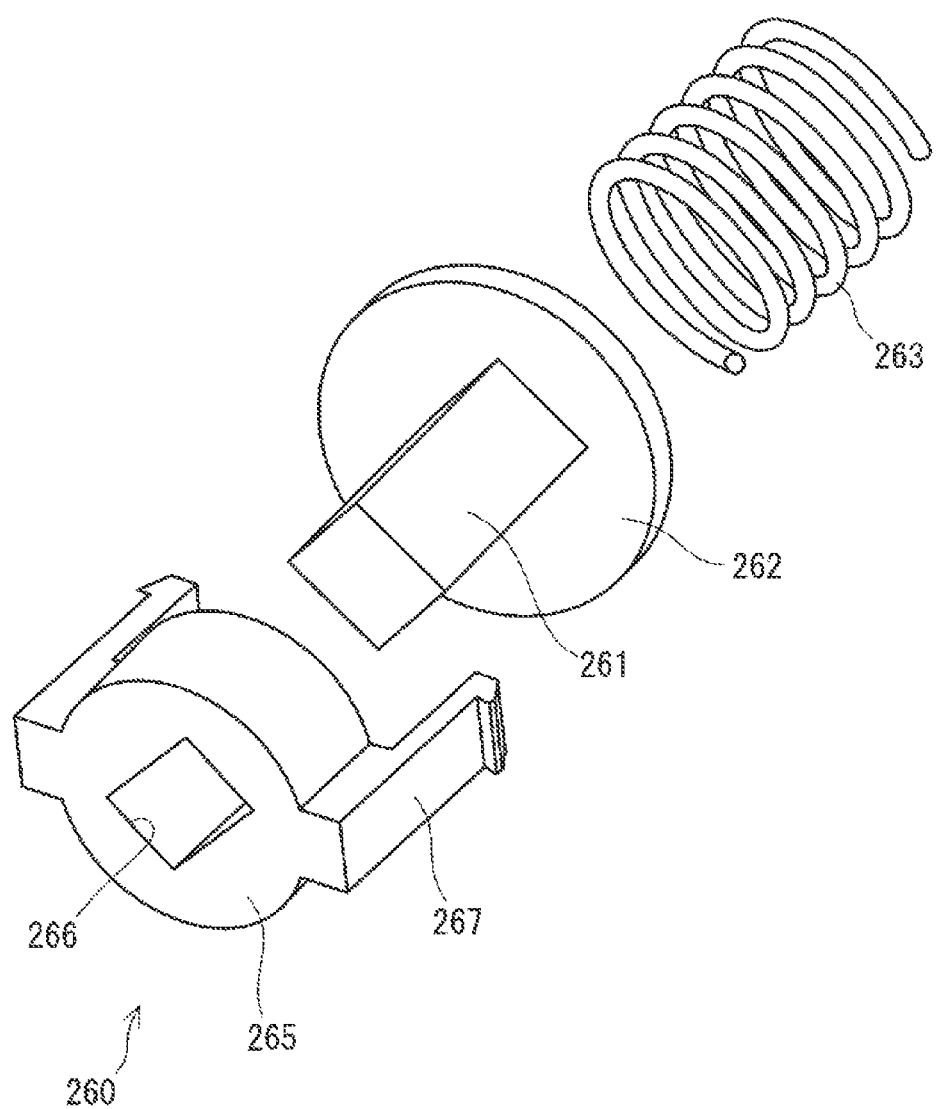
FIG. 27 is an exploded perspective view illustrating a locking member according to the seventh embodiment.

As illustrated in FIG. 27, the locking portion 260 includes a lock pin 261, a lock pin biasing member 263, a lock pin case 265, and the like. The lock pin 261 is provided on one surface of a flat plate portion 262 to project therefrom. The lock pin biasing member 263 is a compression coil spring which is provided on a surface of the flat plate portion 262 opposite to the surface thereof provided with the lock pin 261. The lock pin case 265 is formed in a substantially cylindrical shape and has a hole portion 266 formed in a bottom portion thereof to allow the lock pin 261 to be inserted therethrough. Radially outside a cylindrical portion of the lock pin case 265, fixation portions 267 are formed. By fixing the fixation portions 267 to the connector case 203 by snap-fitting or the like in a state in which the lock pin biasing member 263 can be compressed by using the flat plate portion 262, the locking portion 260 is fixed to the connector case 203.

Figure 28:
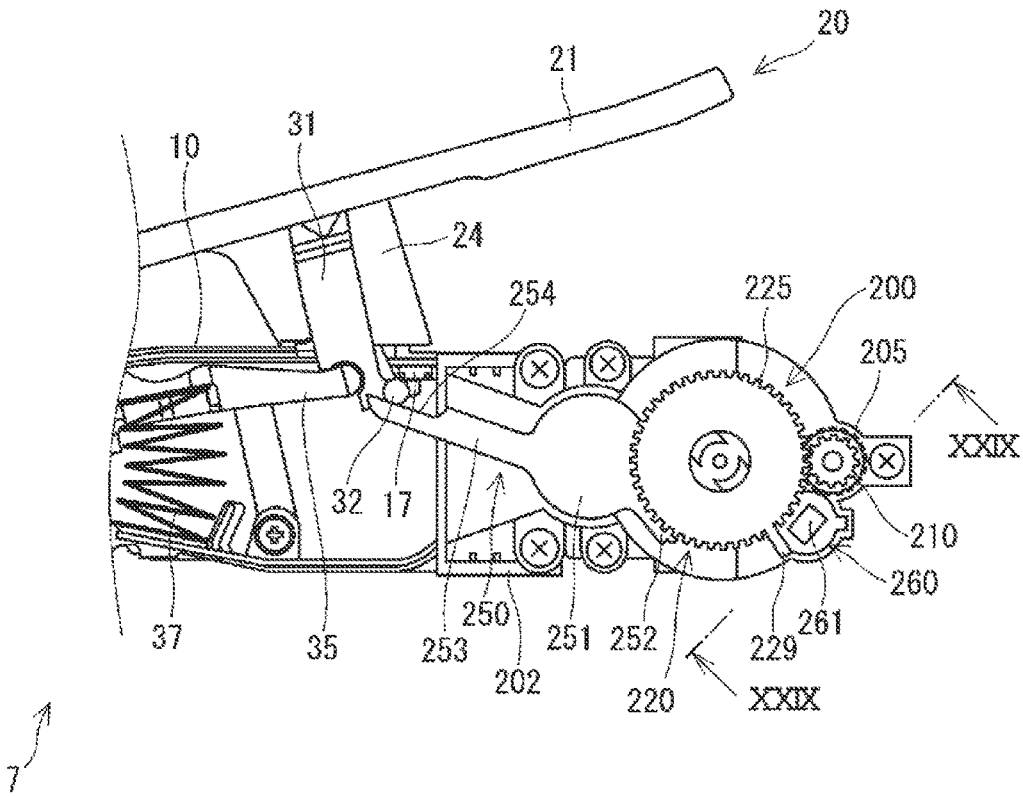
FIG. 28 is a side view illustrating a state before pedal locking in the seventh embodiment.
Figure 29:
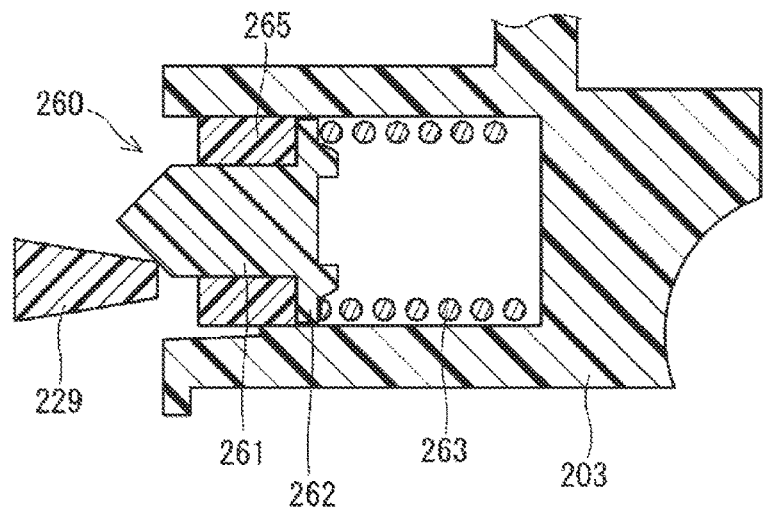
FIG. 29 is a cross-sectional view along a line XXIX-XXIX in FIG. 28.

Activation of the power transmission mechanism 200 will be described herein. It is assumed hereinbelow that a rotating direction of the motor 201 when the cam 250 is rotated clockwise in FIG. 28 or the like is positive, while a rotating direction of the motor 201 when the cam 250 is rotated counterclockwise is negative. As illustrated in FIGS. 28 and 29, by rotating the motor 201 in the positive direction in a state in which the cam lever 253 of the cam 250 and the connection pin 32 of the arm 31 are in contact, it is possible to exert the reaction force in the returning direction to the pedal lever 20. At this time, the locking engagement portion 229 of the second spur gear 220 and the lock pin 261 are separate from each other, and rotation of the gear is not regulated.

Figure 30:
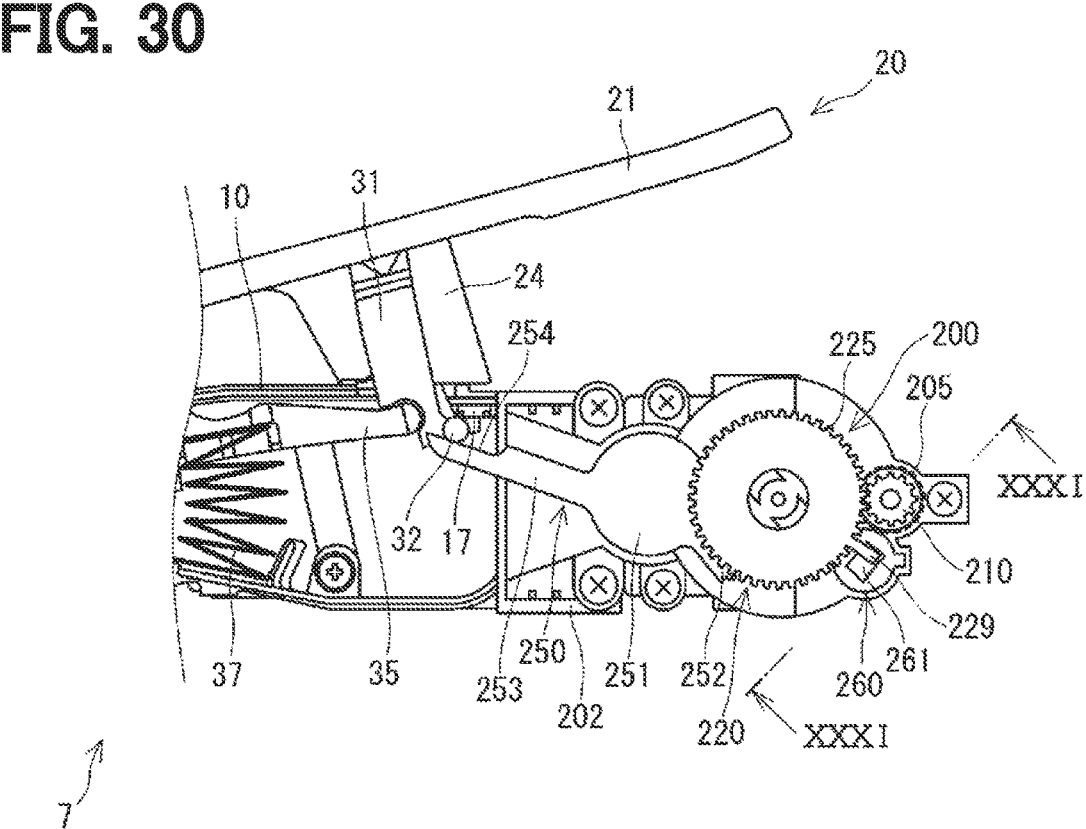
FIG. 30 is a side view illustrating a half-locked state in the seventh embodiment.
Figure 31:
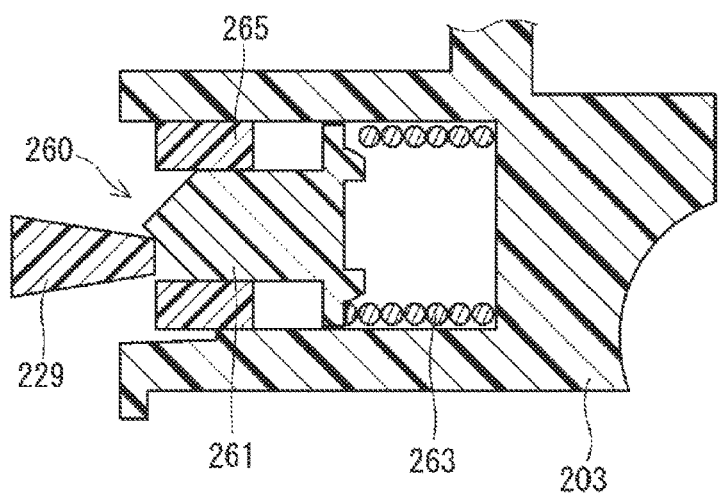
FIG. 31 is a cross-sectional view along a line XXXI-XXXI in FIG. 30.

As illustrated in FIGS. 30 and 31, when the arm 31 comes into contact with the fully closed stopper 17, clockwise rotation of the cam 250 is regulated. In this state, when the motor 201 is rotated in the positive direction to rotate the first spur gear 210 beyond the set load for the torsion spring 245, the torsion spring 245 is twisted to rotate the second spur gear 220 counterclockwise. As a result, the locking engagement portion 229 pushes the lock pin 261 by using a thrust force to contract the lock pin biasing member 263.

Figure 32:
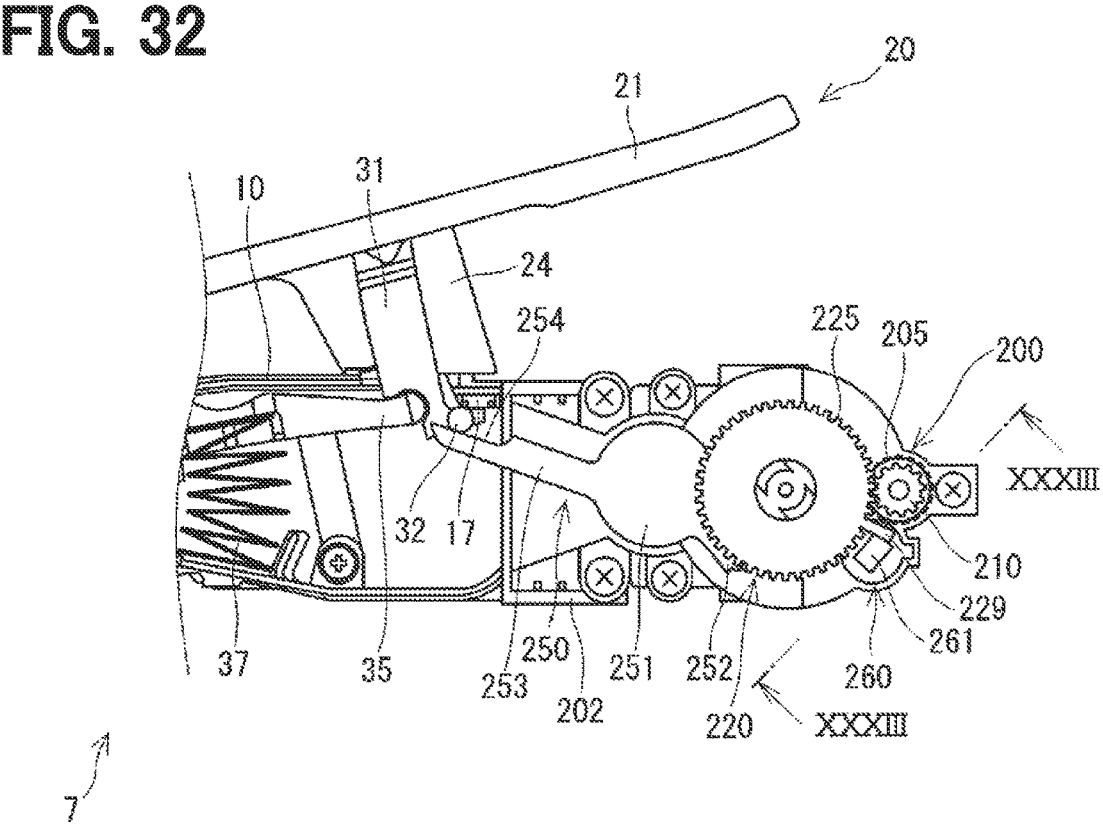
FIG. 32 is a side view illustrating a pedal-locked state in the seventh embodiment.
Figure 33:
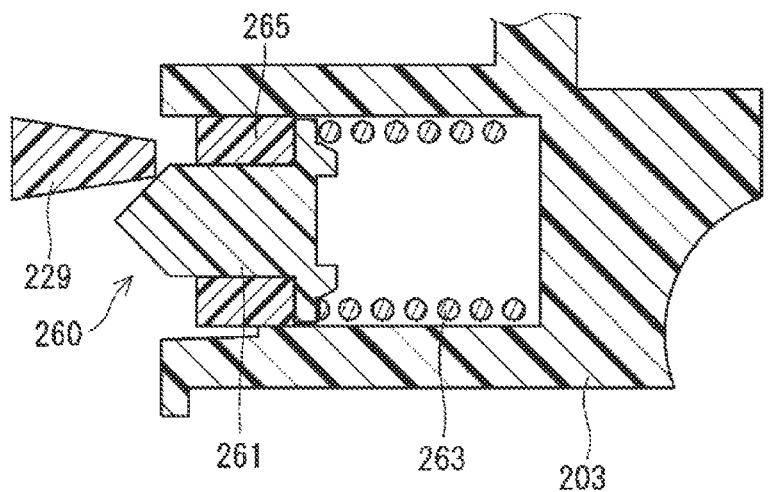
FIG. 33 is a cross-sectional view along a line XXXIII-XXXIII in FIG. 32.

As illustrated in FIGS. 32 and 33, when the locking engagement portion 229 climbs over the lock pin 261, the pedal lever 20 is locked. As a result, it is possible to hold the locked state in a state in which power distribution to the motor 201 is OFF. By depressing on the pedal lever 20 with a force of not less than a predetermined unlocking depressing force or driving the motor 201 in the negative direction in a state in which the pedal lever 20 is locked, a component force exerted in a direction in which the lock pin 261 is pushed contracts the lock pin biasing member 263 and, when the locking engagement portion 229 climbs over the lock pin 261 again, the pedal lever 20 is unlocked. In the present embodiment, the locking portion 260 and the second spur gear 220 are included in a locking mechanism 507. The locking mechanism 507 is a plunger system.

Figure 34:
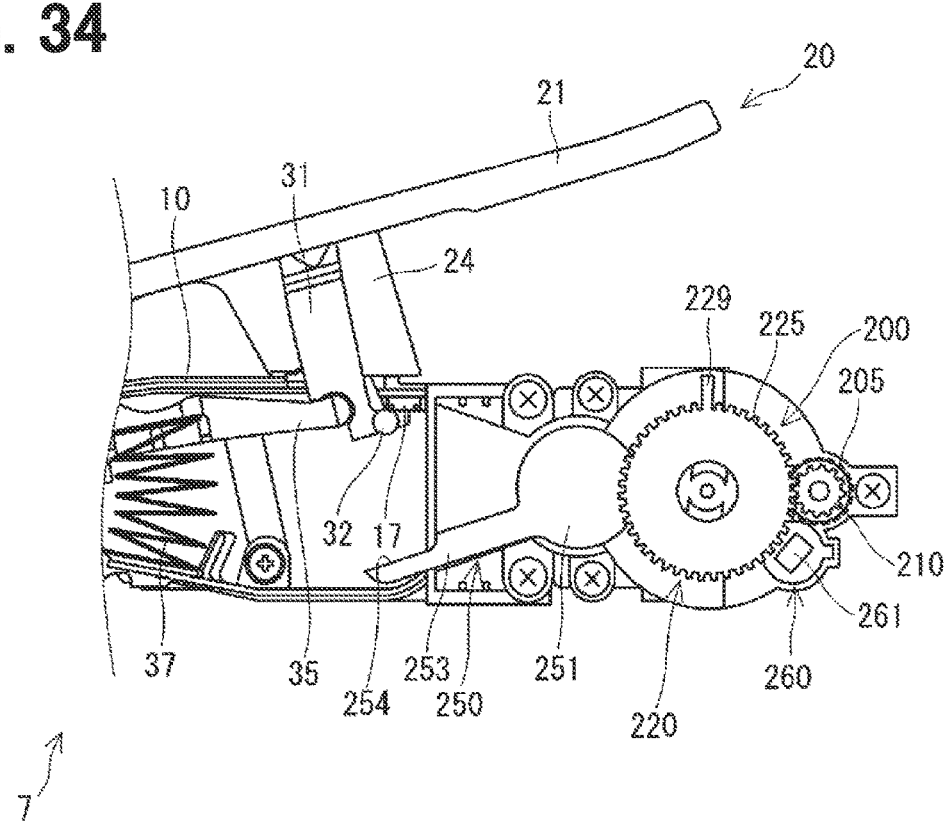
FIG. 34 is a side view illustrating a cam-retracted state in the seventh embodiment.

As illustrated in FIG. 34, when no reaction force is exerted to the pedal lever 20, the cam 250 is rotated to a position at which the cam lever 253 comes into contact with the motor case 202 and, in the entire region from the fully closed position of the pedal lever 20 to the fully open position thereof, the cam 250 is retracted so as to keep the cam lever 253 and the connection pin 32 from coming into contact with each other. Thus, when no reaction force is exerted, it is possible to avoid a situation in which a cogging torque of a power transmission mechanism 200 side or the like affects the depressing force.

The power transmission mechanism 200 transmits a drive force of the motor 201 to the pedal lever 20 by using a rigid member. In the present embodiment, the rigid member is the cam 250 that is driven by the motor 201 to be able to come into contact with the pedal lever 20. Between the motor 201 and the cam 250, the gears 210, 220, and 230 included in a deceleration mechanism are provided.

Thus, it is possible to appropriately transmit the drive force of the pedal lever 20 to the motor 201.

The deceleration mechanism includes the second spur gear 220 and the third spur gear 230 that are coaxially placed. Between the second spur gear 220 and the third spur gear 230, the torsion spring 245 is provided. When the second spur gear 220 is rotated in a reaction-force exerting direction, the third spur gear 230 integrally rotates with the second spur gear 220 until the set load for the torsion spring 245 is reached, and does not rotate when the set load for the torsion spring 245 is exceeded.

The locking mechanism 507 includes the locking engagement portion 229 that rotates integrally with the second spur gear 220 and the lock pin 261 capable of being engaged with the locking engagement portion 229 in a region where the third spur gear 230 does not rotate, but the second spur gear 220 rotates.

The locking mechanism 507 includes the locking engagement portion 229 provided in a power transmission route extending from the motor 201 to the pedal lever 20 and the lock pin 261 that can be moved by an elastic force. The locking engagement portion 229 climbs over the lock pin 261 to be engaged with the lock pin 261, and thereby regulates the operation of the pedal lever 20. Thus, it is possible to appropriately regulate the operation of the pedal lever 20. In addition, the same effects as achieved in the embodiments described above are achieved.

In the present embodiment, the motor 201 corresponds to a "drive source", the second spur gear 220 corresponds to a "drive-source-side gear", the third spur gear 230 corresponds to a "cam-side gear", the torsion spring 245 corresponds to an "inter-gear biasing member", the lock pin 261 corresponds to a "locking member", and the elastic force of the lock pin biasing member 263 corresponds to an "elastic force". In addition, it can be considered that the locking engagement portion 229 is provided integrally with the second spur gear 220 included in the power transmission mechanism 200 and "provided in the power transmission route".

Eighth Embodiment

Figure 35:
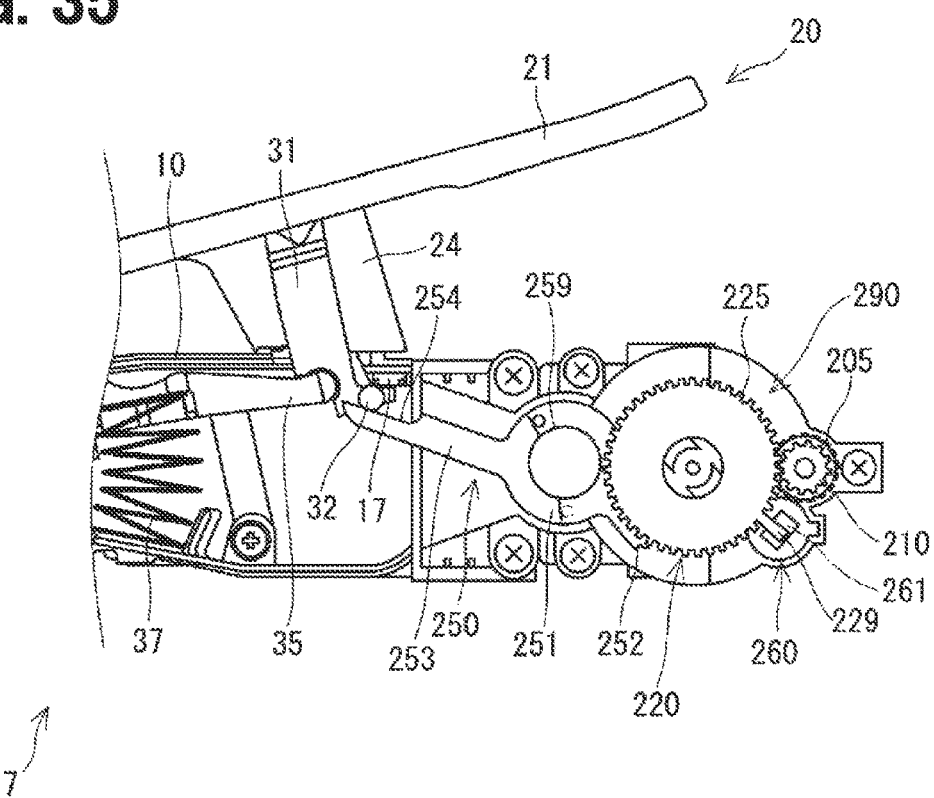
FIG. 35 is a side view of an accelerator device according to an eighth embodiment.

The eighth embodiment is illustrated in FIG. 35. The eighth embodiment is a modification of the seventh embodiment. A power transmission mechanism 290 in the present embodiment includes a torsion spring 259 having one end engaged with the cam 250 and another end engaged with the gear cover 206. Note that, for the sake of illustration, a pin provided on a gear cover 206 side to be engaged with the other end of the torsion spring 259 is indicated by the dot-dash line. The torsion spring 259 generates a biasing force that overcomes a cogging torque of the motor 201 with respect to a cam shaft, and keeps the cam 250 in constant contact with the arm 31. Such a configuration also achieves the same effects as achieved in the embodiments described above.

Ninth Embodiment

Figure 36:
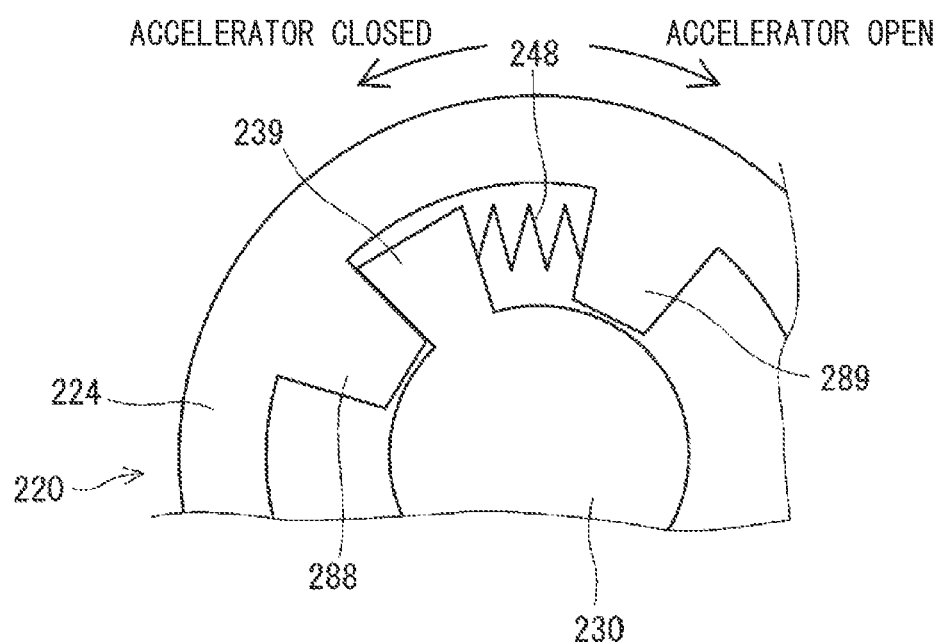
FIG. 36 is a schematic diagram illustrating the second spur gear, the third spur gear, and a compression coil spring according to a ninth embodiment.

The ninth embodiment is illustrated in FIG. 36. In the seventh embodiment, between the second spur gear 220 and the third spur gear 230, the torsion spring 245 is provided. In the ninth embodiment, between the second spur gear 220 and the third spur gear 230, a compression coil spring 248 is provided as the inter-gear biasing member. An inner wall of the outer cylindrical portion 224 of the second spur gear 220 is formed with engagement walls 288 and 289, instead of the engagement wall 228 and the pin 227. Meanwhile, the third spur gear 230 is provided with an engagement protruding portion 239, instead of the engagement protruding portion 236 and the pin 237.

The engagement protruding portion 239 is provided to be movable between the two engagement walls 288 and 289 of the second spur gear 220. The compression coil spring 248 is provided between the engagement wall 289 and the engagement protruding portion 239 to bias the third spur gear 230 in the accelerator closing direction. The engagement protruding portion 239 is provided to be able to come into contact with the engagement wall 288 under a biasing force of the compression coil spring 248. The engagement walls 288 and 289 and the engagement protruding portion 239 are provided according to a set length for the compression coil spring 248. In the present embodiment, in the same manner as in the seventh embodiment, the second spur gear 220 and the third spur gear 230 integrally rotate until a set load for the compression coil spring 248 is reached and, when the set load is exceeded, the third spur gear 230 does not rotate, but the second spur gear 220 rotates. Such a configuration also achieves the same effects as achieved in the embodiments described above.

Tenth Embodiment

Figure 37A:
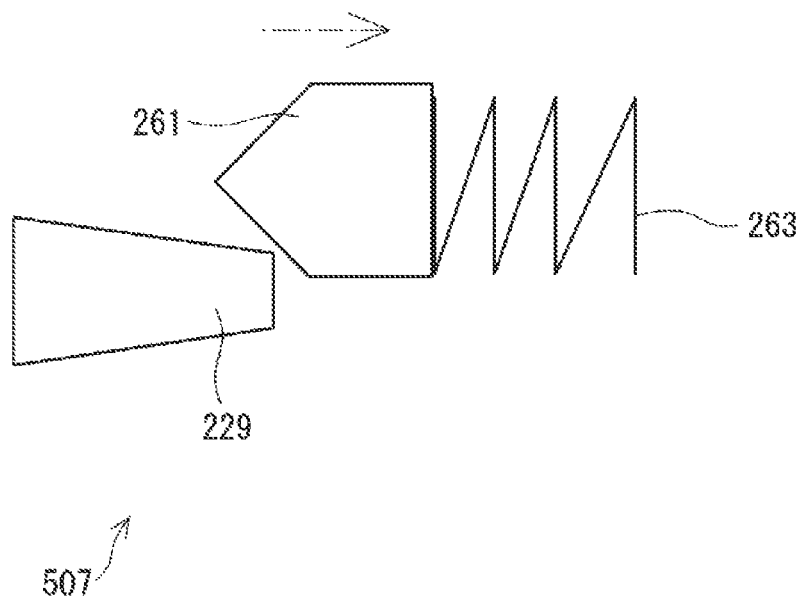
FIG. 37A is a diagram illustrating a locking mechanism according to the seventh embodiment, which is a schematic diagram illustrating a pre-locking state.
Figure 37B:
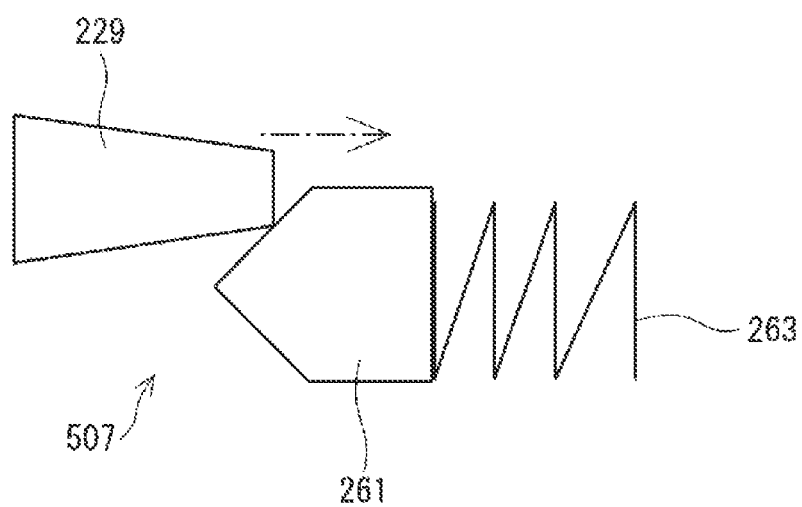
FIG. 37B is a diagram illustrating the locking mechanism according to the seventh embodiment, which is a schematic diagram illustrating a locked state.

In the tenth to sixteenth embodiments, locking mechanisms are different from those in the embodiments described above, and therefore a description will be given with emphasis on this point. The locking mechanism described herein may also be combined with the power transmission mechanism in any of the embodiments. FIGS. 37A and 37B schematically illustrate the locking mechanism 507 in the seventh embodiment. As a result of rotation of the second spur gear 220 (not shown in FIG. 37A or the like), the locking engagement portion 229 pushes the lock pin 261 by using the thrust force to rise over the lock pin 261 and thereby lock the pedal lever 20.

To allow the locking engagement portion 229 to generate the thrust force with respect to the lock pin 261, at least one of respective contact surfaces of the locking engagement portion 229 and the lock pin 261 which come into contact with each other when the locking engagement portion 229 is moved in the locking direction is preferably an inclined surface. Likewise, at least one of the contact surfaces of the locking engagement portion 229 and the lock pin 261 which come into contact with each other when the locking engagement portion 229 is moved in an unlocking direction is also preferably an inclined surface. An inclination angle and the like can freely be set on the basis of a torque required for locking or unlocking or the like. Note that the inclined surface is not limited to a flat surface, and may also be a curved surface in such a manner that, e.g., a leading end surface of the lock pin 261 is formed in a domical shape. The locking position is not limited to the fully closed position, and may also be the fully open position or an intermediate position. The same applies also to the tenth embodiment.

Figure 38A:
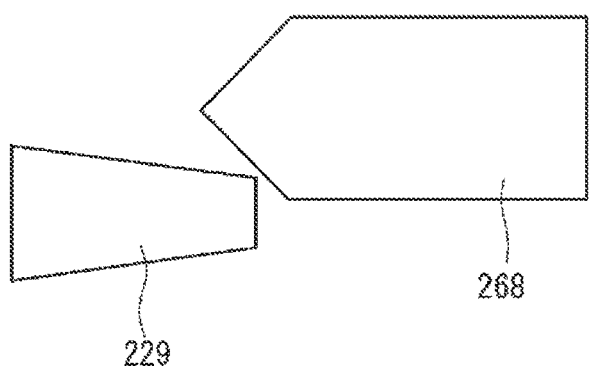
FIG. 38A is a diagram illustrating a locking mechanism according to a tenth embodiment, which is a schematic diagram illustrating the pre-locking state.
Figure 38B:
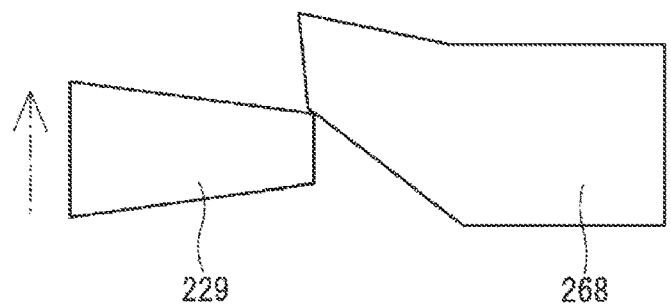
FIG. 38B is a diagram illustrating the locking mechanism according to the tenth embodiment, which is a schematic diagram illustrating the half-locked state.
Figure 38B:
Figure 38C:
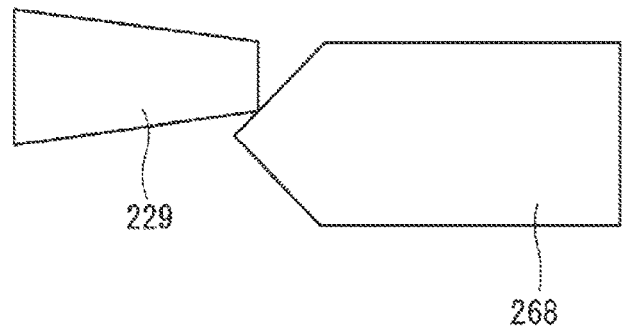
FIG. 38C is a diagram illustrating the locking mechanism according to the tenth embodiment, which is a schematic diagram illustrating the locked state.
Figure 38C:

In a locking mechanism 508 in the tenth embodiment illustrated in FIGS. 38A, 38B, and 38C, a lock pin 268 is formed of a flexible material such as rubber. As indicated by the arrow in FIG. 38B, the locking engagement portion 229 moves to bend the lock pin 268, and consequently the locking engagement portion 229 climbs over the lock pin 268 to lock the pedal lever 20 (see FIG. 38C). Such a configuration also achieves the same effects as achieved in the embodiments described above. In the present embodiment, the lock pin 268 corresponds to the "locking member", and an elastic force of the lock pin 268 corresponds to the "elastic force".

Eleventh Embodiment

Figure 39A:
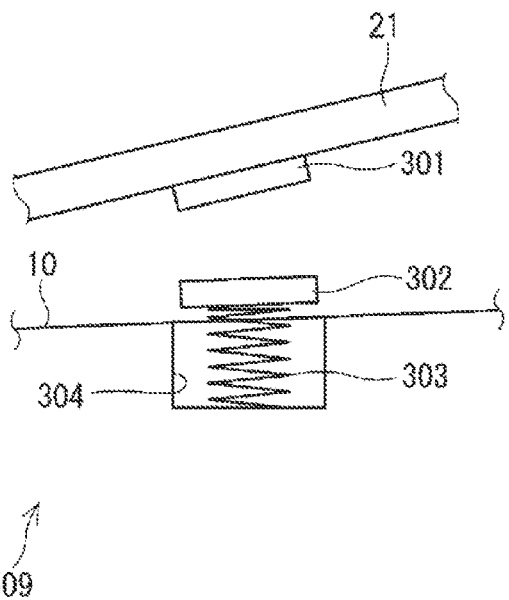
FIG. 39A is a diagram illustrating a locking mechanism according to an eleventh embodiment, which is a schematic diagram illustrating the pre-locking state.
Figure 39B:
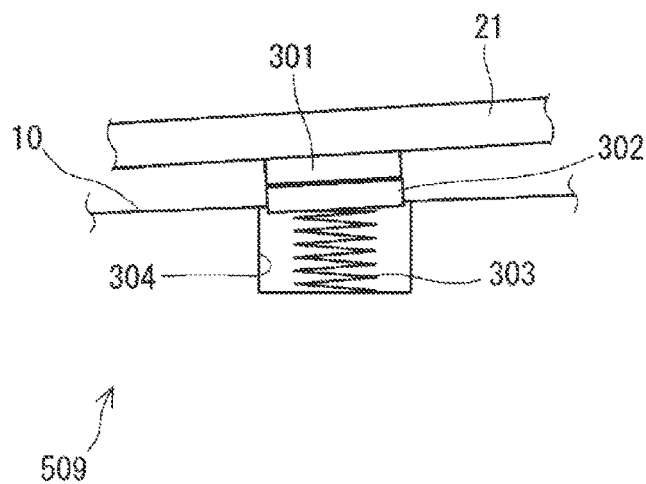
FIG. 39B is a diagram illustrating the locking mechanism according to the eleventh embodiment, which is a schematic diagram illustrating the locked state.
Figure 39C:
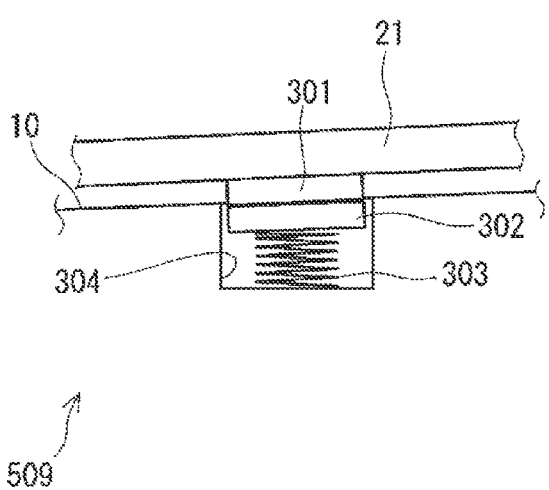
FIG. 39C is a diagram illustrating the locking mechanism according to the eleventh embodiment, which is a schematic diagram illustrating unlocking.

The eleventh embodiment is illustrated in FIGS. 39A, 39B, and 39C. In the present embodiment, as a locking mechanism 509, a magnetic body 301, a magnet 302, and an elastic member 303 are provided. The magnetic body 301 is provided on the pad 21. The magnet 302 is provided at a position on the case 10 facing the magnetic body 301. The elastic member 303 is contained in a containing chamber 304 provided in the case 10 to have one end engaged with an inner wall of the containing chamber 304 and another end connected to the magnet 302. It may also be possible that the magnet 302 is provided on the pad 21 side, while the magnetic body 301 is provided on the case 10 side.

As illustrated in FIG. 39B, the magnetic body 301 and the magnet 302 attract each other to allow the pad 21 to be locked in the fully open state. As also illustrated in FIG. 39C, by further depressing on the pad 21 in the locked state and compressing the elastic member 303, the reaction force of the elastic member 303 is allowed to separate the magnetic body 301 and the magnet 302 from each other and thereby remove the locked state. Such a configuration also achieves the same effects as achieved in the embodiments described above. In the present embodiment, the case 10 corresponds to a "housing".

Twelfth to Fifteenth Embodiments

Figure 40A:
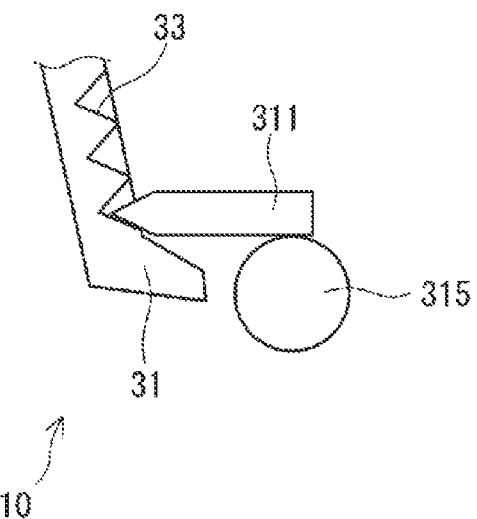
FIG. 40A is a diagram illustrating a locking mechanism according to a twelfth embodiment, which is a schematic diagram illustrating the locked state.
Figure 40B:
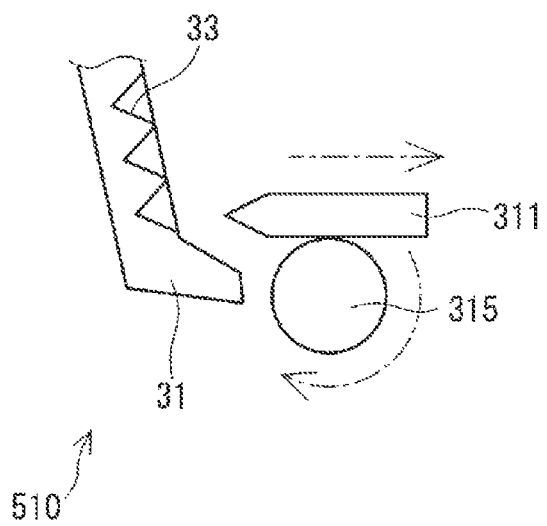
FIG. 40B is a diagram illustrating the locking mechanism according to the twelfth embodiment, which is a schematic diagram illustrating the unlocking.
Figure 41A:
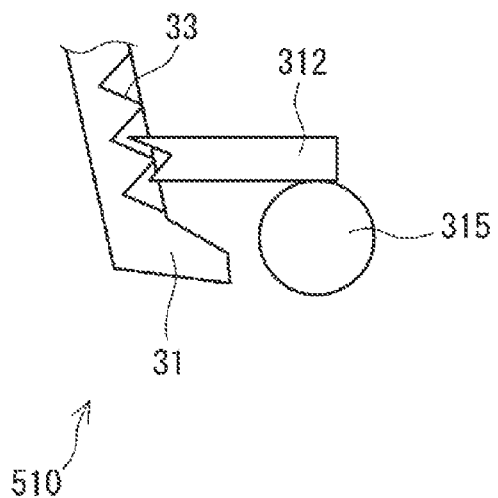
FIG. 41A is a diagram illustrating a locking mechanism according to a thirteenth embodiment, which is a schematic diagram illustrating the locked state.
Figure 41B:
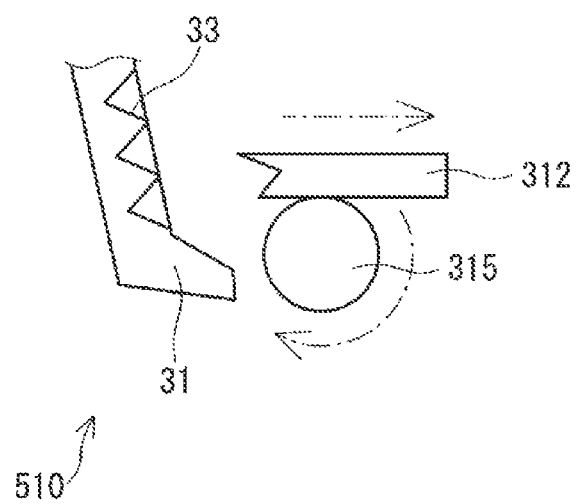
FIG. 41B is a diagram illustrating the locking mechanism according to the thirteenth embodiment, which is a schematic diagram illustrating the unlocking.
Figure 42A:
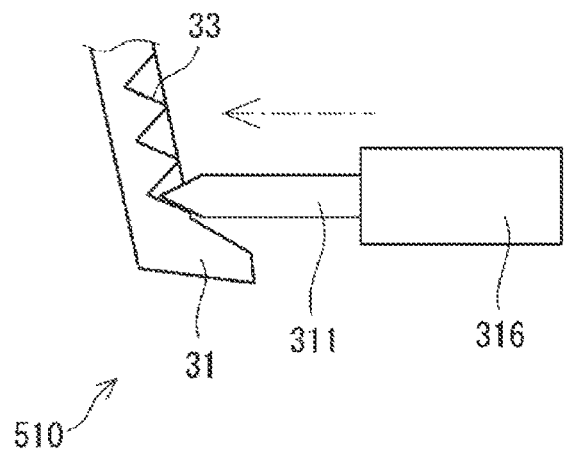
FIG. 42A is a diagram illustrating a locking mechanism according to a fourteenth embodiment, which is a schematic diagram illustrating the locked state.
Figure 42B:
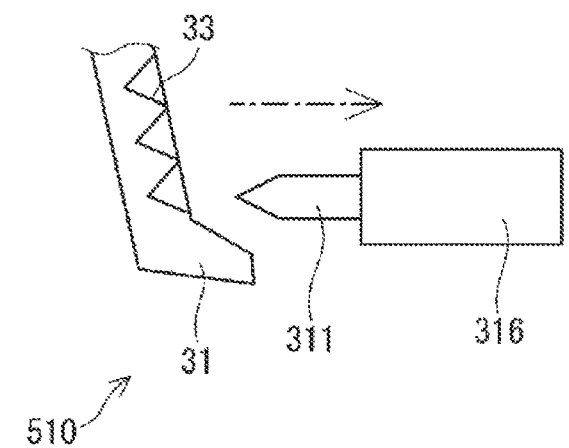
FIG. 42B is a diagram illustrating the locking mechanism according to the fourteenth embodiment, which is a schematic diagram illustrating the unlocking.
Figure 43A:
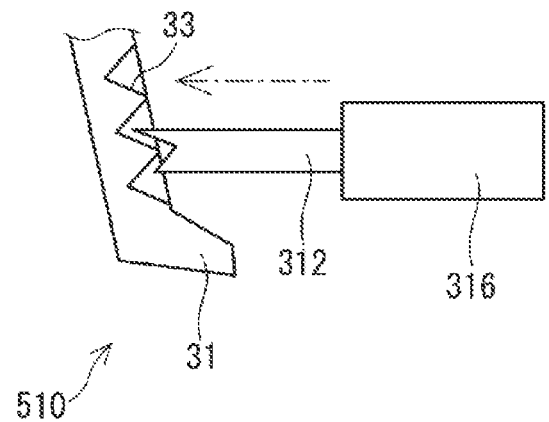
FIG. 43A is a diagram illustrating a locking mechanism according to a fifteenth embodiment, which is a schematic diagram illustrating the locked state.
Figure 43B:
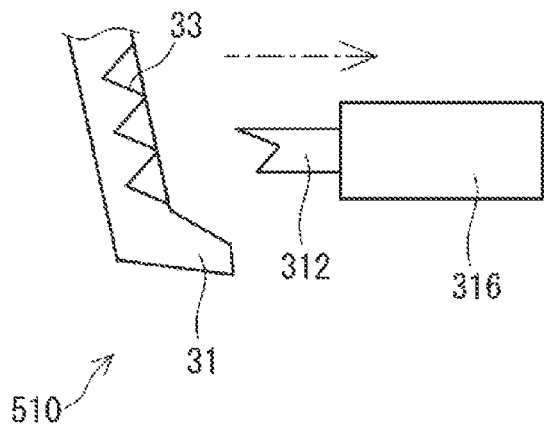
FIG. 43B is a diagram illustrating the locking mechanism according to the fifteenth embodiment, which is a schematic diagram illustrating the unlocking.

The twelfth embodiment is illustrated in FIGS. 40A and 40B, the thirteenth embodiment is illustrated in FIGS. 41A and 41B, the fourteenth embodiment is illustrated in FIGS. 42A and 42B, and the fifteenth embodiment is illustrated in FIGS. 43A and 43B. As illustrated in FIGS. 40A to 43B, the arm 31 is formed with a fitting portion 33, which interfits with a lock pin 311 or 312 to lock the pedal lever 20. By forming the fitting portion 33 such that portions interfitting with the lock pin 311 are in multiple stages, it is possible to stepwise lock the pedal lever 20 at intermediate positions between the fully closed position and the fully open position. In FIGS. 39A to 42B, the lock pin 311 or 312 is included in a locking mechanism 510.

In the twelfth embodiment illustrated in FIGS. 40A and 40B, the lock pin 311 having a leading end formed in a protruding shape is driven by a motor 315 serving as a locking drive source. In the thirteenth embodiment illustrated in FIGS. 41A and 41B, the lock pin 312 having a leading end formed in a recessed portion is driven by the motor 315.

In the fourteenth embodiment illustrated in FIGS. 42A and 42B, the lock pin 311 having the leading end formed in the protruding shape is driven by a solenoid 316 serving as the locking drive source. In the fifteenth embodiment illustrated in FIGS. 43A and 43B, the lock pin 312 having the leading end formed in the recessed shape is driven by the solenoid 316.

In the present embodiment, separately from the motor 40 serving as the drive force for exerting the reaction force, the locking drive source is provided. This increases a degree of freedom of the locking mechanism. The locking drive source may be the motor 315 as in the twelfth and thirteenth embodiments or may also be the solenoid 316 as in the fourteenth and fifteenth embodiments.

The locking mechanism 510 has the lock pins 311 and 312 capable of regulating the operation of the pedal lever 20 by interfitting with the fitting portion 33 formed in the pedal lever 20. Thus, it is possible to appropriately regulate the operation of the pedal lever. The fitting portion 33 and the lock pins 311 and 312 may also have shapes and the like different from those in FIGS. 40A to 43B as long as the lock pins 311 and 312 can lock the pedal lever 20 by interfitting with the fitting portion 33. Such a configuration also achieves the same effects as achieved in the embodiments described above. In the twelfth to fifteenth embodiments, the lock pins 311 and 312 correspond to the "locking member".

Sixteenth Embodiment

Figure 44:
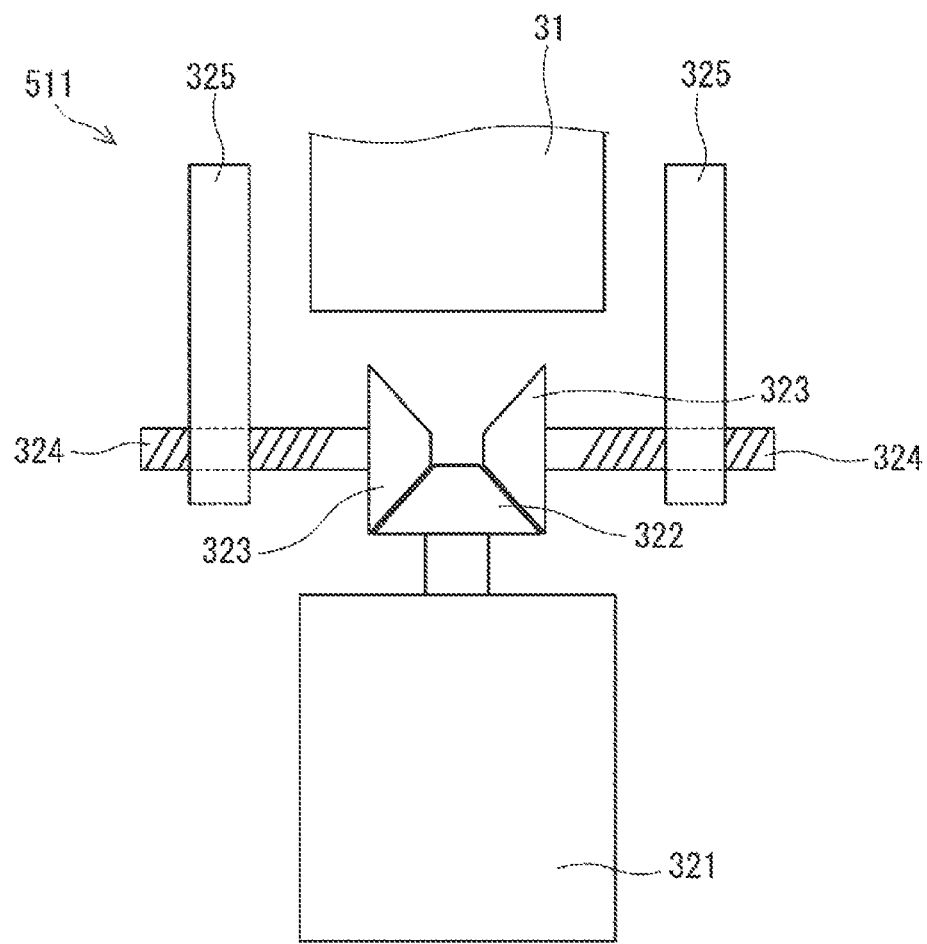
FIG. 44 is a schematic diagram illustrating a locking mechanism according to a sixteenth embodiment.

The sixteenth embodiment is illustrated in FIG. 44. In the present embodiment, a locking mechanism 511 includes bevel gears 323, a feed screw 324, and locking pads 325. The locking pads 324 are driven by rotation of a motor 321 serving as the locking drive source via a motor gear 322, the bevel gears 323, and the feed screw 324 to hold the arm 31 therebetween to regulate the operation of the pedal lever 20 by using a frictional force.

In the present embodiment, the locking mechanism 511 has the locking pads 325 provided to be able to hold the pedal lever 20 therebetween, and the locking pads 325 hold the arm 31 therebetween to regulate the operation of the pedal lever 20. Thus, it is possible to regulate the operation of the pedal lever 20 at any position between the fully closed position and the fully open position. As long as the pedal lever 20 can be held between the pads driven by the drive source, a position at which the pedal lever is held between the pads, a configuration of the gears, and the like may also be different. Such a configuration also achieves the same effects as achieved in the embodiments described above.

Seventeenth Embodiment

In the seventeenth to twenty-third embodiments, power transmission mechanisms are different from those in the embodiments described above, and therefore a description will be given with emphasis on this point. Note that, in the drawings according to the seventeenth to twenty-third embodiments, the power transmission mechanisms are schematically illustrated, while illustration of members other the power transmission mechanisms, such as the housings, is omitted as appropriate.

Figure 45:
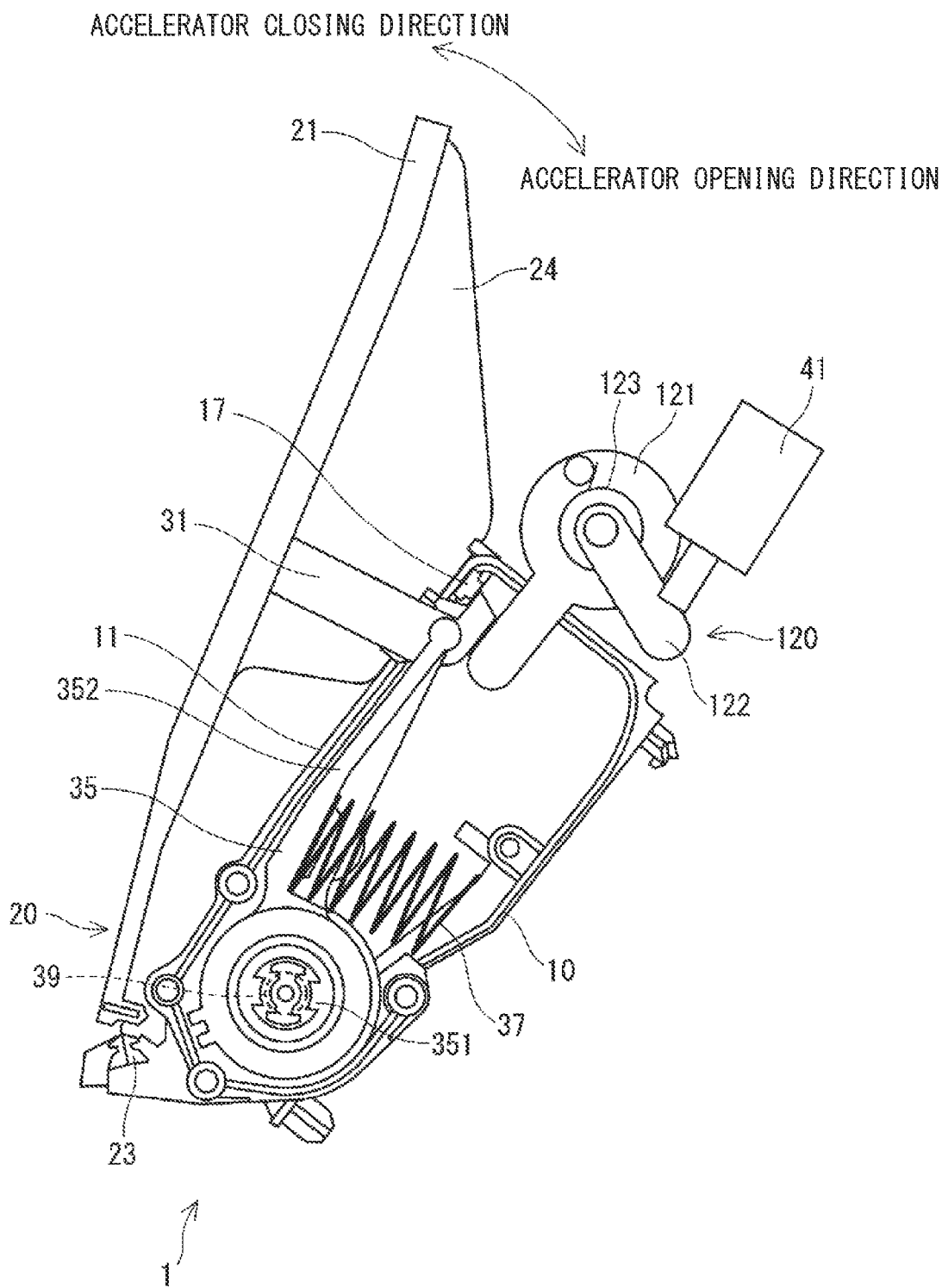
FIG. 45 is a side view illustrating a power transmission mechanism according to a seventeenth embodiment.

In each of the seventeenth to nineteenth embodiments, the force from the drive source in the linear motion direction is converted to the force in the rotating direction to exert the reaction force to the pedal lever 20. The seventeenth embodiment is illustrated in FIG. 45. In the present embodiment, as the reaction-force-exerting drive source, a solenoid 41 is provided. The solenoid 41 in the present embodiment has a leading portion which is extended by power distribution and retracted by stopping power distribution.

A power transmission mechanism 120 includes a larger link 121, a smaller link 122, and a torsion spring 123. The larger link 121 is provided so as to be in constant contact with the arm 31. The smaller link 122 comes into contact with a leading end portion of the solenoid 41. The larger link 121 and the smaller link 122 are connected by the torsion spring 123.

In the present embodiment, the smaller link 122 is pushed by the leading end portion extended by distributing power to the solenoid 41 to exert a force to the larger link 121 via the torsion spring 123 and thereby generate a return reaction force in the arm 31. Additionally, the smaller link 122 is further pushed by the leading end portion of the solenoid 41 to cause the larger link 121 to press the pedal lever 20 onto the fully closed position and lock the pedal lever 20 to keep the pedal lever 20 from moving until the driver applies a depressing force equal to or greater than a predetermined magnitude thereto. In other words, in the present embodiment, the pedal lever 20 can be locked in a fully closed state with constant power distribution during a locking period. Such a configuration also achieves the same effects as achieved in the embodiments described above.

Eighteenth Embodiment

Figure 46:
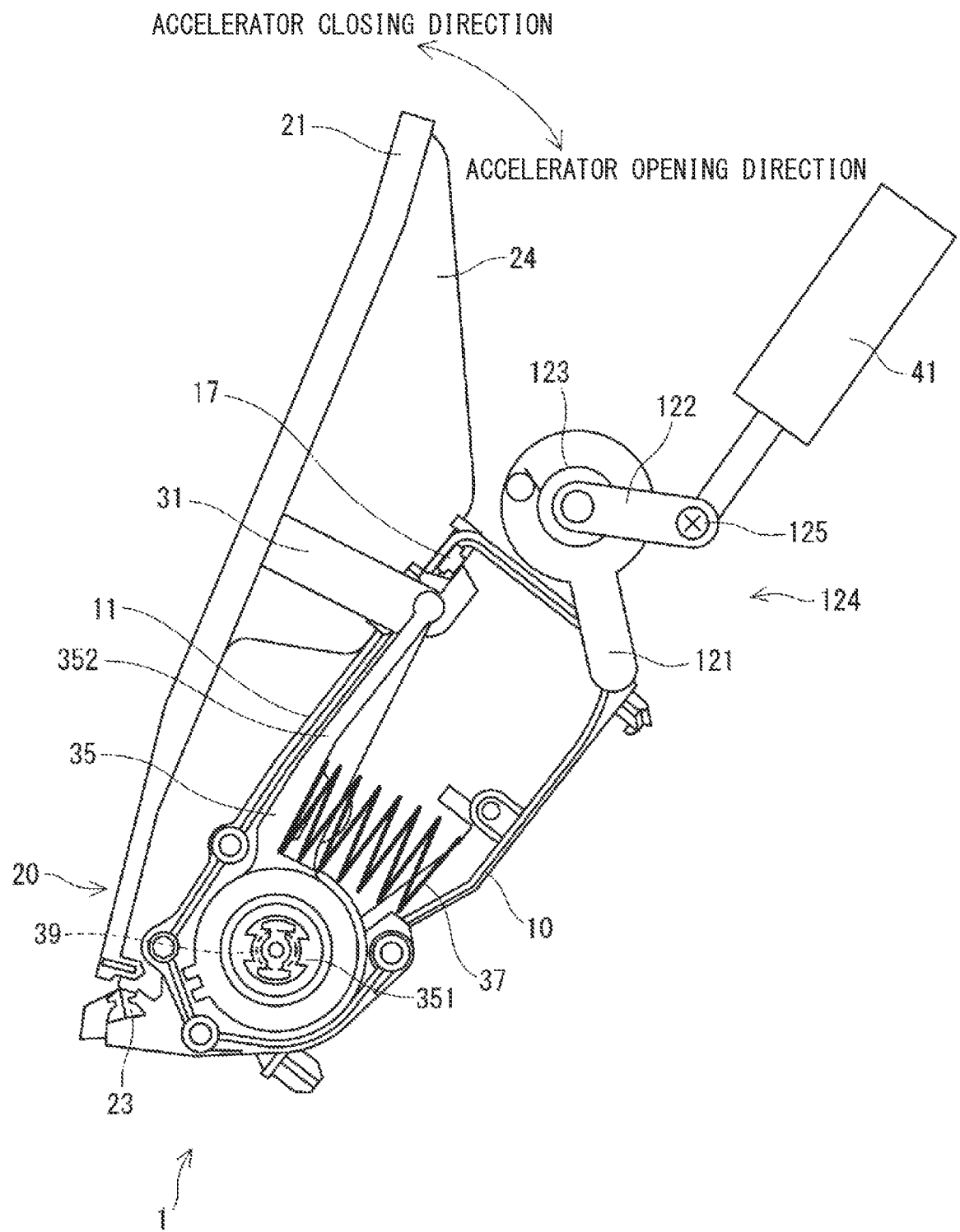
FIG. 46 is a side view illustrating a power transmission mechanism according to an eighteenth embodiment.

The eighteenth embodiment is illustrated in FIG. 46. In a power transmission mechanism 124 in the present embodiment, the smaller link 122 and the leading end portion of the solenoid 41 are connected by a fixing member 125. In addition, an amount of stroke of the solenoid 41 is set relatively large and, by drawing the smaller link 122 when no power is distributed, the larger link 121 is retracted to a position at which the arm 31 and the larger link 121 are out of contact with each other even when the pedal lever 20 is fully open. By thus separating the power transmission mechanism 124 and the pedal lever 20 from each other when no reaction force is exerted, it is possible to avoid effects on the depressing force. Exerting of the reaction force and a locking operation are the same as in the seventeenth embodiment. Such a configuration also achieves the same effects as achieved in the embodiments described above.

Nineteenth Embodiment

Figure 47:
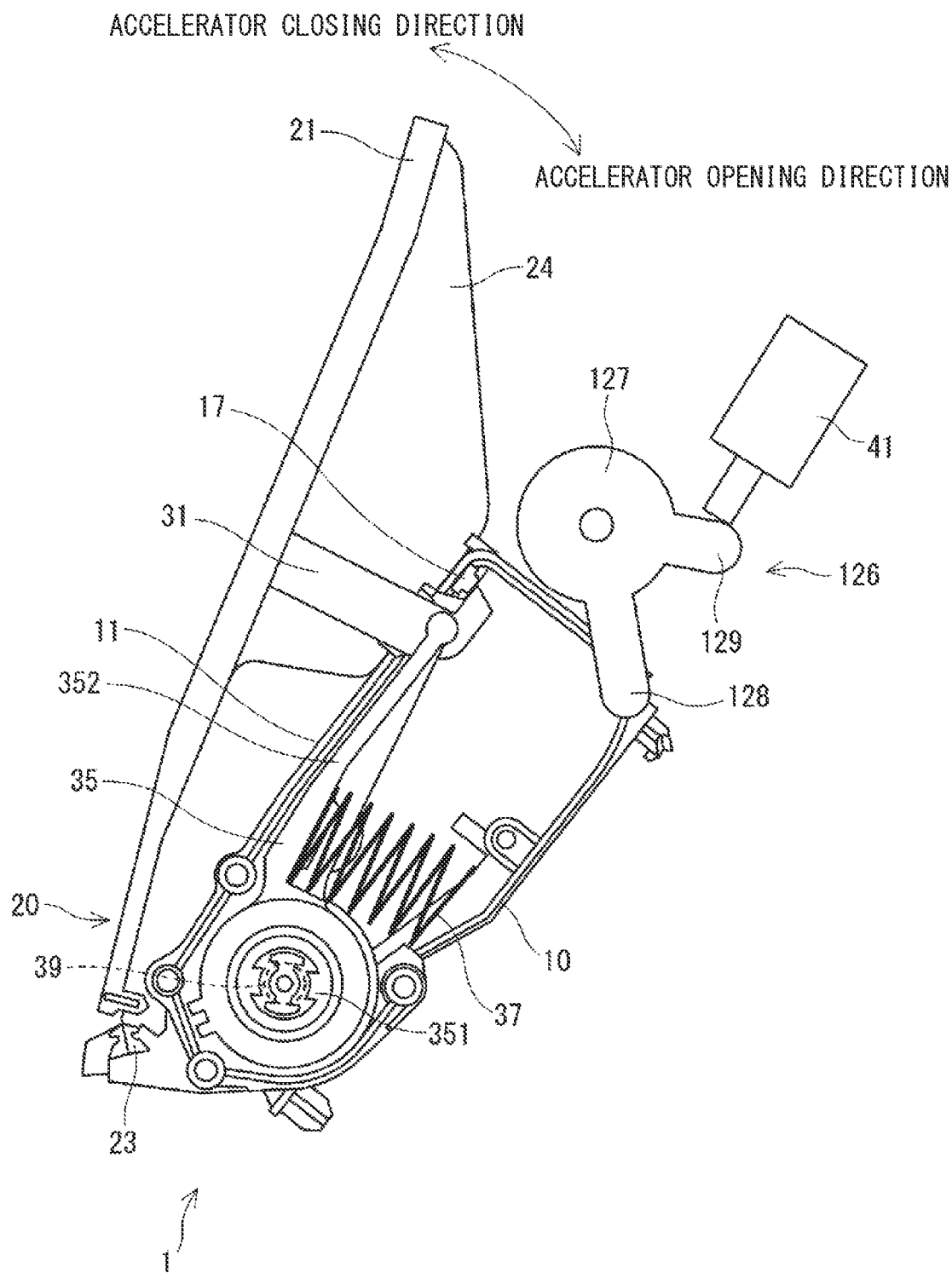
FIG. 47 is a side view illustrating a power transmission mechanism according to a nineteenth embodiment.

The nineteenth embodiment is illustrated in FIG. 47. A link 127 in a power transmission mechanism 126 in the present embodiment integrally includes a larger link portion 128 and a smaller link portion 129. In FIG. 46, in the same manner as in the eighteenth embodiment, the larger link portion 128 is illustrated as being retractable when no reaction force is exerted. However, it may also be possible that the larger link portion 128 and the arm 31 are in constant contact with each other as in the seventeenth embodiment. Exerting of the reaction force and the locking operation are the same as in the seventeenth embodiment. Such a configuration also achieves the same effects as achieved in the embodiments described above.

Twentieth Embodiment

Figure 48:
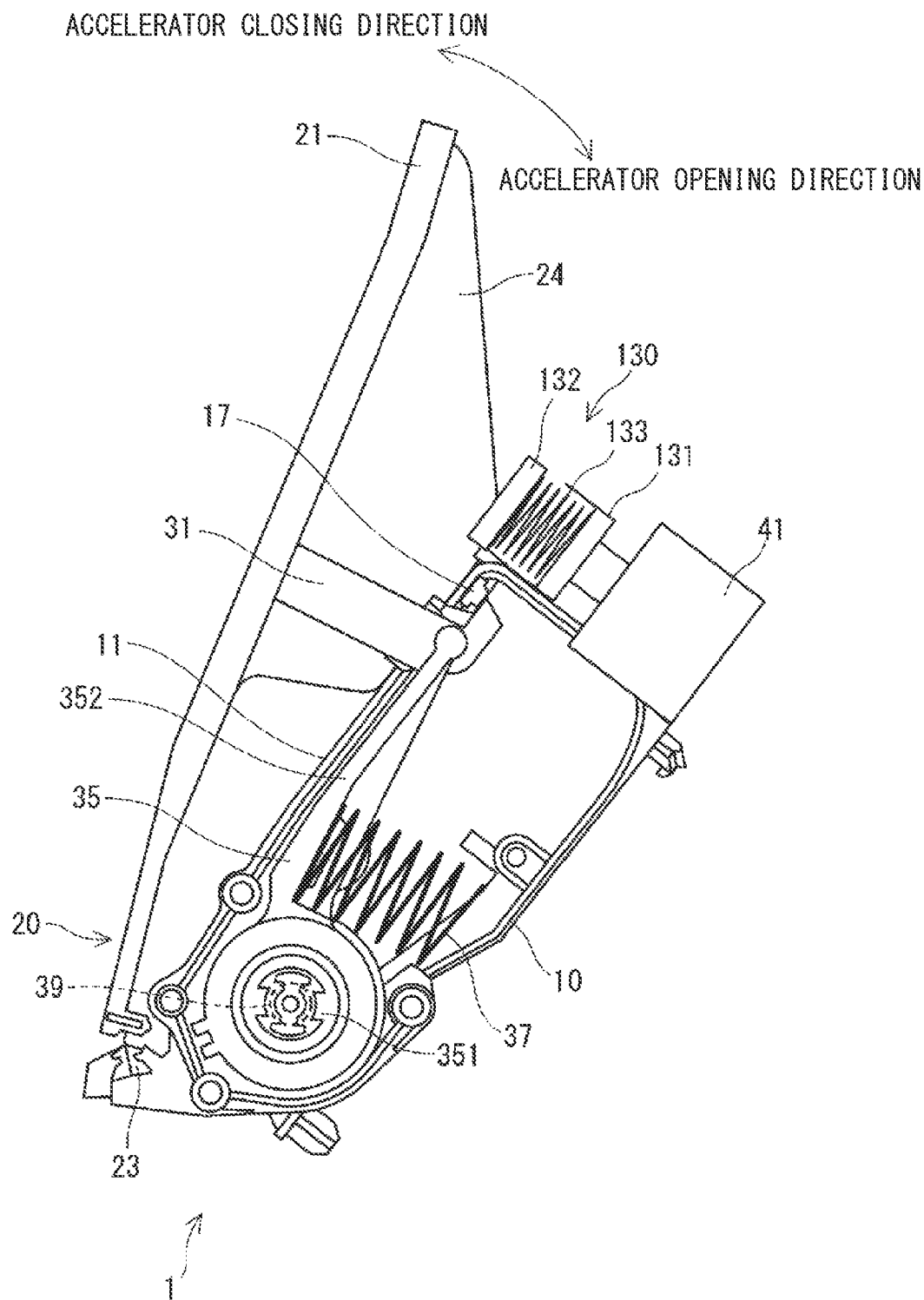
FIG. 48 is a side view illustrating a power transmission mechanism according to a twentieth embodiment.

The twentieth embodiment is illustrated in FIG. 48. A power transmission mechanism 130 in the present embodiment includes a holder 131, a slider 132, and a reaction-force-adjustment biasing member 133. The holder 131 is provided to be movable in a direction coming closer to or further away from the pad 21 of the pedal lever 20 as a result of extension or contraction of the solenoid 41. The slider 132 is provided to be able to come into contact with the pad 21 from an open direction side of the pedal lever 20. The reaction-force-adjustment biasing member 133 is a compression coil spring having one end contained in the holder 131 and another end connected to the slider 132.

In the present embodiment, by distributing power to the solenoid 41, the holder 131 and the slider 132 are pushed up to bring the slider 132 and the pad 21 into contact with each other. By further pushing up the holder 131 in a state in which the slider 132 and the pad 21 are in contact to contract the reaction-force-adjustment biasing member 133, the reaction force to be exerted to the pad 21 is adjusted. In other words, in the present embodiment, a force of the solenoid 41 in the linear motion direction is not converted to a force in the rotating direction, and the reaction force is exerted to the pedal lever 20.

Additionally, by further pushing up the holder 131 and the slider 132 by using the solenoid 41 to bring the holder 131 and the slider 132 into contact with each other and directly transmitting a solenoid force to the arm 31, the pedal lever is locked so as not to move until the driver applies a depressing force equal to or greater than a predetermined magnitude thereto. In other words, in the present embodiment, the pedal lever 20 can be locked in a fully closed state with constant power distribution during the locking period. Such a configuration also achieves the same effects as achieved in the embodiments described above.

Twenty-First Embodiment

Figure 49:
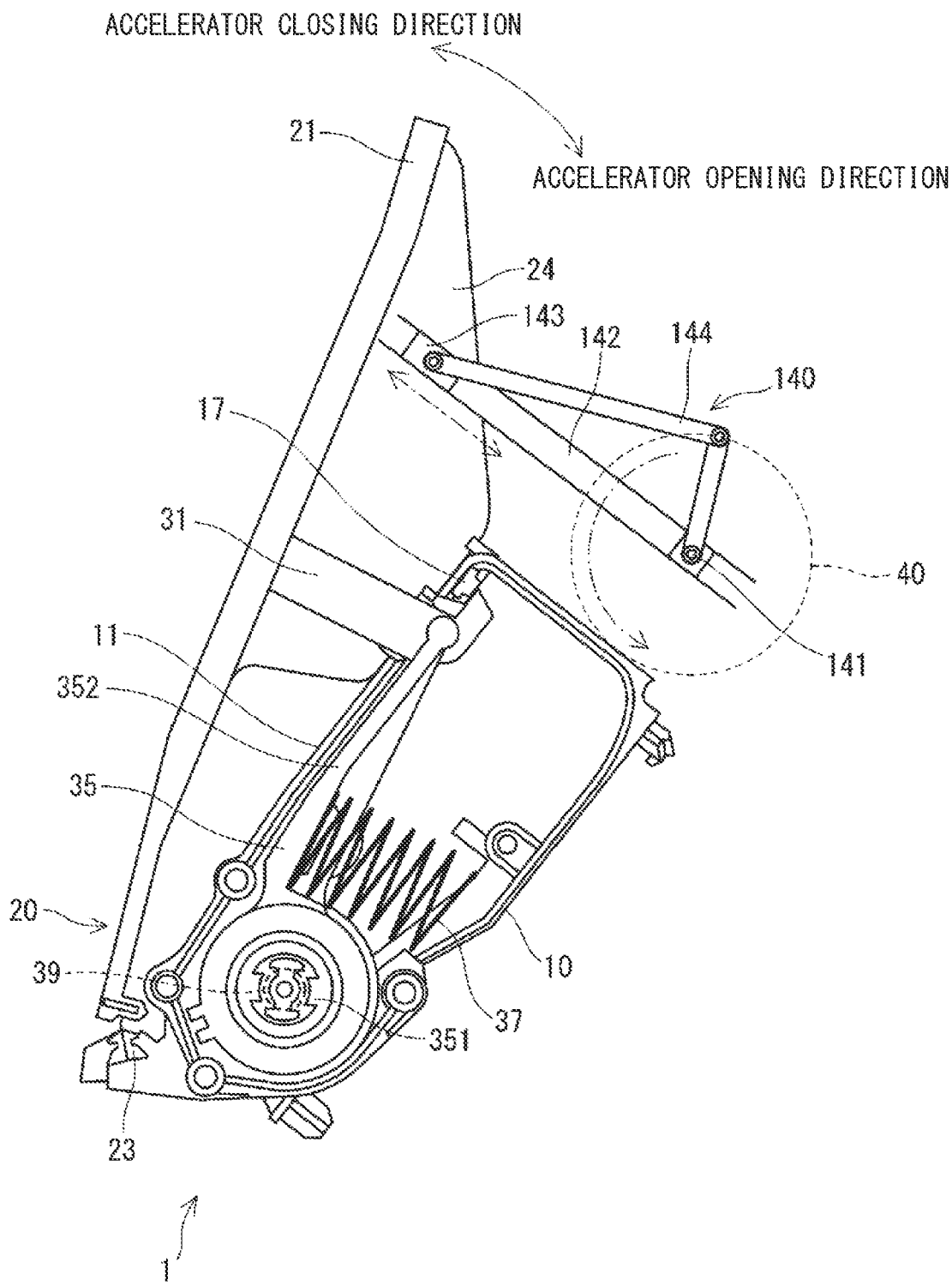
FIG. 49 is a side view illustrating a power transmission mechanism according to a twenty-first embodiment.

The twenty-first embodiment is illustrated in FIG. 49. A power transmission mechanism 140 in the present embodiment includes a rotating body 141, a guide rail 142, a moving block 143, and a link member 144. The rotating body 141 is connected to an output shaft of the motor 40 serving as the reaction-force-exerting drive source and driven by the motor 40 to rotate.

The guide rail 142 is formed in a linear shape extending from a rotating body 141 side toward the pad 21. The moving block 143 is provided to be able to move along the guide rail 142 and come into contact with the pad 21. The link member 144 has one end connected to the rotating body 141 and another end connected to the moving block 143 to convert rotation of the rotating body 141 to a linear motion of the moving block 143. By bringing the moving block 143 into contact with the pad 21 and transmitting the torque of the motor 40 to the pad 21 via the rotating body 141, the link member 144, and the moving block 143, it is possible to exert a reaction force to the pedal lever 20.

Additionally, in the present embodiment, by providing a configuration such that the link member 144 is linear in a state in which the moving block 143 is in contact with the pad 21 at the fully closed position of the pedal lever 20, the pedal lever 20 is locked. In other words, in the present embodiment, the pedal lever 20 can be locked in the fully closed state with no power distribution during the locking period. Such a configuration also achieves the same effects as achieved in the embodiments described above.

Twenty-Second Embodiment

Figure 50:
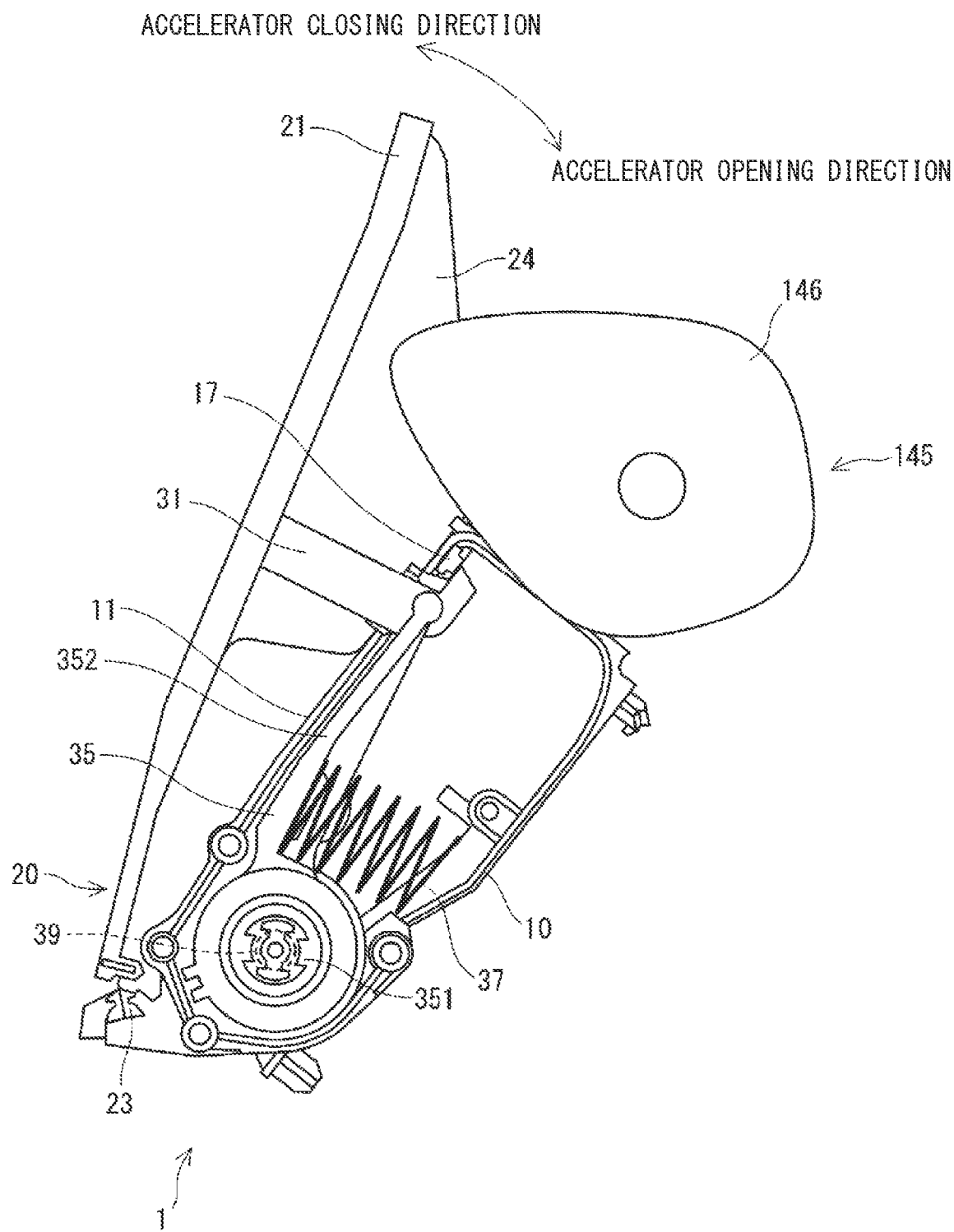
FIG. 50 is a side view illustrating a power transmission mechanism according to a twenty-second embodiment.

The twenty-second embodiment is illustrated in FIG. 50. A power transmission mechanism 145 in the present embodiment includes a cam 146 connected to the output shaft of the motor 40 (not shown in FIG. 50). In the present embodiment, by transmitting the motor torque to the pad 21 via the cam 146, it is possible to exert the reaction force to the pedal lever 20.

Additionally, by providing a configuration such that a straight line connecting a center of the cam 146 and a vertex thereof most distant from the center is perpendicular to the pad 21, the pedal lever 20 is locked. In other words, in the present embodiment, the pedal lever 20 can be locked in the fully closed state with no power distribution during the locking period. Such a configuration also achieves the same effects as achieved in the embodiments described above.

Twenty-Third Embodiment

Figure 51:
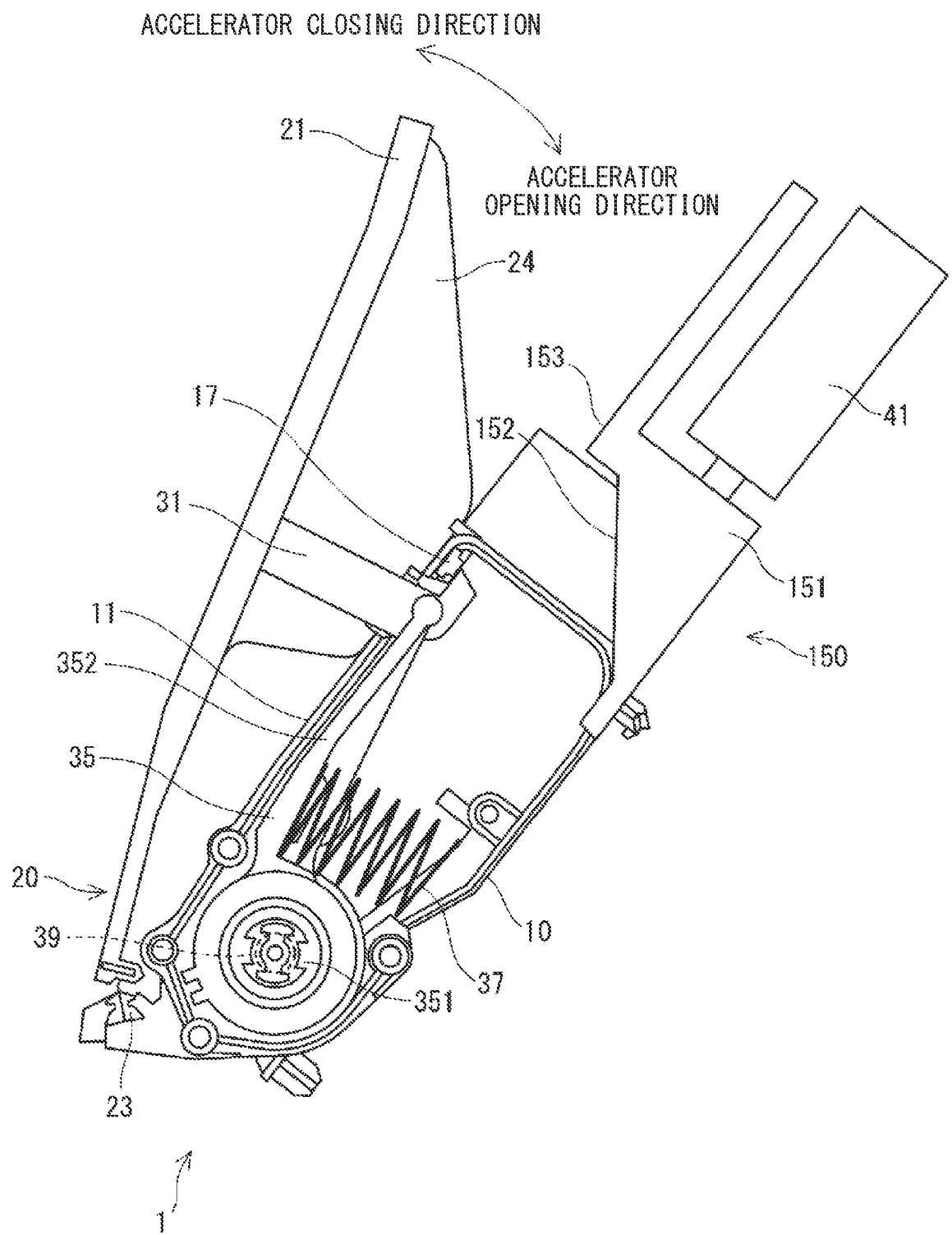
FIG. 51 is a side view illustrating a power transmission mechanism according to a twenty-third embodiment.
Figure 52:
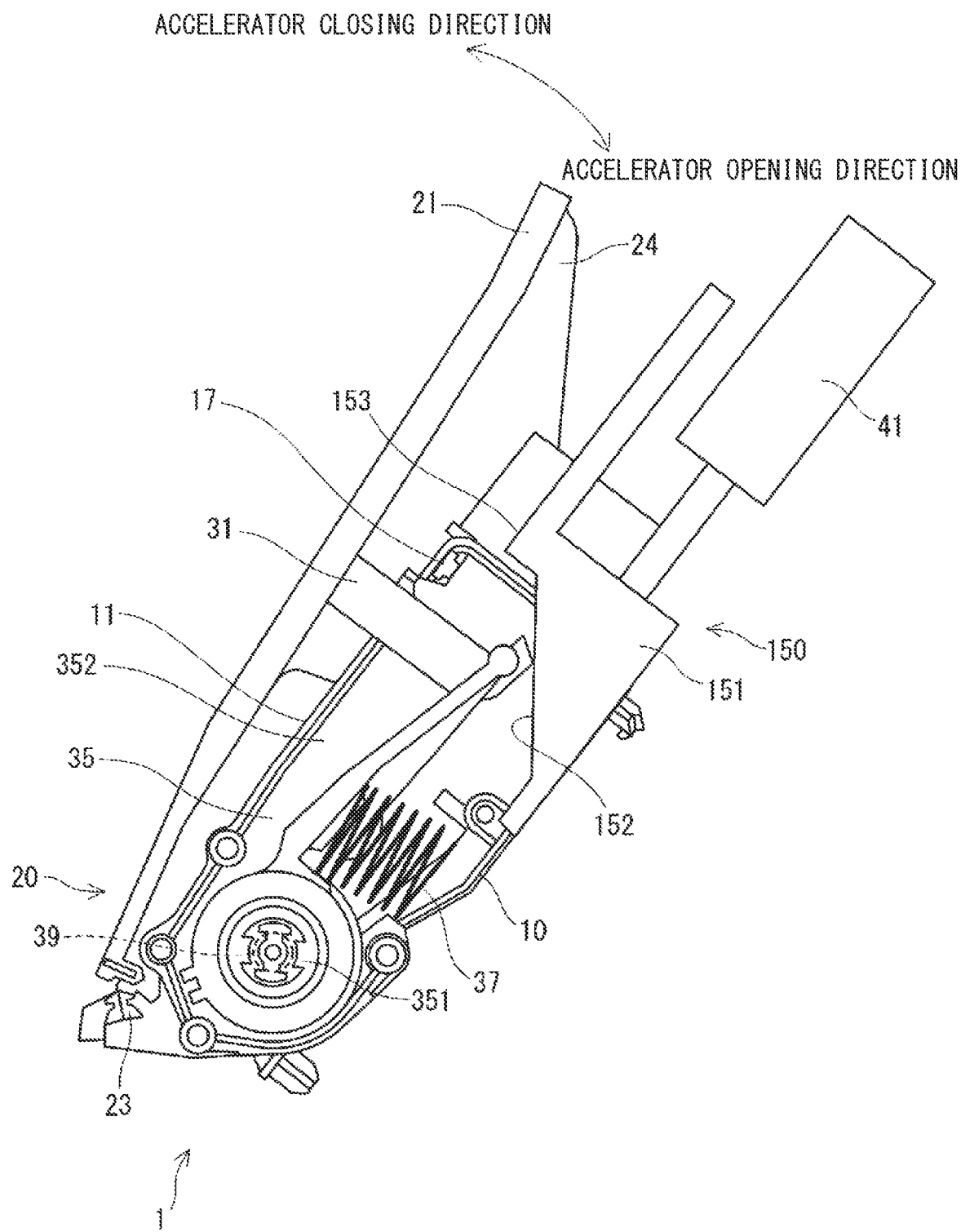
FIG. 52 is a side view illustrating a state in which, in the twenty-third embodiment, the pedal lever is depressed, and the reaction force is exerted thereto.
Figure 53:
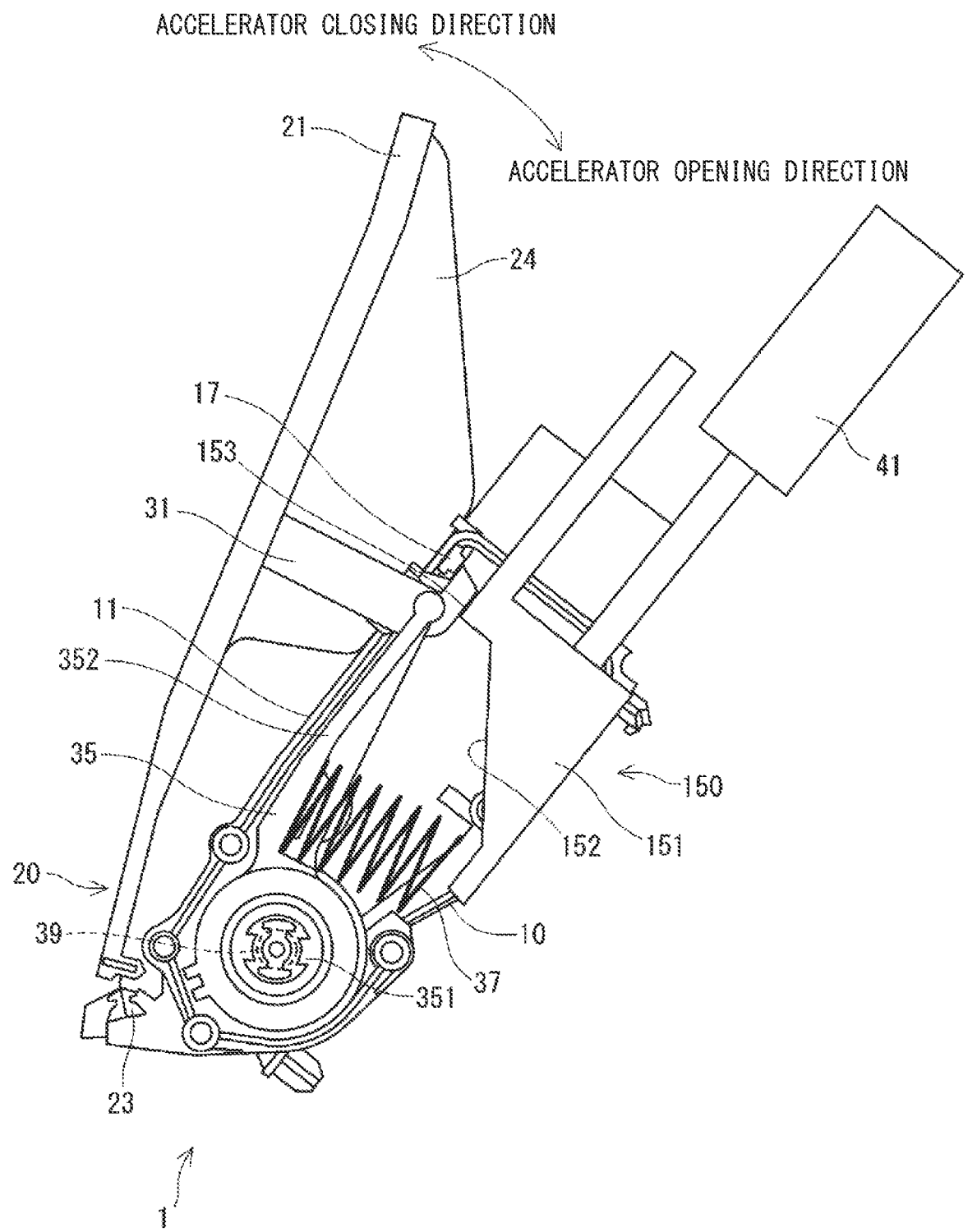
FIG. 53 is a side view illustrating the pedal-locked state in the twenty-third embodiment.

The twenty-third embodiment is illustrated in FIGS. 51 to 53. A power transmission mechanism 150 in the present embodiment includes a slider member 151. The slider member 151 is substantially the same as the slider member 81 in the fourth embodiment, and is driven by the solenoid 41 in the present embodiment.

As illustrated in FIG. 51, the amount of stroke 41 of the solenoid 41 is set relatively large and, by drawing the leading end portion, the slider member 151 can be retracted to a position at which the arm 31 and the slider member 151 are out of contact with each other in the entire region from the fully closed position of the pedal lever 20 to the fully open position thereof. By thus separating the pedal lever 20 and the slider member 151 from each other when no reaction force is exerted, it is possible to avoid effects on the depressing force.

As illustrated in FIG. 52, in a state in which the arm 31 is in contact with an inclined surface 152, the solenoid 41 moves the slider member 151 to be able to exert the reaction force to the pedal lever 20. As also illustrated in FIG. 53, when the slider member 151 is moved to a position at which the arm 31 and the stopper 153 come into contact with each other in a state in which the pedal lever 20 is fully closed, the pedal lever 20 is locked. In other words, in the present embodiment, the pedal lever 20 can be locked in the fully closed state with no power distribution during the locking period. Such a configuration also achieves the same effects as achieved in the embodiments described above.

Other Embodiments

In the embodiments described above, the drive source is a DC motor. In another embodiment, the drive source may be a motor of a type other than that of the DC motor, and it may also be possible to use, as the drive source, an item other than a motor such as, e.g., a solenoid. Alternatively, it may also be possible to use a plurality of the drive sources configured to exert reaction forces.

In each of the embodiments described above, the description has been given of the accelerator device of a floor-standing type (a so-called "organ type"). In another embodiment, the accelerator device may also be a suspended type (a so-called "pendant type)". The power transmission mechanism and the locking mechanism may also be configured to be different from those in the embodiments described above.

In each of the embodiments described above, the description has been given of an integrated type including an actuator and an accelerator pedal which are connected to each other. In another embodiment, it may also be possible to use a separate type including an actuator and an accelerator pedal which are not connected to each other, but are each connected to a floor. As described heretofore, the present disclosure is by no means limited to the embodiments described above, and can be implemented in various forms within the scope not departing from the gist thereof.

The present disclosure has been described with reference to the embodiments. However, the present disclosure is not limited to the embodiments and structures. The present disclosure encompasses various modifications and variations within the scope of equivalents. Also, various combinations and forms, as well as other combinations and forms that include only one element, more, or less, are within the scope and spirit of the present disclosure.

What is claimed is:
1. An accelerator device comprising:
 a pedal lever configured to operate in response to a depressing operation;

at least one drive source configured to exert a reaction force to the pedal lever in a returning direction;
a power transmission mechanism configured to transmit a drive force from the drive source to the pedal lever; and
a locking mechanism configured to regulate an operation of the pedal lever, wherein
the power transmission mechanism is configured to transmit the drive force from the drive source to the pedal lever by using a rigid member,
the rigid member is a cam configured to be driven by the ve source to able to come into contact with the pedal lever,
the accelerator device further comprises a gear provided between the drive source and the cam,
a locking engagement portion projects on a radially outside of the gear,
the locking mechanism includes a lock pin and a lock pin biasing member,
the lock pin is biased by the lock pin biasing member to be projected in an axial direction of the gear, and
when the locking engagement portion climbs over the lock pin, the pedal lever is locked.

2. The accelerator device according to claim 1, wherein the locking mechanism is configured to implement unlock on application of a force, which is equal to or greater than a predetermined magnitude, to the pedal lever.

3. The accelerator device according to claim 1, wherein the power transmission mechanism is regularly in constant contact with the pedal lever.

4. The accelerator device according to claim 1, wherein the power transmission mechanism is configured to
come into contact with the pedal lever when exerting the reaction force to the pedal lever and
be separated from the pedal lever when not exerting the reaction force to the pedal lever.

5. The accelerator device according to claim 1, wherein the locking mechanism is configured to regulate the operation of the pedal lever at at least one of a fully closed position or a fully open position of the pedal lever.

6. The accelerator device according to claim 1, wherein the locking mechanism is configured to regulate the operation of the pedal lever at an intermediate position between a fully closed position and a fully open position of the pedal lever.

7. The accelerator device according to claim 1, wherein the locking mechanism is configured to be driven by the drive source that is for exerting the reaction force to the pedal lever.

8. The accelerator device according to claim 1, further comprising:
a locking drive source configured to drive the locking mechanism, and
the locking drive source is provided separately from the drive source that is for exerting the reaction force.

9. The accelerator device according to claim 1, wherein the drive source is further configured to drive the locking mechanism;
the locking mechanism is configured to sustain a state, in which the operation of the pedal lever is regulated, in a state in which power distribution, which is to the drive source for driving of the locking mechanism, is OFF.

10. The accelerator device according to claim 1, wherein the locking mechanism includes
a locking engagement portion provided in a power transmission route from the drive source to the pedal lever, and
a locking member configured to be moved or deformed by an elastic force, and
the locking engagement portion is configured to climb over the locking member to be engaged with the locking member to regulate the operation of the pedal lever.

11. The accelerator device according to claim 1, further comprising:
a position sensor configured to detect a position of the drive source or a component included in the power transmission mechanism; and
a control unit configured to control the drive source based on a detection value from the position sensor.

12. The accelerator device according to claim 1, wherein the gear constitutes a deceleration mechanism.

13. The accelerator device according to claim 1, wherein when the locking engagement portion climbs over the lock pin as the gear rotates, the pedal lever is locked.

14. An accelerator device comprising:
a pedal lever configured to operate in response to a depressing operation;
at least one drive source configured to exert a reaction force to the pedal lever in a returning direction;
a power transmission mechanism configured to transmit a drive force from the drive source to the pedal lever; and
a locking mechanism configured to regulate an operation of the pedal lever, wherein
the power transmission mechanism is configured to transmit the drive force from the drive source to the pedal lever by using a rigid member,
the rigid member is a cam configured to be driven by the drive source to enable to come into contact with the pedal lever,
the accelerator device includes a deceleration mechanism including a drive-source-side gear and a cam-side gear, and
an inter-gear biasing member is provided between the drive-source-side gear and the cam-side gear.

15. The accelerator device according to claim 14, wherein the locking mechanism includes
a locking engagement portion configured to rotate integrally with the drive-source-side gear, and
a locking member configured to be engaged with the locking engagement portion in a region, in which the cam-side gear does not rotate, and the drive-source-side gear rotates.

16. The accelerator device according to claim 14, wherein:
the deceleration mechanism is provided between the drive source and the cam.

17. The accelerator device according to claim 14, wherein the drive-source-side gear and the cam-side gear are coaxially provided, and
when the drive-source-side gear is rotated in a reaction-force exerting direction, the cam-side gear
rotates integrally with the drive-source-side gear until a set load for the inter-gear biasing member is reached and
does not rotate when the set load for the inter-gear biasing member is exceeded.

* * * * *